Figure 3:
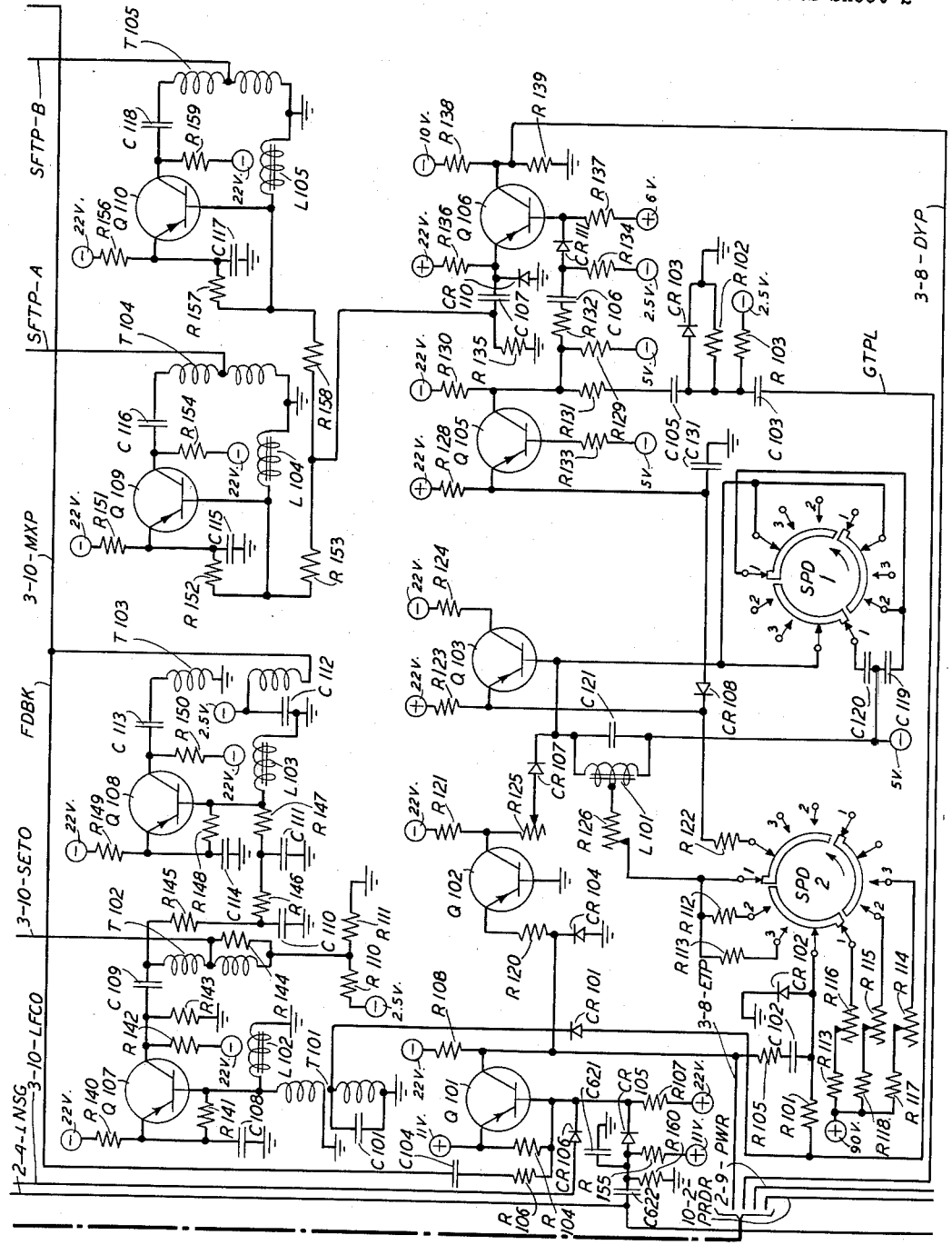

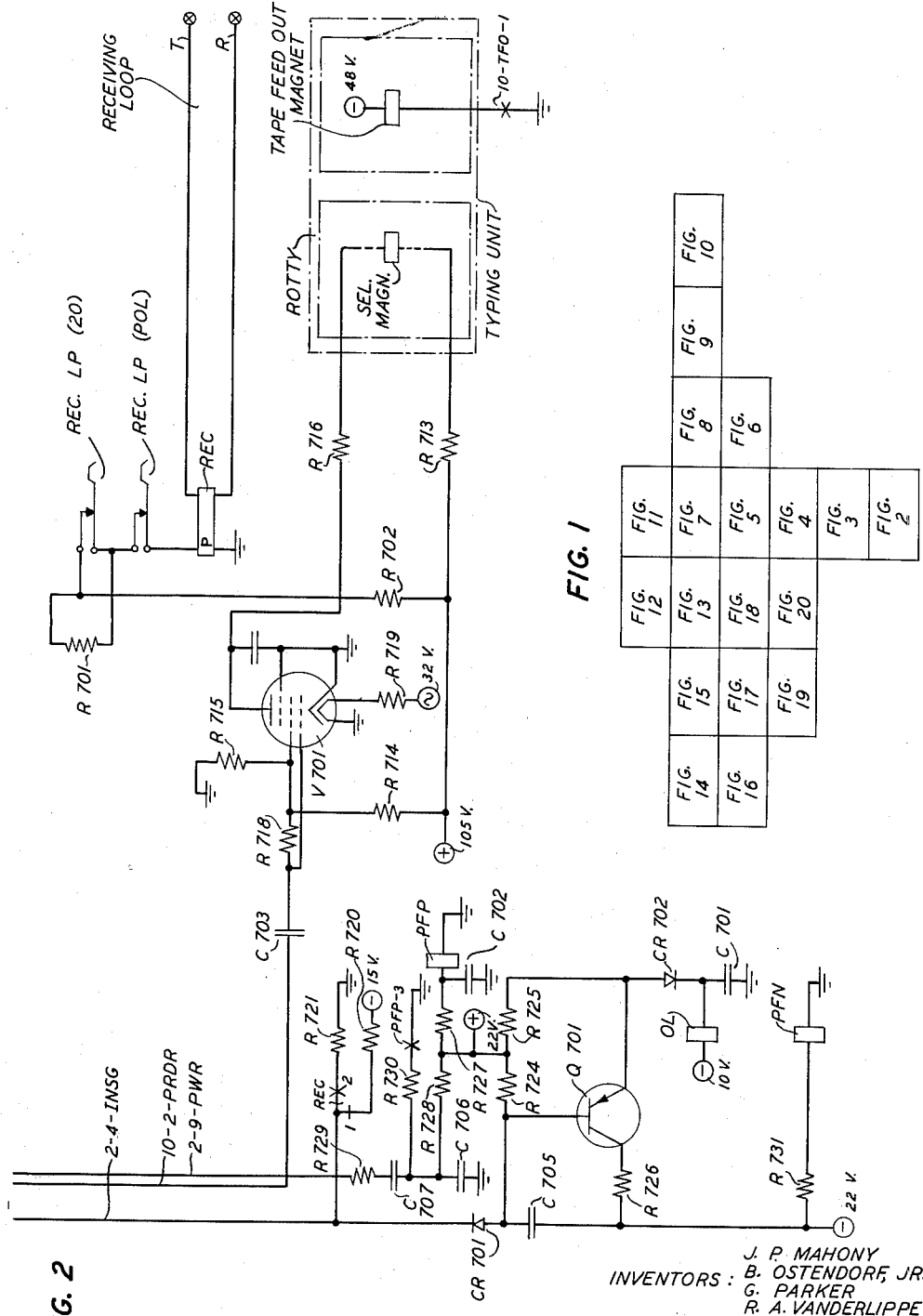

INVENTORS: J.P. MAHONY
B. OSTENDORF, JR.
G. PARKER
R.A. VANDERLIPPE

BY John E. Cassidy
ATTORNEY

INVENTORS:
J. P. MAHONY
B. OSTENDORF, JR.
G. PARKER
R. A. VANDERLIPPE

BY John E. Cassidy
ATTORNEY

INVENTORS: J.P. MAHONY
B. OSTENDORF, JR.
G. PARKER
R.A. VANDERLIPPE

BY John E. Cassidy
ATTORNEY

Sept. 19, 1961    J. P. MAHONY ET AL    3,001,010
STATION CONTROL CIRCUIT FOR MULTISTATION LINE
Filed Sept. 11, 1958    20 Sheets-Sheet 18

INVENTORS: J.P. MAHONY
B. OSTENDORF, JR.
G. PARKER
R.A. VANDERLIPPE

BY John E. Cassidy
ATTORNEY

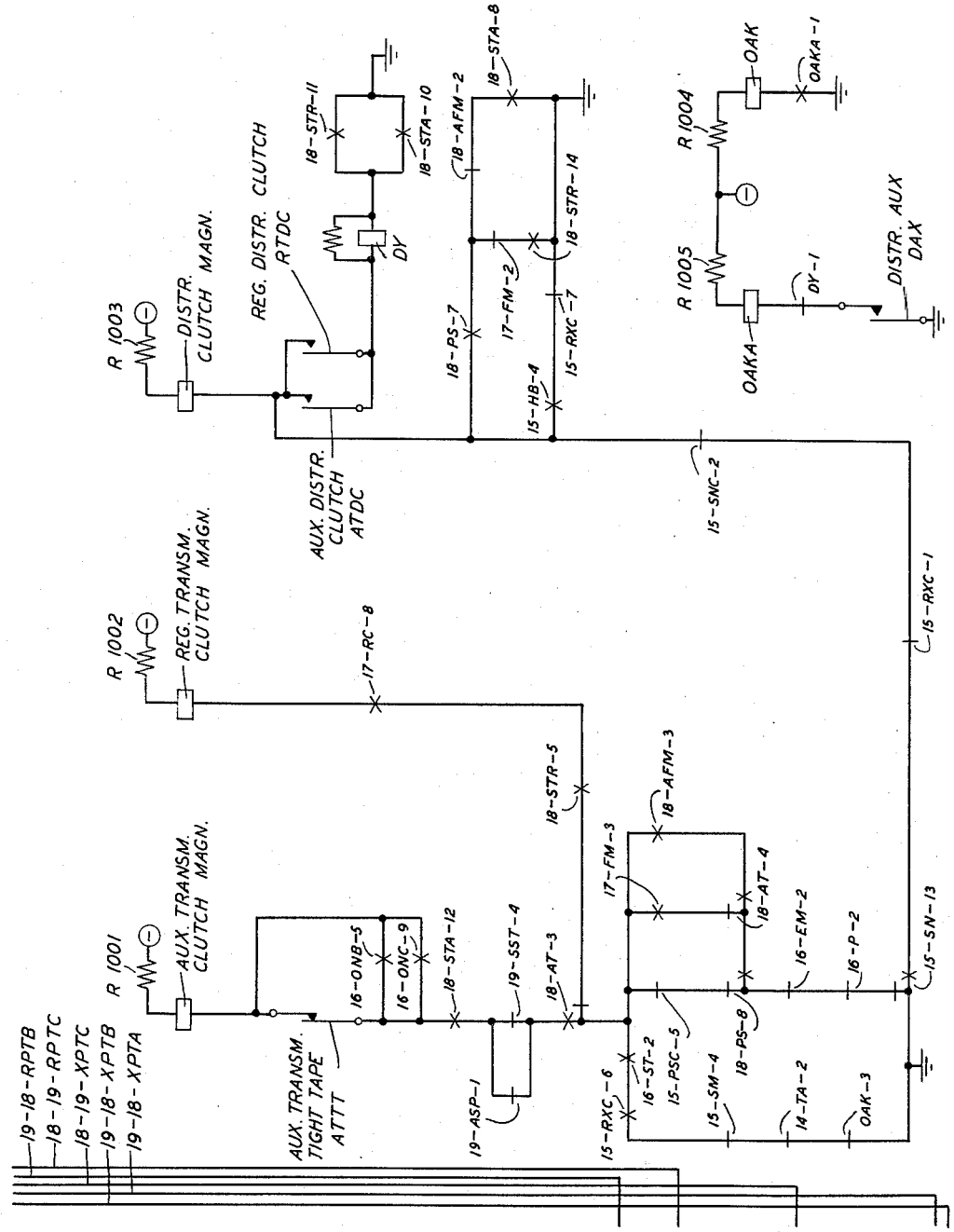

Sept. 19, 1961     J. P. MAHONY ET AL     3,001,010
STATION CONTROL CIRCUIT FOR MULTISTATION LINE
Filed Sept. 11, 1958     20 Sheets-Sheet 20
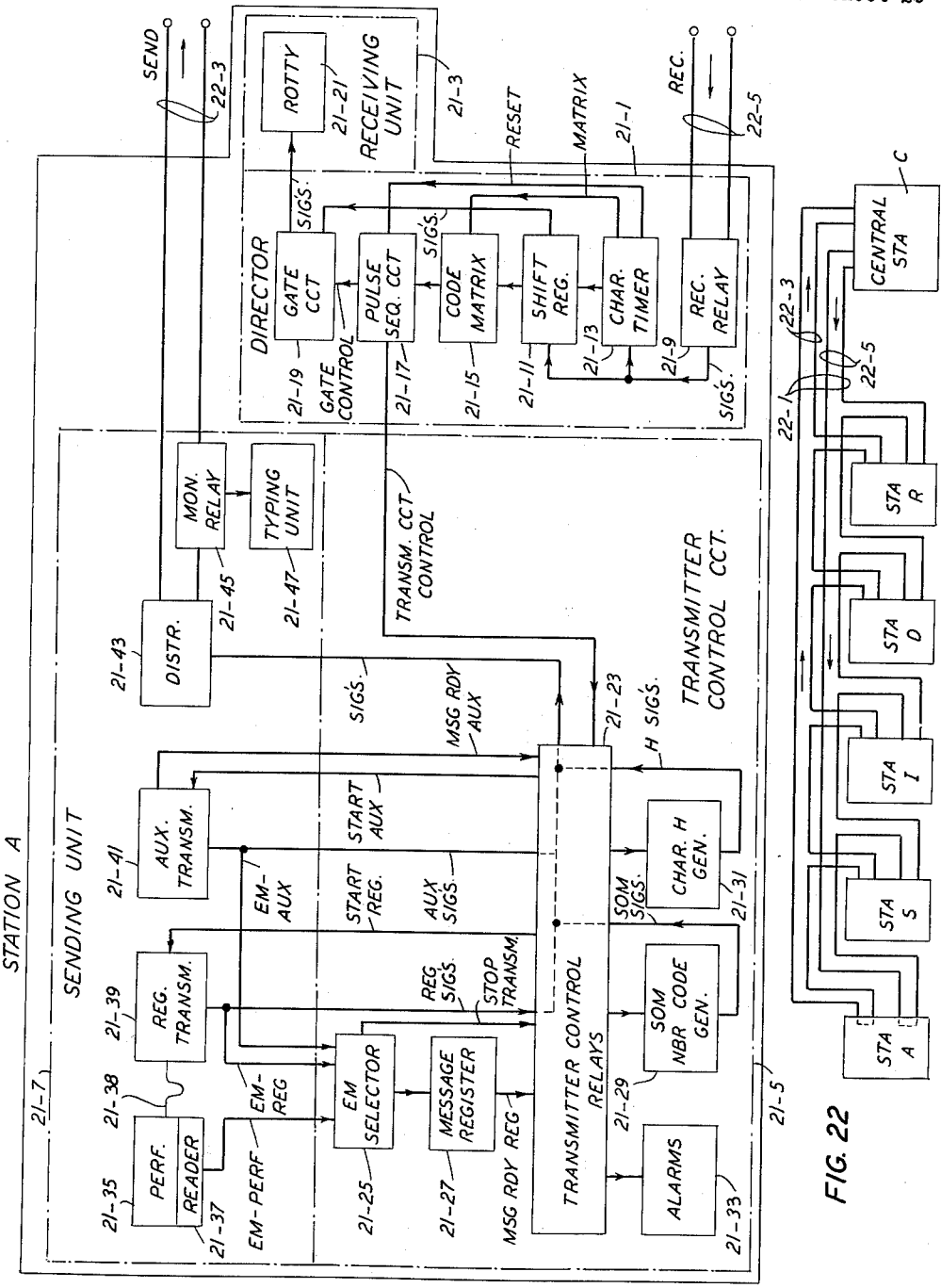
INVENTORS:
J. P. MAHONY
B. OSTENDORF, JR.
G. PARKER
R. A. VANDERLIPPE
BY
John E Cassidy
ATTORNEY United States Patent Office 3,001,010
Patented Sept. 19, 1961

3,001,010
STATION CONTROL CIRCUIT FOR MULTISTATION LINE
John P. Mahony, Weehawken, N.J., Bernard Ostendorf, Jr., Stamford, Conn., George Parker, New York, N.Y., and Richard A. Vanderlippe, San Mateo, Calif., assignors to Bell Telephone Laboratories, Incorporated, New York, N.Y., a corporation of New York
Filed Sept. 11, 1958, Ser. No. 760,510
32 Claims. (Cl. 178—2)

This invention relates to an automatic telegraph communication system and more particularly to telegraph stations on a multistation line in such a system.

In the copending application of F. B. Crowson, G. A. Locke, and R. R. MacLaughlin, Serial No. 760,511, filed concurrently herewith, there is described a central office for a telegraph switching system for interconnecting a plurality of outlying stations and remote central offices on multistation and single station lines and trunks terminating in the central office. Each telegraph code message received over an incoming side of a line or trunk includes the message text preceded by a message number and routing indicators comprising characters designating the station or stations which are being addressed. Means are provided at the central office to automatically check each message number and to check the routing indicators. After these checks, the message text is transmitted across the office to a storage repeater or repeaters associated with outgoing lines or trunks in accordance with the routing indicator of the message for retransmission over the outgoing lines and trunks. Outgoing multistation lines are provided with code generators which, in response to a message routing indicator supplied to an outgoing repeater and prior to the retransmission of the message, generate and transmit a succession of characters which cut on the addressed receiver. This sequence is called the receiver cut-on sequence. This sequence begins with a start-of-sequence character, is followed by a receiver cut-on character, designating the station addressed, and is terminated by an end-of-sequence signal. In addition, each multistation line is provided with a transmitter-start circuit which may interrupt an outgoing message to transmit a transmitter-start code sequence which includes a "preamble" followed by transmitter-start or action codes for sequentially polling the outlying station transmitters, first for precedence messages and then for non-precedence messages. After polling a selected outlying station, if a no message signal is received, the transmitter start circuit is arranged to poll the next consecutive outlying station and to terminate the polling cycle and send a "suspend polling" character when message traffic appears on the incoming line. The transmitter start circuit will institute a new code sequence to poll all the stations when an "end-of-message" signal is received from an outlying station or transmission from the outlying station stops for more than 20 seconds. If a complete polling of the outlying station transmitters for precedence and non-precedence messages indicates that no message traffic is available for transmission at the outlying stations, the transmitter start circuit transmits a signal to place the outlying stations in a "wait" condition and then discontinues polling the outlying station transmitters. If, during the period while the "wait" condition exists, the central office is informed that message material is supplied to an outlying station transmitter, the transmitter-start circuit will institute a new polling cycle. Means are also provided to vary the code pattern generated by the transmitter-start circuit whereby predetermined outlying station transmitters may be skipped or polled only for precedence traffic during a polling cycle. In addition, an emergency stop code sequence may be transmitted from the central office to stop the transmission of a message from an outlying station transmitter. In a preferred embodiment, the present invention provides outlying stations on a multistation line terminating in a central office of the type disclosed in the above-mentioned Crowson, Locke, and MacLaughlin application.

A broad object of this invention is to provide improved telegraph station circuits which are selectively responsive to control signals from a remote station.

Another object of this invention is to provide improved telegraph station circuits on a multistation line which are selectively enabled to record or transmit telegraph messages in response to supervisory signals from a remoe station.

Another object of this invention is to provide an improved control circuit for a station on a multistation line for blinding the station to supervisory signals from a remote station.

Another object of this invention is to store, read and translate code signals from a remote central station before supplying the code signals to a station recorder.

Another object is to register an indication each time a complete message is supplied to a station transmitter and register an indication each time a message is transmitted.

A further object of this invention is to transmit a telegraph message in response to supervisory signals from a remote station when a complete message is available.

Another object is to signal the remote central station that message material is supplied to an outlying station transmitter when the central station is not polling for message material.

A further object is to suppress signalling the central station that message material is supplied to an outlying station transmitter if the outlying station was not polled during the previous polling cycle.

Another object is to provide an improved telegraph station circuit which selects one of a plurality of transmitters to send when the transmitters have messages available.

A further object is to transmit an initial portion of a message from one transmitter followed by the transmission of the remaining portion of the message from another transmitter.

In previous types of telegraph switching systems in which outlying stations are connected to a multistation line terminating in a central office, each outlying station includes one or more telegraph receivers and message transmitters. An individual receiver cut-on character is assigned to each outlying station and when the character is received after the end-of-message signal of the previous telegraph message, the station designated by the assigned character is turned on to receive from the line until a succeeding end-of-message signal is received. Each station is also assigned an individual non-precedence transmitter start character, which may be identical to the receiver cut-on character for the station, and an individual precedence transmitter start character. When the precedence character is received during the reception of the transmitter start code sequence and the assigned station transmitter has been or is being supplied a precedence message or the non-precedence charater is received during the reception of the transmitter start code sequence and the station transmitter has been or is being supplied a non-precedence message, the message transmitter is started to send the message. If the transmitter does not have a precedence or non-precedence message upon the reception of a precedence or non-precedence transmitter start character, respectively, the station causes a "no-message" signal to be sent. In the event that a message, being received by a station, is interrupted by a transmitter start code sequence, the station receiver is turned off until the transmitter start sequence is completed.

In accordance with the present invention, each outlying station includes a transmitter control circuit and a director circuit. The director circuit stores incoming code signals, scans the incoming code signals for supervisory switching signals, translates the stored supervisory signals, supplies information in accordance with the translation to the transmitter control circuit and then repeats the stored code signals to a telegraph receiver via a receiver control gate which passes or blocks the code signals to the receiver in accordance with the translated information. The transmitter control circuit controls the transmission of supervisory and message material from the outlying station in accordance with the information from the director circuit and the prepared conditions of the station transmitter or transmitters.

A feature of the invention is a message count circuit which counts and registers the number of messages prepared at a station as each end-of-message signal is punched by a tape perforator associated with the regular transmitter at the station and which counts and registers the number of transmitted messages in response to the end-of-message signal transmitted by the regular transmitter. When the count of the number of prepared messages exceeds the count of the number of transmitted messages, the count circuit indicates that at least one complete message is available in the transmitter and the regular transmitter is ready to send a message when polled for message material. If, however, the difference between the prepared message count and the transmitted message count should become excessively large, the count circuit is disabled until the regular transmitter runs out of tape whereupon the count circuit is reset for a new count series.

Another feature is a multistage shift register which provides storage to enable the reading and translating of incoming code signals. Each code element of the received code signals is applied to the first stage of the shift register, shifted through all the intermediate stages and then supplied from the final stage to the telegraph receiver by way of a control gate while the next code signal is being received and stored in the shift register. The reading and translating of each code signal is accomplished by the director which simultaneously reads out the conditions of the shift register stages when the code signal is stored in the shift register.

Another feature is a first timing circuit which starts timing in response to the storage of a predetermined code signal and is disabled by the reception of a subsequent code signal. If the first timing circuit times out, a second timing circuit starts timing, temporarily closing the receiver control gate and enabling a selective pulse circuit which is selectively responsive to the storage of a subsequent code signal to permanently close the gate, blocking the application of signals to the telegraph receiver. The selective pulse circuit is subsequently disabled by a knockdown circuit responsive to the storage of a breakdown code signal. In addition, the knockdown circuit deletes the stored knockdown code signal to prevent the application of the signal to the station receiver.

Another feature is a regular transmitter start circuit for starting the regular transmitter if a message is available when the station is polled and an auxiliary transmitter start circuit for starting an auxiliary station transmitter if it is supplied with a message tape when the station is polled in combination with a preference circuit that withholds transmission from the regular transmitter if the auxiliary transmitter is prepared to send.

Another feature is a manually activated pilot circuit that permits the transmission of message material from the regular transmitter followed by the transmission of message material from the auxiliary transmitter without a subsequent polling of the station. The pilot circuit disables the auxiliary transmitter start circuit and the preference circuit until the regular transmitter exhausts its message supply whereupon the pilot circuit starts the auxiliary transmitter without a subsequent station polling.

Another feature is a code generator which signals the control station when the outlying station is polled that the station transmitters do not have any available message and signals the control station during a wait period that a message has been supplied to a station transmitter. The operation of the code generator is initiated by a first control circuit which is enabled by the reception of a polling signal when the outlying station transmitters do not have an available message and a second control circuit which is enabled by the reception of the wait signal and the availability of a message in a transmitter. A memory circuit is also provided to disable the second control circuit if the outlying station was not polled for message material in the previous polling cycle.

The means for fulfilling the foregoing objects and the practical embodiment of the features of this invention will be fully understood from the following description, taken in conjunction with the accompanying drawings.

FIGS. 2 through 20, when arranged as shown in FIG. 1, show the details of circuits and equipment which cooperate to form a typical station in accordance with this invention.

FIG. 21 illustrates in block form the layout of the various equipment and circuits to form the specific embodiment of this invention disclosed herein.

FIG. 22 generally shows the manner in which a plurality of typical outlying stations cooperate with the central control station.

In order to minimize the number of leads interconnecting the circuit components, and to effect a reduction in the number of sets of drawings comprising the detailed circuit disclosure, the "detached contact" method of exposition used in Patent 2,722,675 granted to J. Michal and R. E. Staehler, November 1, 1955, has been adopted. In the detached contact method, the relay core and its winding or windings are shown physically separated from the contacts controlled thereby. The core is given a functional designation such, for example, as PFP indicated on FIG. 2 of the drawing by a small rectangle. In the specification, the relay is referred to as 2—PFP, where "2" indicates the figure number of the drawing on which the core is located, and PFP signifies "power failure positive," the functional designation of the relay. On the drawing, each of the contacts controlled by the relay, and shown on the same figure with the winding are given the designation of the winding on the drawing followed by an individual contact number such, for example, as 3, the sequence placed in proximity to the contacts. In the specification, the contacts are referred to as 2–PFP–3. When the relay has contacts located on another figure of the drawings also, the relay winding is given a compound designation on the drawing such as 2—PFP. A contact on this relay would be identified on the drawing as 2–PFP–4, for instance. In the specification, the contacts are referred to as 7–2–PFP–4, for instance, where "7" indicates the figure number of the drawing on which the contacts are located, "2" indicates the figure number of the drawing on which the core is located, "PFP" is the functional designation, and "4" is the number of an individual contact on the relay.

Contacts which are closed when the relay is deenergized, known as "break contacts," are represented by a single short line perpendicular to the line representing the conductor, while contacts which are closed when the relay is energized, known as "make contacts," are represented by two short crossed lines diagonally intersecting the conductor line. A "break" and "make" contact connected together on one side, in close proximity to each other, indicate a set of transfer contacts. The designation "c" in close proximity to such a set indicates a "continuity" or "make before break" contacting sequence when the relay is energized. Similarly, in a reperforator transmitter, the magnets are shown physically separated from the several contacts of the machine and are designated in a manner similar to that used in designating a relay core. The reading and sensing contacts are shown as a single line having a plurality of contacts associated therewith, and are suitably designated to indicate the machine of which they are a part, and a contact identifying number. The other contacts of the machine are designated in a manner similar to that used in designating relay contacts. Keys, lamps, rotary selectors, etc. are shown in the conventional manner employed heretofore.

A circle enclosing a —, +, or ~ sign indicates that the conductors terminating thereon are to be connected respectively, to a grounded source of negative direct current, a grounded source of positive direct current, or a source of low voltage alternating current the potential of which is as indicated.

In the following description it is to be understood that the values of all constants cited are by way of example as an aid in understanding the operation of the circuit and the values cited are not to be considered as limitations.

Referring now to FIG. 22, transmission circuit 22—1 illustrates a full duplex multistation line extending from central station C and serving outlying stations A, S, I, D and R. Multistation line 22—1 comprises sending channel or path 22—3 for transmitting signaling impulses from the outlying stations to central station C and receiving channel 22—5 for transmitting signaling impulses from central station C to the outlying stations.

Multistation line 22—1 has been shown in the drawing as two separate metallic transmission circuits. It is to be understood, however, that these paths may include any of the usual type of telegraph channels suitable for the transmission of telegraph permutation code signals and capable of transmitting the signals in both directions simultaneously.

FIG. 21 shows a typical outlying station indicated in block form as station A. The principal units of station A are a director circuit, generally indicated by block 21—1, a receiving unit, generally indicated by block 21—3, a transmitter control circuit, generally indicated by block 21—5, and a sending unit 21—7.

Start-stop permutation code signals from the central station are received over receiving channel 22—5 by receiving relay 21—9 in director 21—1 and repeated to character timer 21—13 and shift register 21—11 which stores the received code characters. Character timer 21—13 initiates a timing cycle each time the start pulse of a code character is received supplying pulses during the timing cycle to shift register 21—11 to shift the received code elements to successive stages of shift register 21—11. With the information code elements of the received character stored in shift register 21—11, character timer 21—13 sends a matrix pulse to code matrix 21—15. Code matrix 21—15, which contains the directory information for station A, employs the matrix pulse to read the character stored in shift register 21—11 and supplies pulse sequence circuit 21—17 with the translated information. The function of pulse sequence circuit 21—17 is to sample the translated information and, if the received character or characters require any action by the station, to relay instructions in accordance therewith to transmitter control relays 21—23 and gate circuit 21—19. On receipt of the next character, character timer 21—13 resets the pulse sequence circuit 21—17 and supplies the shift pulses to store the next character in shift register 21—11 and shift the code elements of the preceding character to the last stage of shift register 21—11 where they are relayed to receiving-only teletypewriter 21—21 in receiving unit 21—3 by way of gate circuit 21—19 which now blocks or passes the signals in accordance with the instruction of pulse sequence circuit 21—17 which has previously sampled the translated information derived from the preceding character. Receiving-only teletypewriter 21—21 may be of any suitable type of telegraph printer such as a page printer preferably of the type disclosed in Patent 1,904,164 granted to S. Morton et al. on April 18, 1933, or a typing reperforator preferably of the type disclosed in Patent 2,255,794 granted to R. A. Lake on September 16, 1941. The disclosure of these patents are hereby incorporated herein by reference.

Sending unit 21—7 is provided with regular transmitter 21—39 and auxiliary transmitter 21—41. Messages on detached message tape are transmitted from auxiliary transmitter 21—41 which is preferably of the type disclosed in Patent 2,296,845 granted to M. T. Goetz on September 29, 1942. Regular transmitter 21—39 is preferably of the type disclosed in Patent 2,348,214 granted to E. A. Gubisch on May 9, 1944, and Patent 2,430,447 granted to D. E. Branson et al. on November 11, 1947, and is supplied punched tape 21—38 by keyboard perforator 21—35. Perforator 21—35 may be of any suitable type such as the type disclosed in Patent 1,965,572 granted to C. W. Burcky et al. on July 10, 1934. The disclosure of the above-mentioned patents are hereby incorporated herein by reference.

As each character is punched by perforator 21—35 the character is read by reader 21—37 which relays the readings to end-of-message selector 21—25. End-of-message selector 21—25 scans the characters punched by perforator 21—35 and selectively responds to the perforation of the end-of-message characters by registering in message register 21—27 an indication that a completed message has been made available to regular transmitter 21—39. Message register 21—27, in turn, indicates to transmitter control relays 21—23 that a message is available in regular transmitter 21—39.

Assuming that pulse sequence circuit 21—17 instructs transmitter control relays 21—23 to start a station transmitter and a message is now available in regular transmitter 21—39, transmitter control relays 21—23 connect the signaling output of start-of-message number code generator 21—29 to sending channel 22—3 by way of transmitter control relays 21—23 and sending distributor 21—43, sending the start-of-message and number code sequence to the central station. At the conclusion of the start-of-message sequence, start-of-message number code generator 21—29 is disconnected, the signaling output of regular transmitter 21—39 is connected to sending channel 22—3 by way of transmitter control relays 21—23 and distributor 21—43 and regular transmitter 21—39 is started by transmitter control relays 21—23. During the transmission of the message, end-of-message selector 21—25 scans the message characters and selectively responds to the transmission of the end-of-message characters by instructing transmitter control relays 21—23 to disconnect the signaling output of regular transmitter 21—39 and registers in message register 21—27 an indication that a message was transmitted by regular transmitter 21—39. If at this time the number of transmitted messages equals the number of completed messages, message register 21—27 removes the indication that a message is available in regular transmitter 21—39.

Transmitter control relays 21—23 are informed that a message is available in auxiliary transmitter 21—41 when a message tape is inserted in auxiliary transmitter 21—41. In addition, auxiliary transmitter 21—41 is accorded preference over regular transmitter 21—39 so that when messages are available in both transmitters the auxiliary transmitter will be selected to send and regular transmitter 21—39 must wait until auxiliary transmitter 21—41 has no further messages available. The transmission of a message from auxiliary transmitter 21—41 is started in a manner similar to the transmission of a message from regular transmitter 21—39. When the end-of-message characters are scanned by end-of-message selector 21—25 the end-of-message selector 21—25 responds by signaling transmitter control relay 21—23 to disconnect the signaling output of auxiliary transmitter 21—41 in the same manner as previously described for regular transmitter 21—39. The transmission of the message is not registered in message register 21—27, however.

If pulse sequence circuit 21—17 instructs transmitter control relays 21—23 to start a transmitter and a message is not available in one of the station transmitters, transmitter control relays 21—23 connect character H generator 21—31 to sending channel 22—3 by way of transmitter control relays 21—23 and sending distributor 21—43 and start H generator 21—31 sending an indication to the central station that no message is available in the station transmitters. If thereafter pulse sequence circuit 21—17 instructs transmitter control relays 21—31 that polling by the central station has been stopped and a wait period is now in process, supplying a message to one of the station transmitters indicating to transmitter control relays 21—23 that a message is available will start H generator 21—31 in the same manner as before sending an indication to the central station that a message has been made available in an outlying station transmitter.

Monitoring relay 21—45 is provided to monitor the outgoing signals over sending channel 22—3 and typing unit 21—47 provides a copy of the outgoing signals. Typing unit 21—47 may be any suitable type of telegraph printer similar, for example, to receiving-only teletypewriter 21—21.

Transmitter control relays 21—23 also control alarm circuits 21—33 which are provided to inform the station operator of any malfunction of the station circuits or equipment.

In accordance with the preferred embodiment of the present invention, increased use is made of transistor circuits in the director. The transistors hereafter described, unless otherwise indicated as the PNP type described in Patent 2,569,347, granted to W. Shockley on September 25, 1951, are the point-contact N-type described in Patent 2,524,035, granted to J. Bardeen and W. H. Brattain on October 3, 1950. Single units of point-contact transistors are used to provide bistable flip-flop or monostable one-shot or timing circuits similar to the type of circuits disclosed in Patent 2,708,720, granted to E. A. Anderson on May 17, 1955, and in applications of A. J. Rack, Serial No. 79,861, filed March 5, 1949, and B. Ostendorf, Jr., Serial No. 292,875 filed June 11, 1952, which issued as Patent 2,831,983 on April 22, 1958.

In general, emitter and collector current flows when the emitter potential is positive relative to the base potential and this condition is referred to in the following description as ON. When the emitter potential is negative relative to the base potential, only negligible collector current flows due to collector-to-base leakage and this condition is referred to as OFF.

Assuming a condition in which a point-contact transistor is OFF, if a resistance is inserted in series with the base, the base voltage becomes less positive relative to the emitter due to the leakage current and as the base resistance is further increased, the base potential eventually becomes slightly negative with respect to the emitter and the device triggers itself to the ON condition. If the base resistance is now decreased from this maximum level, the base potential will remain negative relative to the emitter potential due to the increased base current while the circuit is in the ON condition. At some minimum point, however, a further decrease in the base resistance will cause the base voltage to rise to a point at which the emitter is cut off and the circuit goes into the OFF condition.

It is thus seen that the circuit meets the requirements for either the ON or OFF condition for base resistor values between the above-described maximum and minimum levels and is therefore stable in either state. External trigger pulses may be applied to the base or emitter to cause the circuit to flip back and forth between the two states.

The monostable circuit and the monostable timing circuit use the principles of the bistable circuit, except that one of the two states is a temporary condition. The monostable circuit is normally in the OFF condition, with the emitter biased slightly negative. The circuit is monostable in that it is externally triggered to the ON condition but after a time interval self-triggers to the OFF condition. Self-triggering to the OFF condition is caused by supplying the emitter current via a series capacitor and supplying the base current via a series inductor whereby the emitter current falls and the base current rises during the ON interval.

When these effects have progressed to the point at which the ratio of collector to emitter current equals the current multiplication ratio of the particular transistor the circuit is on the verge of triggering to OFF. At this point even a slight additional decrease in emitter current results in a sudden decrease of collector current to the residual collector-to-base leakage. It should be noted that near the point of self-triggering to OFF, the ratio of collector to emitter current is changing rather rapidly; hence the timed interval is not greatly affected by variations in the current multiplication ratio between transistors. The duration of the pulse is controlled largely by the size of the emitter capacitor and of the base inductor.

The circuit also functions with a resistor in place of the base inductor or with the emitter grounded and retaining the base inductor. In both of the latter cases the pulse duration is somewhat less predictable.

The monostable timing circuit differs from the monostable circuit insofar as the monostable circuit is normally in the OFF condition, while the timing circuit is normally in the ON condition. Operation of the timing circuit depends on a diode which holds the emitter slightly positive with respect to the base in the ON condition of the circuit. When the circuit is turned OFF by the trigger input, the base quickly goes positive and stops the emitter current. The diode in the emitter becomes effectively an open circuit and leaves nothing connected to the emitter but the capacitor and a high resistance charging circuit to a positive battery supply. When the capacitor voltage reaches the base voltage the circuit times out to the ON condition.

*Initial condition*

Prior to the application of power, all relays in the system are released, as shown in FIGS. 2 through 20.

Referring now to FIG. 2, when power is first turned on:

(1) Current is supplied from ground to −22 volt supply via the winding of relay 2PFN and resistor R731, operating relay 2—PFN.

(2) Current is supplied from +22 volt supply via a delay network comprising series resistor R727 and shunting capacitor C702 and the winding of relay 2—PFP to ground. The operation of relay 2PFP is thus delayed until after the batteries have built up to their full value.

(3) Capacittor C706 starts charging from +22 volt supply by way of resistor R728.

Figure 19:
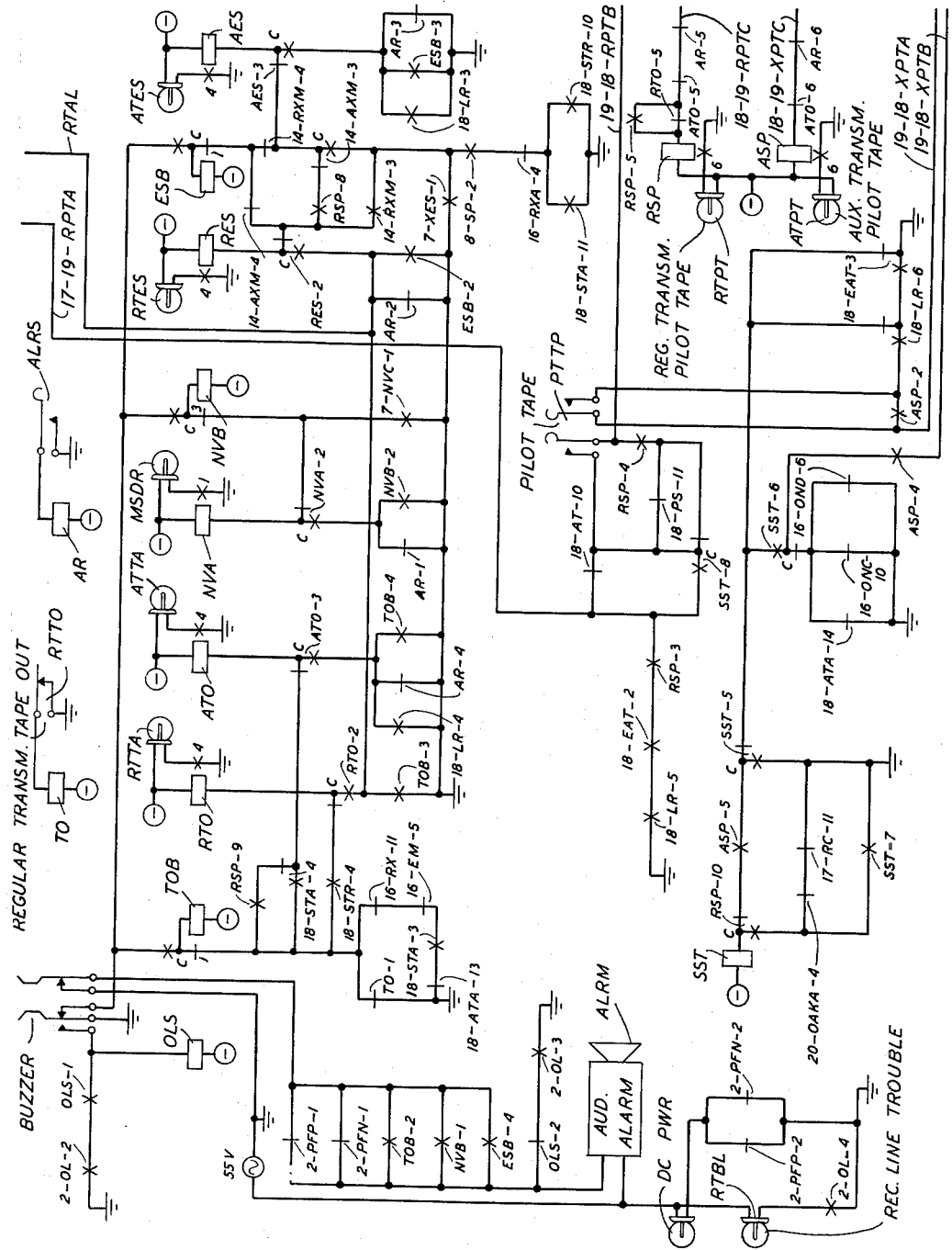

Relay 2—PFN operated:

(1) Opens an energizing path for audible alarm buzzer ALRM, FIG. 19, by way of 55 volt A.C. supply, back contacts of key BUZZER and break contacts 19-2-PFN-1.

(2) Opens an energizing path for the D.C. power lamp DC PWR, FIG. 19, by way of 55 volt A.C. supply, lamp DC PWR and break contacts 19-2-PFN-2.

Relay 2—PFP operated:

(1) Opens an energizing path for buzzer ALRM by way of 55 volt A.C. supply, back contacts of key BUZZER and break contacts 19-2-PFP-1.

(2) Opens an energizing path for lamp DC PWR by way of 55 volt A.C. supply, lamp DC PWR and break contacts 19-2-PFP-2.

(3) Closes a path from −15 volt supply to the windings of relays 7—XP, 7—XR, 7—XST, 7—Q, 7—LKD and 7—NVC, FIG. 7, by way of make contacts 7-2-PFP-4 in preparation for the selective operation of these relays as described in a later section.

Figure 9:
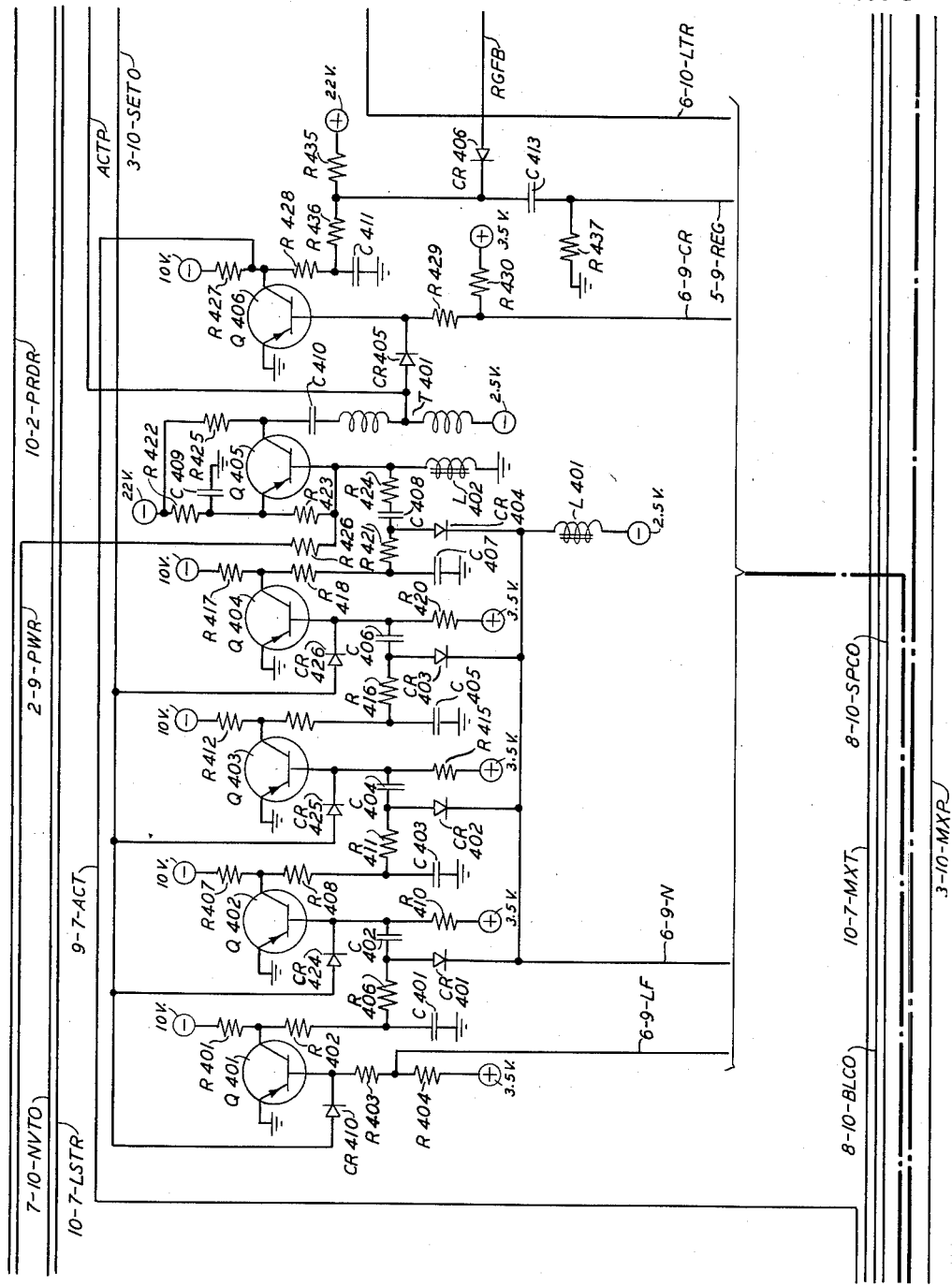

(4) Closes a discharge path for capacitor C706, FIG. 2, to ground via resistor R730 and make contacts 2-PFP-3 thus sending a negative pulse to lead 2-9-PWR via capacitor C707 and resistor R729 for application to transistor Q405, FIG. 9. The purpose of the negative pulse is explained in a following paragraph.

The director

The director registers teletypewriter characters which are significant in station control functions as they appear on the receiving line, combine successive registrations to form significant sequences and direct the remainder of the station control circuitry in the performance of switching functions indicated by these sequences.

The main functional circuit groups in the director are:

(1) A receiving relay to receive line signals and repeat these signals into the registration and control circuitry.

(2) A character timer circuit composed of a start-stop oscillator and transistor circuits to time each character and element length.

(3) A shift register to store each character received so that the character may be registered and then discarded or passed on to the receiving teletypewriter as required.

(4) A code-comparison matrix which has the directory information for this station stored within it.

(5) A sequence pulse circuit to sample and compare each character received.

(6) Various output circuits to control associated relay and teletypewriter equipment.

The receiving relay

Receiving relay 2—REC, in series with the receiving loop of a full duplex line, receives all signals sent on that line. The receiving relay is normally biased for the reception of 60 milliamperes open and close signals. By operation of locking keys REC LP(20) or REC LP(POL), FIG. 2, the relay circuit may be arranged for the reception of 20 milliamperes open and close signals or of polar signals. When the line is in the idle marking condition the relay armature rests on contact 2-REC-1 and connects a source of −15 volts to the input signals lead 2-4-INSG via resistor R720; when the relay is operated to spacing in accordance with input signals, the input signals lead is connected to ground potential by way of contact 2-REC-2 and resistor R721. The lead 2-3-INSG applies the relayed line signals to the character timer circuit and the shift register, FIGS. 3 and 4.

Character timer circuit

The signals on lead 2-4-INSG are presented to the base of bistable transistor Q101, FIG. 3, by way of condenser C622 and varistor CR105 which, due to its connection to the junction of resistors R160 and R155 connected to ground and +11 volt supply, respectively, is biased to block negative-going marking signals and pass positive-going spacing signals. Shunting capacitor C621 is connected to the junction of capacitor C622 and varistor CR105 to filter out any relay chatter. In the idle marking condition, transistor Q101 is ON and the collector voltage is relatively positive. This condition is applied to the emitter of direct-current transistor amplifier Q102 by way of resistor R120. Since the base of transistor Q102 is grounded the transistor is thus made strongly conductive and causes a current flow from the collector of transistor Q102 through inductor L101 to a −5 volt source by way of varistor CR107 and potentiometer R125. This has two effects on the tuned circuit of which inductor L101 and condenser C121 are a part:

(1) The low impedance formed by transistor Q102 and the resultant current flow through inductor L101 prevent oscillations from building up in the tuned circuit.

(2) The actual current flow represents the starting point of the oscillation cycle of the tuned circuit when the stop condition is removed by cutting off transistor Q102.

Starting from the marking idle condition, the spacing-start element of the next received code signal will pass a positive-going pulse to the base of transistor Q101 triggering the transistor OFF. Once triggered OFF transistor Q101 remains OFF until triggered to ON by a pulse from the matrix pulse amplifier, monostable transistor Q108. This action is described in a following paragraph.

When transistor Q101 is triggered OFF at the beginning of the start element of the teletypewriter character, the resulting negative-going change in the voltage at its collector terminal is held or limited to a slightly negative voltage due to the holding effect of varistor CR104. This condition is applied to the element timing pulse lead 3-8-ETP, supplying a negative element timing pulse to transistor Q507, FIG. 8, whose action is described in a later section, and to the emitter of transistor Q102 via resistor R120 turning OFF the transistor, thus causing a drop of the collector voltage of transistor Q102 to a negative value sufficient to cut off the current flow through varistor CR107. In addition, the fixed negative-going change of the collector of transistor Q101, as determined by the holding or limiting action of varistor CR104, is applied to capacitor C102 via resistor R105, setting up a negative charge for capacitor C102 and thereby applying cut-off bias to varistor CR101 via resistor R101 to block any pulses from passing therethrough. Clamping varistor CR102, connected between the junction of capacitor C102 and resistor R101 and ground, supplies a low impedance path to ground for positive-going voltage changes from the collector of transistor Q101 when it is turned ON and determines the charge on capacitor C102 prior to the application of the negative-going voltage change from the collector or transistor Q101.

The circuit arrangement of PNP transistor Q103 is that of an emitter-follower having a voltage gain of approximately unity and a current gain the order of ten or more. The emitter voltage closely follows the voltage input to the base which is based on the −5 volt supply to the tuned circuit and the oscillating voltage across the tuned circuit. Feedback path from the emitter of transistor Q103 to the center tap of inductor L101 via resistor R122, section 2 of manually controlled switch SPD including resistor R112 or R113 for 75 or 100 speed operation and potentiometer R126 supplies in-phase aiding current to inductor L101 to maintain oscillations in the tuned circuit. Potentiometer R126 may be adjusted to maintain contsant amplitude oscillations in the tuned circuit.

With transistor Q102 cut off, cutting off the current flow through varistor CR107, an oscillatory condition is established for the tuned circuit and its associated PNP transistor Q103. The oscillations start from nearly zero voltage across the tuned circuit beginning with the negative half cycle. The frequency of oscillation is manually controlled by two section, three-position switch SPD which determines the 60, 75, or 100 speed of operation when operated to positions 1, 2 or 3, respectively, by adding condensers C119 and C120 in shunt to the tuned circuit vias section 1 of switch SPD.

Oscillation continues at the rate of one cycle per teletypewriter signal element until transistor Q101 is again restored to the ON condition and transistor Q102 cut ON reestablishing the holding current through inductor L101 by way of potentiometer R125 and varistor CR107.

The circuitry associated with direct-current transistor amplifier Q105 makes it normally conductive except when held non-conducting during the negative half cycles by a negative clamp on the emitter derived from the emitter voltage of transistor Q103 by way of varistor CR108. As the emitter voltage of transistor Q103 passes through −5 volts, the base supply potential, in a positive-going direction, varistor CR108 becomes back biased, removing the negative clamp, and transistor Q105 is made suddenly conductive by positive voltage applied to its emitter by the +22 volt supply through resistor R128 producing a positive-going change in the collector voltage. Since the oscillations start with the negative half cycle and are based on −5 volts supply to inductor L101, the poistive-going change at the collector of transistor Q105 occurs at the center of each cycle of oscillation.

The positive-going change in the collector voltage of transistor Q105 is applied to monostable timing transistor Q106 via resistor R132, capacitor C106 and varistor CR111 and is passed via resistor R131 to a limiting and differentiating network comprising series capacitors C105 and C103, shunting varistor CR103 and shunting resistors R102 and R103 and the resulting pulse or pip is applied to the primary winding of transformer T101 via varistor CR101 which is blocked as previously described. Since resistors R102 and R103 are connected to ground and −2.5 volt supply, respectively, and varistor CR103 is connected to ground, the excursion of the pulse or pip is fixed between a base voltage level determined by the voltage divider formed by resistors R102 and R103 and an upper voltage level determined by the limiting action of varistor CR103. This limiting action insures that the peak of the pulse will not be passed by varistor CR101 when it is blocked.

Transistor Q105 is clamped to the OFF condition by way of varistor CR108 shortly after the oscillation goes into the next negative half cycle. This clamping point is not critical since the negative-going change at the collector of transistor Q105 is not used.

As previously described, varistor CR101 is back-biased by the negative-going change from transistor Q101, as fixed by varistor CR104 when the transistor is turned OFF, blocking the positive-going pulses or pips derived from the collector of transistor Q105. Capacitor C102, however, immediately starts to charge toward the cut-on point of varistor CR101 from +90 volt supply by way of section 2 of switch SPD and one of the timing resistors R117, R118 or R119 and the associated potentiometer R114, R115 or R116. The adjustment of this charging circuit is such that the seventh positive-going pulse derived from the collector of transistor Q105 is passed by varistor CR101 into the primary winding of transformer T101 and a resultant negative-going pulse from the secondary winding of transformer T101 is applied to the base of monostable transistor Q107 triggering the transistor to the ON condition. Transistor Q107 remains ON for about 15 microseconds and then self-triggers to OFF. When transistor Q107 turns ON, the positive-going pulse from the collector is passed through capacitor C109 causing a current pulse through the windings of auto-transformer T102 to the junction of the voltage divider formed by resistors R110 and R111. This applies a positive-going set-zero pulse to lead 3–10–SET0 connected to the junction of the windings of auto-transformer T102. Resistor R144 is connected in shunt to the auto-transformer winding connected to the junction of resistors R110 and R111 to dampen any ringing current. The functions of the set-zero pulse are explained in subsequent sections.

When transistor Q107 self-triggers to OFF, the resultant negative transition of the collector voltage is applied by way of capacitor C109, the delay network comprising series resistors R145 and R146 and shunting capacitors C110 and C111 and resistor R147 to the base of monostable transistor Q108, causing it to turn ON. Transistor Q108 remains ON for about ten microseconds and then self-triggers to OFF. The positive-going pulse from the collector of transistor Q108 as it is triggered to ON is passed through condenser C113 causing a current pulse through the primary winding of pulse transformer T103 to ground. This in turn applies a negative-going pulse from the secondary winding of transformer T103 to the matrix pulse lead 3–10–MXP and to the base of transistor Q101 via lead FDBK, capacitor C104 and resistor R106. Transistor Q101 is thus restored to the ON condition in preparation for timing the next character and a matrix pulse, occuring slightly after the termination of the set-zero pulse due to the slight delay brought about by the delay network comprising series resistors R145 and R146 and shunting capacitors C110 and C111, is supplied to the matrix pulse lead and provides various functions described in a later section.

As will be evident from following sections of this description, shift pulses must occur after the set-zero and matrix pulses. The monostable timing circuit associated with transistor Q106 provides a definite delay to insure this time relationship.

Transistor Q106 is triggered to OFF by the positive pulses from the collector of transistor Q105 resulting in a negative-going transition at the collector which is applied to the delay pulse lead 3–8–DYP. Transistor Q106 remains OFF for approximately 75 microseconds while capacitor C107 charges via resistor R136. When the emitter of transistor Q106 reaches the base potential of approximately +3 v., transistor Q106 self-triggers to ON, producing a negative-going transition at the emitter which is differentiated by capacitor C107 and shunting resistor R135 and the resultant negative-going pulse is applied to the base of monostable transistor shift pulse amplifiers Q109 and Q110 via resistors R153 and R158.

Figure 4:
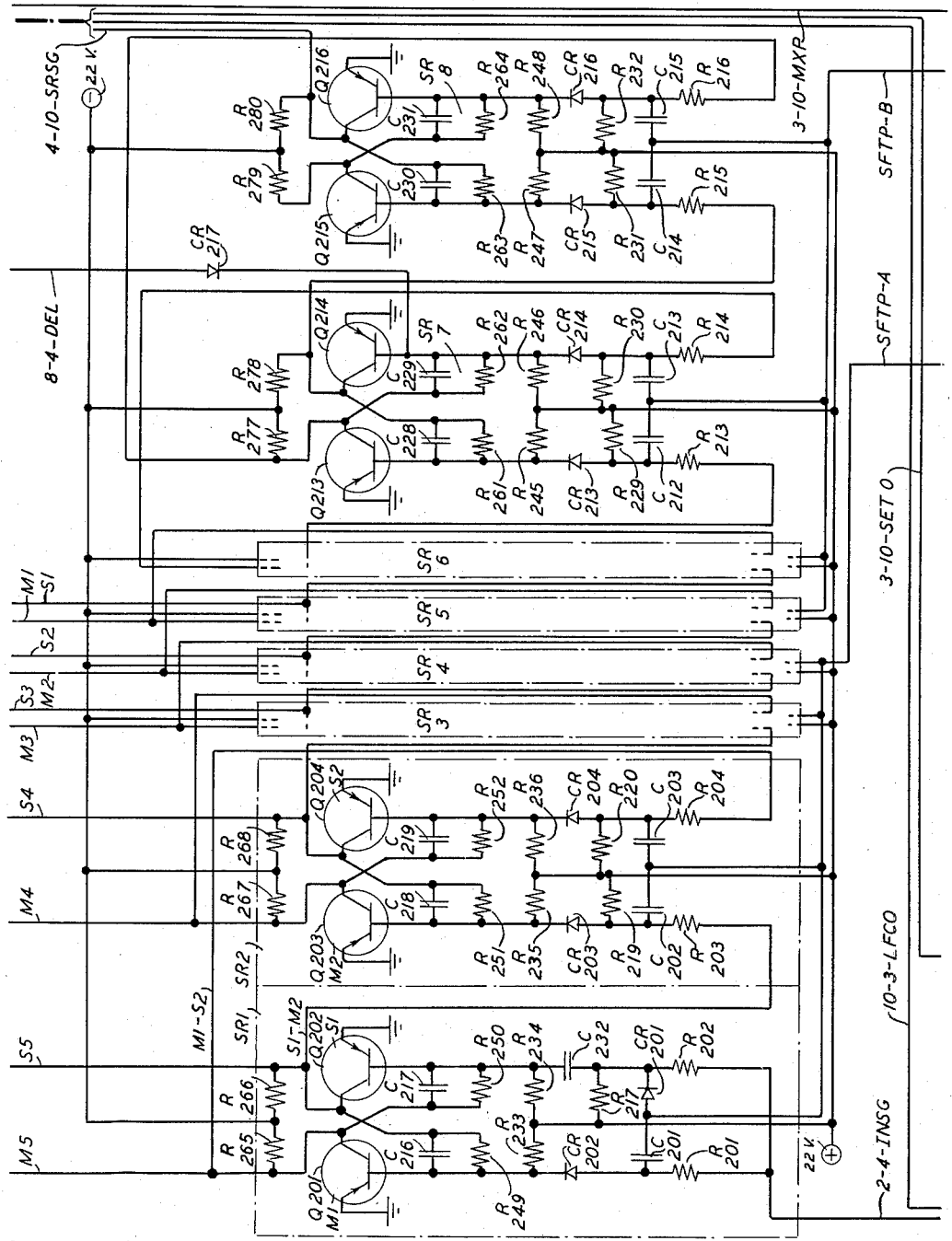

The shift pulse load of the eight stage shift register, FIG. 4, is divided equally between the identical shift pulse transistor amplifiers Q109 and Q110. The negative pulse at the emitter of transistor Q106, applied to the bases of transistors Q109 and Q110, turns transistors Q109 and Q110 ON producing a positive-going pulse at the collectors which are passed through capacitors C116 and C118 causing a current pulse to ground through the windings of auto-transformers T104 and T105. This results in simultaneous positive-going shift pulses on leads SFTP A and SFTP B which are connected to the junction of the windings of autotransformers T104 and T105. Transistors Q109 and Q110 self-trigger to OFF after approximately 30 microseconds.

It should be noted that during the character timing cycle various pulses such as the shift, set-zero, matrix, element timing and delay pulses are generated. The purpose of these pulses is explained in the following paragraphs.

*Shaft register*

The shift register circuit, FIG. 4, provides for storing the elements of each received teletypewriter character, for conditioning a matrix to recognize significant characters and for passing to the receiving teletypewriter, via intermediate circuitry, those characters which should be printed.

The shift register consists of eight stages, SR 1–8, which are identical except for the input gating to stage SR1 and the output arrangement from stage SR8. Each stage of the shift register is a two-transistor bistable circuit. This circuit is related to the single-transistor bistable circuit in that each of its two transistors would be independently bistable except for a cross-coupling from the collector of each transistor to the emitter of the other. This cross-coupling insures that if one of the transistors is OFF the other is ON.

For the purposes of the following description, the two transistors in a shift register stage, for example Q201 and Q202 in stage SR1, are designated M and S. Conduction in the M transistor and cut off in the S transistor is the marking condition of the stage. Under this condition the M transistor collector voltage is approximately −1.5 volts and the S transistor collector voltage is approximately −13.0 volts. Similarly, if the S transistor is conducting and the M transistor is cut off, the stage is in the spacing condition and the M transistor collector voltage is −13.0 volts and the S transistor collector voltage is −1.5 volts.

Since the shift register stage is symmetrical except for minor variations in the first and last stages the following discussion of the marking condition applies, with certain obvious inversions of voltages, to the spacing condition as well.

Assume that in a shift register stage, say SR1, the M1 transistor, Q201, is ON and the S1 transistor, Q202, is OFF. The collector of the M1 transistor is about 1.5 volts negative and, due to the connection with the +22 volt supply via the voltage divider formed by resistors R250 and R234, tends to make the base of the S1 transistor about 5.0 volts positive with respect to the emitter. This is reduced to about +4.0 volts by collector leakage current in the S1 transistor but is sufficient to hold the S1 transistor in the OFF condition which results in a collector voltage of about −13.0 volts. The S1 transistor collector voltage, due to the connection with the +22 volt supply via the voltage divider formed by resistors R249 and R233, tends to make the base of the M1 transistor about 3.0 volts negative with respect to ground; transistor M1 is thus held ON. The actual voltage at the base of transistor M1 when it is ON is, of course, only slightly negative with respect to the emitter due to the flow of base current.

The collector of the M1 transistor, Q201, controls the bias for the varistor gate CR204 to the base of the S2 transistor, Q204, in stage SR2, due to the connection via lead M1—S2, and the voltage divider formed by resistors R204 and R220. Similarly, the collector of the S1 transistor, Q202, controls the bias for the varistor gate CR203 to the base of the M2 transistor, Q203, via lead S1—M2 and the voltage divider formed by resistors R203 and R219. Capacitors C203 and C202 provide a short-term memory of the bias voltages at the junction of the resistors of the voltage dividers. Transistor designations such as M1, S1, M2, S2 should not be confused with the designations of leads going to the diode matrix circuit of FIG. 5. Transistor M1 does not connect to lead M1, for example.

Assuming that stage SR2 is in the spacing condition, the base voltage of transistor M2 is about +4 volts and the base voltage of transistor S2 about −0.5 and, due to the control bias provided by the collectors of transistors M1 and S1, varistor CR204 is forward biased and varistor CR203 is back biased. Under this condition a positive shift pulse from lead SFTP A passes, via capacitor C203 and varistor CR204 to the base of transistor S2 turning it OFF, which in turn forces transistor M2 to ON as previously explained. Thus, the application of a shift pulse has the effect of transferring the condition of stage SR1 into stage SR2. The fact that stage SR1 may also be changed by the same shift pulse does not affect the transfer into stage SR2 because of the transient memory effect of capacitors C202 and C203.

If stage SR2 is marking before the application of a shift pulse, the marking condition is retained since varistor gate CR203 is back biased and thus prevents the shift pulse from setting transistor M2 to OFF. Under this condition the shift pulse which reaches the base of transistor S2 via varistor CR204 is of no importance since transistor S2 is already OFF.

In normal operation the condition of the shift register, just before reception of a teletypewriter character, is marking in stages SR1 and SR8, spacing in stage SR7 and marking or spacing in stages SR2–6 depending upon the teletypewriter character last received.

Setting of stage SR1 to mark or space is controlled by the input signals on lead 2-4-INSG which is connected to the junction of resistors R201 and R202. Operation of the receiving relay to its spacing contact applies ground to the input signals lead, as previously described, and to varistor CR202 by way of resistor R201. This unblocks varistor CR202 since transistor Q201 is conducting and its base is therefore near the ground potential of its emitter. At the same time, varistor CR201 is back biased by the relatively positive signal on the input signals lead due to the connection of the varistor to the junction of resistors R202 and R217 which form a voltage divider between lead 2-4-INSG and the +22-volt supply. Under this condition, the positive shift pulse, which occurs at the center of a theoretically correct start element, is applied to the base of transistor Q201 via condenser C201 and varistor CR202 turning the transistor OFF, but is blocked from the base of transistor Q201 by varistor CR201. As previously described, this causes conduction in transistor Q202 so that stage SR1 is now registering the spacing-start element of the teletypewriter signal.

As previously explained, the wiring between the M and S transistors of each stage and the S and M transistor of the following stage conditions stages SR 2–8 to the register the previous condition of stages SR 1–7 respectively on the occurrence of the shift pulse which reads the start pulse into stage SR1. After each shift pulse the resulting condition of the shift register is maintained until the next shift pulse; that is, for one element length of the teletypewriter character as determined by the timing circuits previously described.

The second to sixth shift pulses cause read-in to stage SR1 in accordance with the teletypewriter character being received. Assuming that the first element of the signal following the spacing-start element is marking, the input signals lead is at −15 volts. Under this condition varistor CR202 is back biased by the signal on the input signals lead and varistor CR201 is forward biased by the input signals lead, via the voltage divider of resistors 202 and 217; hence the positive shift pulse is applied to the base of transistor Q202, via resistor CR201 and capacitor C232, cutting the transistor OFF. As previously explained, this results in conduction in transistor Q201 and thus registers a marking condition in stage SR1. At the same time the previous condition of stages SR 1–7 is shifting into stages SR 2–8.

Assuming now that the second element of the signal following the marking first element is also marking. Under this condition varistor CR201 is forward biased and the shift pulse is applied to the base of transistor Q202. This pulse will have no effect since transistor Q202 is already OFF and stage SR1 thus remains in the marking condition.

After six shift pulses, the five selectable elements of the teletypewriter signal are registered in reverse order in stages SR1–5 and the spacing-start element is registered in stage SR6. The matrix pulse which occurs just before the seventh shift pulse translates the character which is supplied to the matrix circuit by leads M5–1 connected to the collectors of transistors M1–5 and leads S5–1 connected to collectors of transistors S1–5, as explained in a following section.

The seventh shift pulse registers the marking-stop element of the character in stage SR1 returning the shift register to the starting condition in preparation for the reception of the next character. The succeeding seven shift pulses then act to store the next character and in addition successively register the elements of the initial character in stage SR8 for application to the receiver control gate, FIG. 10, via the shift register signals lead 4-10-SRSG. It is to be noted that lead 4-10-SRSG, connected to the collector of transistor Q216, is relatively negative when a marking condition is registered in stage SR8.

A special added feature of changing the registration of stage SR7 from space to mark is provided by the delete lead 8–4–DEL, connected via varistor CR217, to the base of transistor Q214. The need for this feature is explained in a later section.

Matrix for code recognition

It is the function of the matrix circuit to recognize characters which are significant in controlling station operation, and in accordance with this recognition, to pass the matrix pulse to other parts of the director circuitry.

Figure 5:
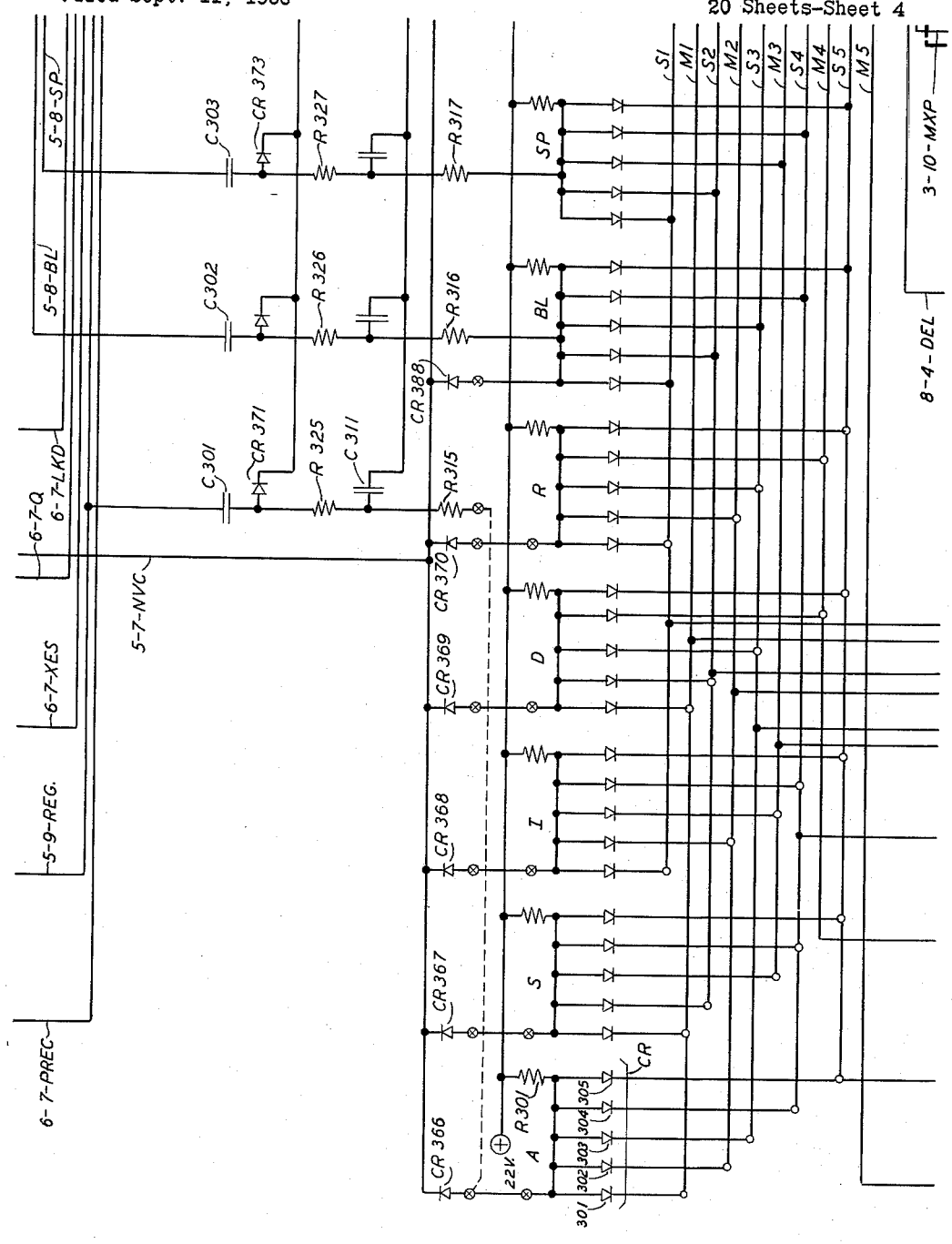
Figure 6:
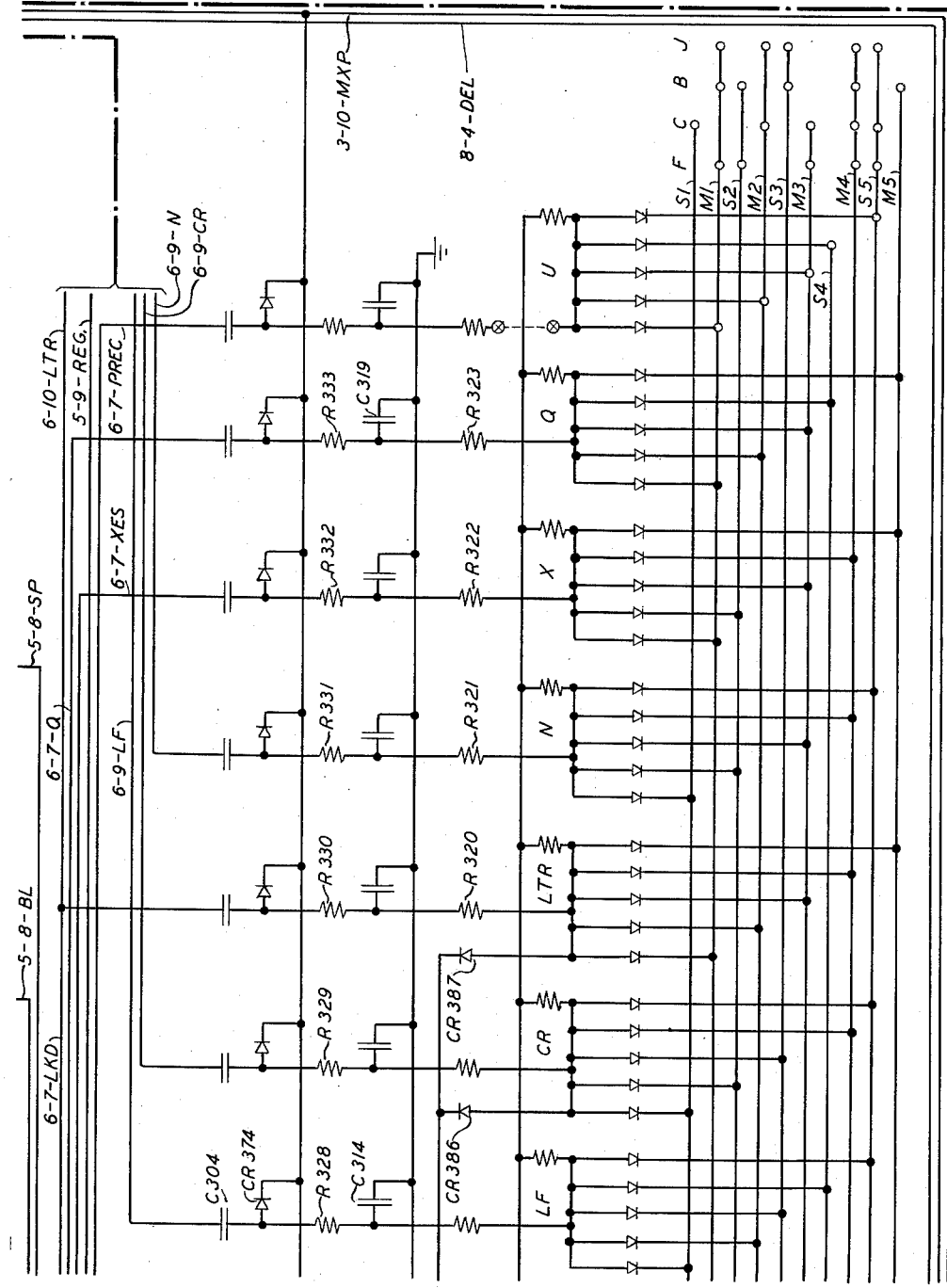

Reception of specific characters is accomplished by a group of five-input combining gates. As shown in FIGS. 5 and 6, each input is connected to the M or S lead from one of the shift register stages SR1–5.

If a shift register stage is in a marking condition the M lead from that stage has a voltage of approximately −1.5 and the S lead has a voltage of approximately −13. If the stage is spacing, the conditions are reversed; that is, the S lead is at −1.5 volts and the M lead is at −13 volts. Thus the input condition to each of the varistors in the gate is either −1.5 or −13 volts.

Since the varistors in the gate are forward biased by a +22 volt supply by way of a common resistor, the output of the gate corresponds to the most negative of any of its input leads; that is, the output of the gate is −13 volts if one or more of the inputs is at −13 volts.

Suppose for example that an A character, which has M, M, S, S, S for its five elements, is registered in stages SR 1–5 of the shift register. It will be observed that under this condition all of the input leads, M1, M2, S3, S4 and S5, to varistors CR301–5 of the A gate are at the relatively positive potential of −1.5 volts. On every other gate, however, at least one input lead is at the relatively negative potential of −13 volts; hence only the output of the A gate, that is, the junction of the A gate varistors and common resistor R301, is at −1.5 volts, all other gate outputs being at −13 volts.

Recognition of the condition of the matrix gates, which involves passing this information to storage circuits, is accomplished by the matrix pulse. It will be recalled from previous discussions that this pulse occurs after the seventh pulse from transistor Q105, FIG. 3, which is driven by the oscillator, but before the seventh shift pulse; that is, at the time stages SR1–5 of the shift register contain the five information elements of the character being received.

Continuing the example of an A character being received, assume that this is the A station of the line. In this case, the output of gate A is connected to resistor R315 and capacitor C311 is charged by the output of gate A by way of resistor R315 and in turn applies bias voltage to gate varistor CR371 by way of resistor R325. Noting that the secondary winding of pulse transformer T103, FIG. 3, is connected to −2.5 volts supply, it is evident that a −1.5 volt charge on capacitor C311, derived from the output of gate A, forward-biases varistor CR371 which is connected between lead 3–10–MXP and the junction of resistor R325 and capacitor C301. Under this condition the negative matrix pulse passes through the varistor and capacitor C301 and is applied over lead 5–9–REG to circuits described in following sections. All other threshold gates are at this time back-biased by approximately 11 volts; hence, the matrix pulse appears only on lead 5–9–REG.

The circuit action in recognizing and registering other significant characters is exactly the same as that just described for the recognition of an A character with the output of BLANK reading gate BL connected to lead 5–8–BL, SPACE reading gate SP connected to lead 5–8–SP, LINE FEED reading gate LF connected to lead 6–9–LF, CARRIAGE RETURN reading gate CR connected to lead 6–9–CR, LETTERS reading gate LTR connected to lead 6–10–LTR and lead 6–7–LKD, N reading gate N connected to lead 6–9–N, gate X connected to lead 6–7–XES, gate Q connected to lead 6–7–Q and, since the character U constitutes the precedence message transmitter cut-on character for station A, gate U connected to lead 6–7–PREC. It is apparent that at station B, where the cut-on characters are B and F, gate B would be connected to lead REG, and a gate F, similar to gate U at station A and connected to the indicated F input lead terminals from the shift register as shown in FIG. 6, would be connected to lead PREC. Stations I, D and R would be wired in a similar manner in accordance with their cut-on characters. The functions of the above-mentioned leads are described in following sections.

The conditions under which the station control circuit is searching for station cut-on codes are described in following paragraphs. Assuming, however, that these conditions exist, one of the valid characters A, S, I, D, R, BLANK CARRIAGE RETURN, or LETTERS should be recognized by the matrix. If none of these codes are recognized, the voltage on the outputs of all of the gates A, S, I, D, R, BL, CR and LTR are relatively negative. These are the inputs to the nonvalid code combining gate formed by varistors CR366, CR367, CR368, CR369, CR370, CR388, CR386 and CR387.

Figure 7:
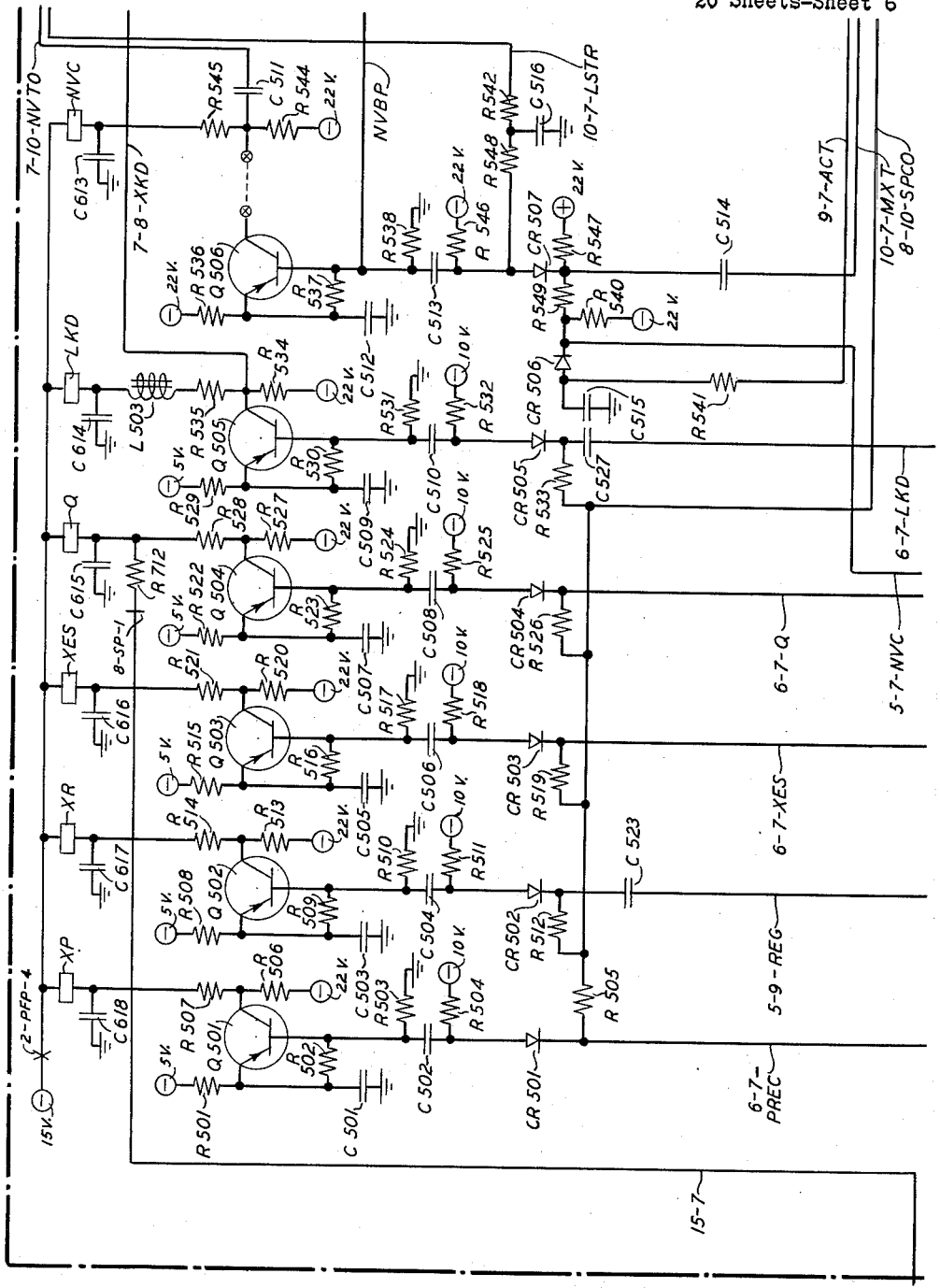

Since the varistors in the combining gate are forward biased by a −22 volt supply by way of common resistor R540, FIG. 7, and lead 5–7–NVC, the nonvalid code combining gate is arranged to have an output on lead 5–7–NVC which corresponds to the most positive of its inputs; hence the output is relatively negative only if all of its inputs are relatively negative. The nonvalid code condition of relatively negative voltage on lead 5–7–NVC conditions one control lead of a two-condition threshold gate so that under proper conditions the station receiver is cut on by the absence of any valid code. This function is described in detail in a following section.

Receiver cut-on

Any one of the characters A, S, I, D, R may be used for turning on the receiving station on a multistation line. One of these call-directing characters is sent as part of the receiver cut-on sequence which consists of one or more sequences of characters such as LETTERS ABC FIGURES 123 LETTERS for turning on one or more station receivers followed by CARRIAGE RETURN, CARRIAGE RETURN, LINE FEED. The first character of the sequence comprises the start-of-sequence character for activating the receiver cut-on circuit. The second character is the receiver cut-on character for turning on a particular receiver. The character A could, for example, be S, I, D or R depending upon which station is to be turned on. The third and fourth characters depend upon the channel identification; they do not perform any supervisory function with respect to the station control circuits.

The next five characters, FIGURES 123 LETTERS, represent the message number for the particular station. This number varies sequentially from 001 to 999 as messages are sent to the station. The final three characters, CARRIAGE RETURN, CARRIAGE RETURN, LINE FEED, represent the end-of-sequence signal for deactivating the receiver cut-on circuit.

In order for the call directing character to be sensed, the director must be in the activate condition. This is accomplished by the end-of-message sequence LINE FEED NNNN at the end of the previous message or by the power being turned on at the start of each day. As previously explained, when power is first turned on, relay 2–PFP is operated sending a negative pulse to lead 2–9–PWR. This pulse is applied to the base of monostable transistor Q405, FIG. 9, by way of resistor R426 turning the transistor ON. The resultant positive transition of the collector is passed through capacitor C410 causing a current pulse to −2.5 volt supply via the windings of autotransformer T401, thus causing a positive pulse to be applied from the junction of the windings of transformer T401 to the base of bistable activate transistor Q406 via varistor CR405 turning the transistor OFF, if it had been previously ON, and to the base of monostable timing transistors Q410 and Q411, FIG. 10, via lead ACTP and varistors CR416 and CR418 switching the timing transistors OFF. The action of the timing transistors will be subsequently described.

Activate transistor Q406 controls activation and deactivation of the receiver cut-on circuits. The turn-on of power as described previously or the sensing of the fourth N of the end-of-message sequence as described in a following paragraph places transistor Q406 in the OFF condition and makes the director sensitive to the reception of call directing codes as hereafter described.

When transistor Q406 is turned OFF, the resultant negative transition of the collector voltage is applied to capacitor C411 via resistor R428. A relatively negative voltage bias is thus applied to the receiver cut-on gate varistor CR406 by way of the junction of resistors R436 and R435 which form a voltage divider between capacitor C411 and +22 volt supply.

As previously explained, the reception of a LETTERS character results in a matrix pulse on lead 6–10–LTR. This negative pulse is passed to the base of bistable transistor Q407, FIG. 10, by way of capacitor C421 and varistor CR421, turning the transistor ON. The resultant positive collector voltage is then applied to capacitor C412 via resistor R432. A relatively positive voltage bias is thus applied to the receiver cut-on gate varistor CR406 by way of the junction of resistors R439 and R438, which form a voltage divider between capacitor C412 and −22 volt supply, and lead RGFB.

With transistor Q407 in the ON condition and transistor Q406 in the OFF condition varistor CR406 is slightly forward biased. If at this time the cut-on code character A for the station is received, a negative matrix pulse appears on lead 5–9–REG and is passed via capacitor C413, varistor CR406, lead RGFB, and capacitor C414 to the base of the bistable receiver control transistor Q408, cutting it ON. This results in a relatively positive collector voltage which is applied to varistor CR413 partially conditioning receiving amplifier transistor Q409 for repeating signals appearing at shift register stage SR8 to the printer drive lead 10–2–PRDR.

Transistor Q407 is turned OFF by the positive set-zero pulse, generated during the character timing cycle for the character succeeding the LETTERS character, which is applied to the base of the transistor from lead 3–10–SET0 by way of varistor CR408. Although the set-zero pulse occurs just prior to the matrix pulse, capacitor C412 acts to memorize or store the positive voltage bias a sufficient length of time to maintain the receiver cut-on gate forward biased until the matrix pulse appears on lead 5–9–REG.

Teletypewriter code combinations appearing sequentially at output stage SR8 of the shift register are applied to the base of PNP junction transistor Q409 from lead 4–10–SRSG by way of varistor CR414 which is one input of a receiver control four-input combining gate. Other inputs of this gate are lead 8–10–BLCO via varistor CR412, lead 8–10–SPCO via varistor CR411 and the above-described output of transistor Q408 applied via varistor CR413 and resistor R450.

The receiver control gate is arranged to apply an output to the base of transistor Q409 corresponding to the most negative of its inputs. When a receiver cut-on is permissible, leads 8–10–BLCO and 8–10–SPCO are relatively positive. The application of control voltages to leads 8–10–BLCO and 8–10–SPCO are described in a following section. Also the reception of LETTERS and a cut-on code cutting ON transistor Q408, as previously described, make the input to varistor CR413 relatively positive; hence, transistor Q409 is cut OFF and ON by relatively positive and negative conditions, respectively, of lead 4–10–SRSG as determined by the output of shift register stage SR8. As previously described, lead 4–10–SRSG is connected to the S transistor of shift register stage SR8 and hence the signaling condition on this lead is −13 volts for the marking condition, −1.5 volts for the spacing condition. From this it follows that transistor Q409 is conducting for a marking condition and cut off for a spacing condition and its collector voltage is relatively positive for marking and relatively negative for spacing; the change from marking to spacing is approximately 20 volts.

The positive and negative transitions of the collector voltage of transistor Q409 are applied to the grid of drive tube V701, FIG. 2, via resistor R601, lead 10–2–PRDR and capacitor C703. Due to the positive bias supplied from the junction of resistors R714 and R715, connected between +105 volt supply and ground, by way of resistor R718, drive tube V701 is normally conducting. A transition from marking to spacing at transistor Q409 results in a negative-going transition at the grid of drive tube V701, cutting off the tube. The following space to mark transition restores the tube to the conductive condition. The time constant of the circuit formed by capacitor C703 and resistor R718 is such that a negative-going mark to space transition will maintain the drive tube cut off for a sufficient time to accurately transmit teletypewriter characters having up to six successive spacing elements.

The plate of drive tube V701 is connected to +105 volt supply via resistor R716, the winding of the selector magnet of the receiving-only teletypewriter ROTTY and resistor R713. Thus, since drive tube V701 is normally conducting the selector magnet is normally energized unless a spacing signal is being received and repeated by transistor Q409.

It should be noted at this point that the receiving amplifier transistor Q409 is enabled while the receiver cut-on character is still in the shift register. Hence, the receiving amplifier will drive the receiving-only teletypewriter and record the cut-on character as the succeeding character of the message is received and "pushes" the receiver cut-on character out of the shift register. All characters following the receiver cut-on character for a particular station are printed at that station including following receiver cut-on sequences if other stations on the line are to be cut on for the same message.

When all desired stations have been cut on to receive the message, the cut-on circuits of all stations must be deactivated to prevent unwanted stations from being connected by cut-on codes contained in the text of the message. This is accomplished by sensing a CARRIAGE RETURN character in the end-of-sequence signal, CARRIAGE RETURN, CARRIAGE RETURN, LINE FEED, which follows the last receiver cut-on sequence.

As previously described, the registration of the elements of the CARRIAGE RETURN signal in the shift register passes the negative matrix pulse to lead 6–9–CR which supplies the negative pulse to the base of transistor Q406 via resistor R429 turning the transistor ON and thus removing the enabling bias from the receiver cut-on gate varistor CR406; hence subsequent signals on lead 5–9–REG are blocked from the receiver control transistor Q408 until the control circuit is again activated.

Once cut on, the receiving printer ROTTY records all subsequent characters until the end-of-message sequence LINE FEED NNNN is received.

The registration of a LINE FEED character in the shift register results in a negative matrix pulse on lead 6–9–LF in a manner previously explained. This negative pulse is applied to the base of bistable transistor Q401, FIG. 9, via resistor R403 triggering the transistor to ON. The resultant positive transition of the collector voltage of transistor Q401 charges capacitor C401 by way of resistor R402 and the positive charge is applied to gate varistor CR401 via resistor R406, forward biasing the gate varistor. The positive set-zero pulse generated during the cycle of the following character is then applied to the base of transistor Q401 from lead 3–10–SET0 via varistor CR410 turning the transistor OFF. The enabling bias for gate varistor CR401 is retained by capacitor C401, however, until the matrix pulse, which follows the set-zero pulse, is applied. If the above-mentioned character following the LINE FEED character is an N, it is now registered in the shift register and the negative matrix pulse is applied to the base of transistor Q402 via lead 6–9–N, enabled gate varistor CR401 and capacitor C402, triggering the transistor to ON. This in turn enables gate varistor CR402 and, following the turn off of transistor Q402 by the set-zero pulse of the following character, transistor Q403 is turned ON if this character is an N thereby enabling gate varistor CR403. In a similar manner, a third N turns ON transistor Q404 and thereby enables gate varistor CR404. The negative matrix pulse for the fourth N now passes through gate varistor CR404 and is applied to the base of monostable transistor Q405, by way of capacitor C408 and resistor R424, triggering transistor Q405 to ON.

As previously described, transistor Q405, when turned ON, triggers activate transistor Q406 to OFF which is the activate condition. As a result of the actions just described, the circuit is in a condition to act upon the next receiver cut-on code and to perform the functions described in preceding paragraphs.

It should be noted that the set-zero pulse is applied to transistors Q401–4 just before the matrix pulse which should read in the next N character and that the enabling of gate varistors CR401–404 is maintained only by the charge on capacitors CR401, CR403, CR405 and CR407. For this reason a break in the end-of-message sequence results in failure to reactivate the circuit. A break in the sequence by the introduction of another line-feed character does, however, retrigger transistor Q401 and, if four additional N characters follow, the reactivate condition is established.

Since the receiving only printer ROTTY is always one character behind the signal on the receiving line, and each character is "pushed" out of the shift register by the succeeding character, the last N character of the end-of-message sequence must be fed out of the shift register by circuit action in order to be printed. This action is provided by transistor Q410, in combination with transistor Q411, FIG. 10.

As previously described, when transistor Q405 is turned ON, the positive pulse thus derived from the junction of the windings of auto-transformer T401 is applied via varistors CR416 and CR418 to the bases of monostable timing transistors Q410 and Q411 triggering them to OFF. Transistor Q410 is arranged to time out to the ON condition in about 40 milliseconds and transistor Q411 is arranged to time out in about 700 milliseconds.

Considering first transistor Q410, the collector of transistor Q410 is connected to the base of character timing transistor Q101 via the last character feed-out lead 10–3–LCFO, capacitor C418 and vairstor CR106.

As transistor Q410 times out, the positive transition of the collector voltage is applied to the base of transistor Q101, via lead 10–3–LCFO, turning OFF transistor Q101 and thereby restarting the character timer cycle. The 40 millisecond timing period of transistor Q410 insures sufficient delay to register the stop pulse of the next to last N character.

With the character timer recycled and the receiving relay on marking, an all marking character is read into the shift register and a matrix pulse appears on the lead 8–10–LTR. This pulse triggers the letters transistor Q407 to ON and thus simulates the registration of a LETTERS signal. This provides for non-valid cut-on of the receiver as covered in a following paragraph.

The last character feed-out cycle is terminated by triggering transistor Q411 to ON. This is accomplished by the negative matrix pulse, generated during the character timer cycle for the simulated LETTERS signal, which is applied from lead 3–10–MXP to the matrix timer pulse lead 10–7–MXT via capacitor C415 and resistor R444 and thence to the base of transistor Q411 via resistor R456, triggering the transistor to ON. Shunting varistor CR409, connected between lead 10–7–MXT and +6 volt supply and shunting resistor R445, connected between lead 10–7–MXT and +22 volt supply function to clamp the upper level of the matrix timer pulse to +6 volts, the base bias for transistor Q411. As transistor Q411 triggers to ON, a positive pulse from the collector of transistor Q411 is applied to the base of the receiver control transistor Q408 via capacitor C420 and varistor CR407. This triggers transistor Q408 to OFF, in turn applying a relatively negative voltage to receiver control gate varistor CR413, thus closing the combining gate through which the receiver amplifier transistor Q409 is being driven and maintaining the transistor ON. This completes the feed-out of the last character and the cut-off of the receiving printer ROTTY to the marking idle condition.

If the receiving teletypewriter is a typing reperforator, a feed-out of tape after each message is provided to permit physical separation of the messages.

Figure 10:
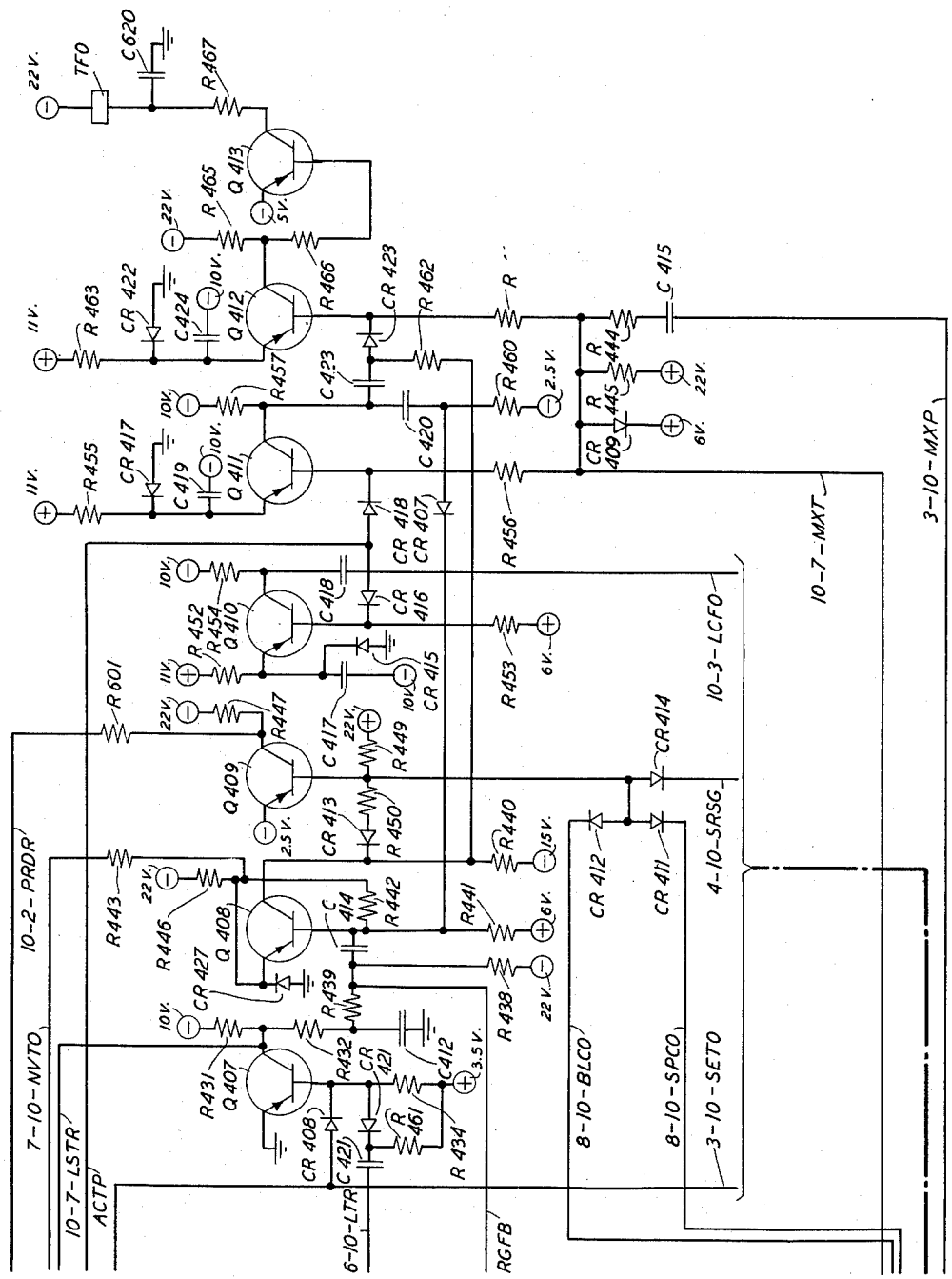

Transistor Q412, FIG. 10, is arranged as a monostable timing circuit with a period of about one second. The timing cycle is started by the positive pulse from transistor Q411 which, when turned ON by the negative matrix timer pulse, terminates the last-character feed-out cycle, via capacitor C423 and varistor CR423 to the base of transistor Q412. As previously described, the pulse is also applied via capacitor C420 and varistor CR407 to the base of transistor Q408 to cut it OFF. The previous ON condition of transistor Q408 and accompanying relative positive controller voltage applied to capacitor C423 via resistor R462 is, however, stored in the form of a charge on capacitor C423 so that varistor CR423 is forward biased long enough, by the stored charge and the negative matrix timer pulse applied from lead 10–7–MXT via resistor R464, to allow the positive pulse from transistor Q411 to turn transistor Q412 OFF. This starts the feed-out timing of approximately one second.

PNP transistor Q413 is base driven from the collector of transistor Q412 via resistor R466. With transistor Q412 in the OFF or timing condition the base voltage of transistor Q413 is relatively negative and the resulting collector current operates relay 10–TFO via resistor R467. The resultant operation of relay 10–TFO completes an obvious energizing circuit for the tape feed magnet, FIG. 2, via make contacts 2–10–TFO–1, causing the reperforator to punch LETTERS characters in the tape.

*Transmitter cut-on*

Transmission from a station is initiated only under the following conditions:

(1) A transmitter start sequence, including the specific transmitter start code for the station, is received.

(2) At least one complete message is available for transmission.

It is a function of the director to recognize condition (1) and to operate relay circuits which initiate transmission if condition (2) exists. The director performs this function without allowing any part of the transmitter start sequence to reach the receiving teletypewriter.

The sequence BLANK, pause, SPACE may be considered the "preamble" of the transmitter start sequence. Registration of a BLANK character in the shift register at any time results in a negative matrix pulse on lead 5–8–BL. This negative pulse is applied to the base of bistable transistor Q508, FIG. 8, via resistor R555, triggering it to ON.

The resultant positive transition of the collector voltage of transistor Q508 is passed to the base of monostable timing transistor Q509, via capacitor C519 and varistor CR510 triggering transistor Q509 to the timing condition of OFF. In addition, the collector of transistor Q508 is connected to gate varistor CR512 via resistor R565, thereby applying a positive bias to the gate varistor enabling the gate to pass positive pulses to the base of transistor Q510 by way of capacitor C521.

Assuming a normal transmitter start sequence transistor Q509 times out to the ON condition in one-fourth second and, because of the positive-going change in collector voltage, triggers monostable timing transistor Q510 to the timing condition of OFF via capacitor C521 and the previously enabled gate varistor CR512.

Transistor Q510 is going OFF:

(1) Closes the receiver-control combining gate by applying a relatively negative voltage from the collector of transistor Q510 to varistor CR412 via lead 8–10–BLCO.

(2) Enables the gate varistor CR513 by applying relatively negative voltage from the collector of transistor Q510 to the varistor via resistor R568.

(3) Causes collector current in PNP transistor Q514 by applying relatively negative voltage from the collector of transistor Q510 to the base of transistor Q514 by way of resistor R582 and varistor CR516, whereby current flows from the collector of transistor Q514 by way of resistor R586 and the winding of relay 8—BP to −22 volt supply operating relay 8—BP.

The negative element timing pulse, generated at the beginning of the character timer cycle of the character which follows the BLANK acts to restore transistor Q508 to OFF. The element timing pulse is applied to the base of monostable transistor Q507 via lead 3–8–ETP and resistor R550, turning transistor Q507 ON. The resultant positive transition of the collector voltage of transistor Q507 is passed to the base of transistor Q508, by way of capacitor C517 and varistor CR508, restoring transistor Q508 to OFF. The positive delay pulse, generated near the end of the character timer cycle of the character which follows the BLANK acts to restore transistor Q509 to the ON condition, if it has not already timed out. The delay pulse is applied to the base of transistor Q509 via lead 3–8–DYP, resistor R561 and resistor R560, restoring transistor Q509 to ON. Thus, if a character follows the BLANK within one-fourth second, both the BLANK and pause registrations are wiped out, and the BLANK will be printed by the receiving-only teletypewriter, assuming the receiving control combining gate was previously open. This condition may arise from a BLANK signal in the text of an enciphered message.

If a SPACE character is not received within 1½ seconds of the BLANK character, transistor Q510 self-triggers back to ON, removing the block on the receiver-control combining gate and cutting OFF transistor Q514 which releases relay 8—BP. This condition might arise from a line hit which registers as a BLANK. The BLANK registration will in this case be wiped out by the next teletypewriter character received, as previously explained.

Assuming that the SPACE character of the transmitter start sequence is received within 1¼ seconds after transistor Q510 is triggered to OFF, bistable transistor Q511 is triggered to ON from the negative matrix pulse on lead 5–8–SP. This path is via the previously enabled gate varistor CR513 and capacitor C522. Transistor Q511 in going ON cuts normally ON, D.-C. transistor amplifier Q512 OFF by applying relatively positive voltage from its collector to the base of transistor Q512.

The resultant negative-going change in the collector voltage of transistor Q512:

(1) Applies a negative pulse to the base of PNP transistor Q513 by way of resistor R579 and capacitor C524 momentarily turning transistor Q513 ON, thus causing momentary current from the collector of the PNP transistor to −22 volt supply by way of resistor R585 and the winding of relay 8—SP, pulsing relay 8—SP.

(2) Applies relatively negative voltage to the base of transistor Q514 by way of resistor R581 and varistor CR515, to keep the transistor conducting and relay 8—BP operated.

(3) Applies negative enabling voltage to gate varistor CR501 in lead 6–7–PREC; gate varistor CR502 in lead 5–9–REG; gate varistor CR503 in lead 6–7–XES; gate varistor CR504 in lead 6–7–Q and gate varistor CR505 in lead 6–7–LKD via lead 8–10–SPCO and resistors R505, R512, R519, R526 and R533, respectively.

(4) Applies negative blocking voltage to the receiver-control-combining gate via lead 8–10–SPCO and varistor CR411.

The matrix pulse which reads the SPACE signal is also applied to the base of transistor Q510 to restore it to the ON condition, via lead 10–7–MXT and resistor R566.

The "preamble" of the transmitter start sequence is followed by specific "action" or transmitter start codes which may or may not require action at a particular station. If action is required at a particular station one of the leads 6–7–PREC, 5–9–REG, 6–7–XES or 6–7–Q from the matrix receives a negative matrix pulse which is applied, respectively, via varistor CR501 and capacitor C502; capacitor C523, varistor CR502 and capacitor C504; varistor CR503 and capacitor C506 or varistor CR504 and capacitor C508 to the base of associated monostable transistor Q501, Q502, Q503 or Q504, turning the transistor ON for a period of approximately 40 milliseconds. The resultant positive-going voltage change of the collector of the transistor pulses relay 7—XP, 7—XR, 7—XES or 7—Q due to the current flow from the collector to −15 volt supply via associated resistor R507, R514, R521 or R528, the relay winding and make contacts 7–2–PFP–4 of operated relay 2—PFP. The functions of these relays and relays 8—BP and 8—SP are described in a following section.

The transmitter start sequence is always terminated by a LETTERS character. This character, when registered in the shift register, results in a matrix pulse on lead 6–7–LKD. This pulse passes through capacitor C527, the previously enabled gate varistor CR505 and capacitor C510 to the base of monostable transistor Q505, turning the transistor ON and resulting in a positive collector current pulse of approximately 25 milliseconds which:

(1) Pulses relay 7—LKD, due to current flow from the collector to −15 volt supply via resistor R535, inductor L503, the winding of relay 7—LKD and make contact 7–2–PFP–4, to perform functions described in a following section.

Figure 8:
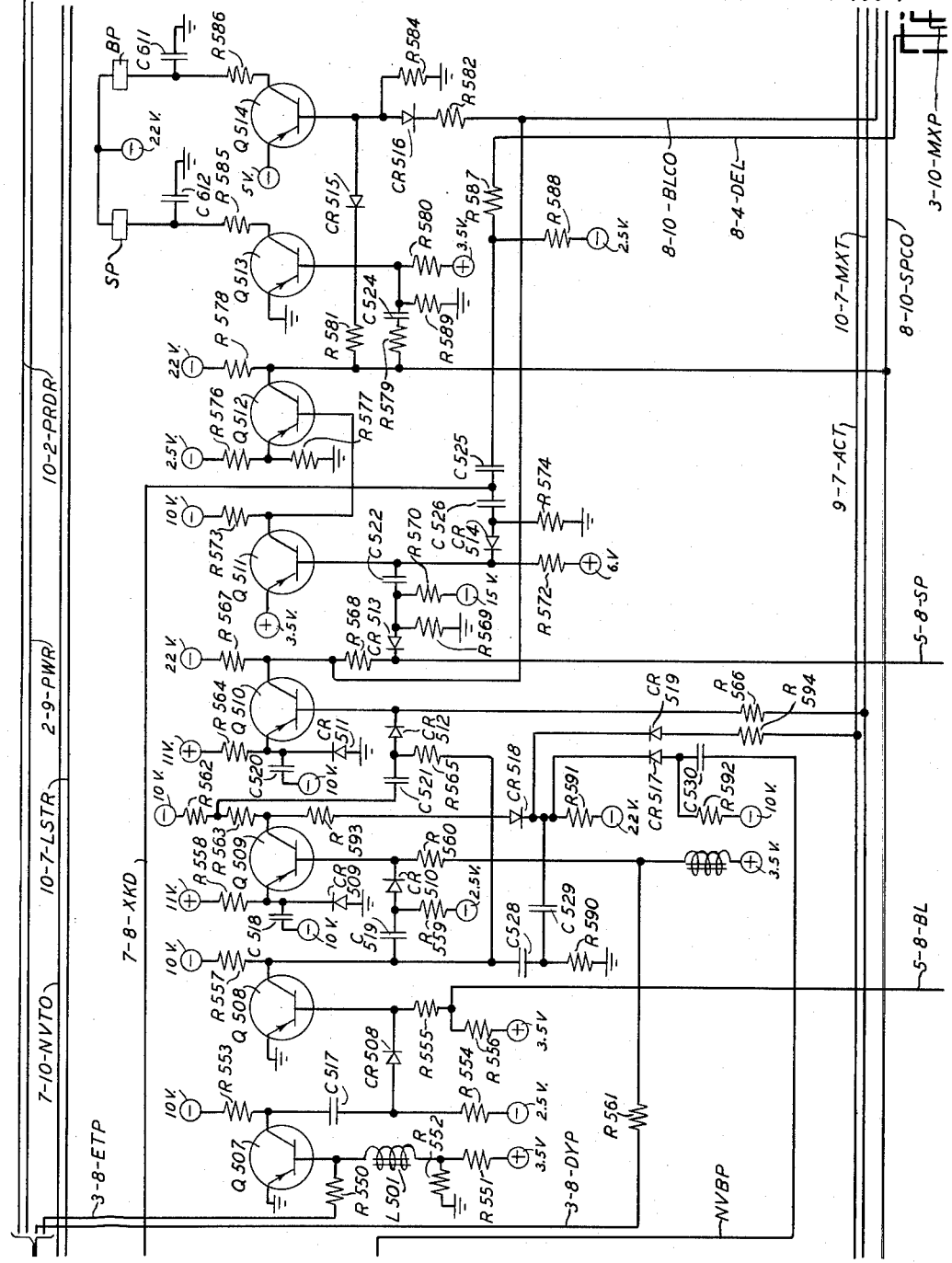

(2) Applies a positive pulse to the base of transistor Q511, FIG. 8, via the transmitter sequence knockdown lead 7–8–XKD, capacitor C526 and varistor CR514, turning the transistor OFF.

(3) Applies a positive pulse to the base of transistor Q214, FIG. 4, in stage SR7 of the shift register to set the stage to marking. The pulse is applied via lead 7–8–XKD, capacitor C525, resistor R587, delete lead 8–4–DEL and varistor CR217.

Recalling that the LETTERS character is registered in stages SR1–5 with the spacing-start pulse in stage SR6 when the matrix pulse "reads" the character, and that the shift pulse occurs within 60 microseconds after the matrix pulse, the timing of the circuit formed by capacitor C525 and shunting resistor R588, connected to −2.5 volt supply, is such that the delete pulse is maintained until after the occurrence of the shift pulse whereby the spacing-start signal, now pushed into stage SR7, is deleted and replaced by a marking signal. With the shift register stage SR7 set to marking, a steady mark of one character length, simulating a marking-idle condition, is read out instead of the LETTERS signal on reception of the next signal.

With transistor Q511 in the OFF condition, transistor Q512 is turned ON and the negative holding voltage is removed from transistor Q514, releasing relay 8—BP. Also, the enabling voltage is removed from the varistor gates in the matrix leads 5–7–PREC, 5–9–REG, 6–7–XST, 6–7–Q and 6–7–LKD and the negative space cut-off voltage is removed from varistor CR411 in the receiver control combining gate. Under this condition the director is restored to the condition which it had just prior to reception of the transmitter-start sequence.

Nonvalid code receiver cut-on

One or more stations on the line may be arranged to receive all messages which are preceded by one or more combinations which are nonvalid for the line by inclusion of a nonvalid recognition circuit.

There are two conditions under which nonvalid cut-on will take place:

(1) The character following a LETTERS signal during a receiver cut-on sequence is not LETTERS or CARRIAGE-RETURN or a BLANK-PAUSE sequence or one of the valid receiver cut-on codes for the line.

(2) The first character in the receiver cut-on sequence is not LETTERS or CARRIAGE-RETURN or a BLANK-PAUSE sequence or one of the valid receiver cut-on codes for the line.

Case 1

The signals LETTERS and CARRIAGE-RETURN must be included in the valid group since two LETTERS characters occur between receiver cut-on groups and a CARRIAGE-RETURN follows the LETTERS character of the last receiver cut-on group. The reason for including the BLANK-PAUSE sequence is given under Case 2.

As explained in connection with the matrix circuit, the potential on lead 5–7–NVC is relatively positive if any of the valid characters, including LETTERS, BLANK and CARRIAGE-RETURN is registered in shift register stages SR1–5. Also, lead 9–7–ACT, connected to lead 5–7–NVC via resistor R541 and varistor CR506, is relatively positive if the circuit is not in the "activate" condition due to the relatively positive collector voltage of transistor Q406 which is ON. The nonvalid code combining gate is, in fact, formed by varistor CR506, FIG. 7, in addition to varistors CR366, CR367, CR368, CR369, CR370, CR388, CR386 and CR387 and lead 9–7–ACT acts as another input branch of the combining gate. Thus, the voltage on lead 5–7–NVC, which corresponds to the most positive of the inputs of the combining gate, will be relatively negative only if there are no valid characters registered in the shift register and the activate transistor Q406 is OFF or in the "activate" state whereby lead 9–7–ACT is relatively negative. With lead 5–7–NVC connected to the junction of resistors R540 and R549, which with resistor R547 form a voltage divider between —22 volt supply and +22 volt supply, the relative negative voltage on lead 5–7–NVC is applied to the nonvalid control gate varistor CR507, partially enabling the nonvalid control gate.

Assuming now that a LETTERS character has just been registered and transistor Q407 cut ON, the letters storage lead 10–7–LSTR has a relatively positive voltage condition due to the relatively positive collector voltage of transistsor Q407. This positive condition, on lead 10–7–LSTR, is applied to the nonvalid code gate varistor CR507, via resistors R542 and R548, partially enabling the nonvalid code gate. The condition of lead 10–7–LSTR will be "remembered" or stored by shunting capacitor C516, connected between the junction of resistors R542 and R548 and ground, for the interval between the set-zero pulse, which turns transistor Q407 OFF, and the matrix pulse, which is the "action" pulse for the nonvalid condition.

With both control leads to the nonvalid code gate in the enable condition, the negative matrix timer pulse, derived from the matrix pulse, is applied to the base of monostable nonvalid code transistor Q506 via lead 10–7–MXT, capacitor C514, enabled gate varistor CR507 and capacitor C513 triggering transistor Q506 to ON and, at the master station, with the collector of transistor Q506 connected to the junction of resistors R544 and R545, the positive-going change produces a positive pulse, via capacitor C511, on the turn-on lead 7–10–NVT0 and, via resistor R545 to relay 7–NVC.

The positive pulse on the turn-on lead 7–10–NVT0 is applied, via resistor R443, FIG. 10, to the emitter of receiver control transistor Q408 triggering it to ON and, in turn, performing the receeiver turn-on previously described.

The positive pulse to relay 7–NVC applies current through the winding of the relay and thence to —15 volt supply via make contact 7–2–PFP–4, pulsing the relay.

Relay 7–NVC operated:

(1) Completes a circuit, as shown in FIG. 19, from ground to negative battery by way of make contacts 19–7–NVC–1, break contact of continuity or make before break contacts 19–NVA–2 and the winding of relay 19–NVA, operating relay 19–NVA.

(2) Completes a circuit from ground via make contacts 19–7–NVC–1, break contact of continuity contacts 19–NVB–3 and the winding of relay 19–NVB to negative battery, operating relay 19–NVB.

Relay 19–NVA operated:

(1) Locks via the make contact of continuity contacts 19–NVA–2 and either the break contact 19–AR–1 of alarm release relay 19–AR or make contact 19–NVB–2.

(2) Completes an obvious energizing path for misdirected message lamp MSDR, via make contact 19–NVA–1, lighting the lamp.

Relay 19–NVB operated:

(1) Locks under control of contacts of key BUZZER, FIG. 19, via make contact of continuity contacts 19–NVB–3.

(2) Supplements the locking path for relay 19–NVA by way of make contact 19–NVB–2.

(2) Completes a path from ground via a back contact of key BUZZER, make contact 19–NVB–1 and the A.C. buzzer ALRM, to 55 volt A.C. supply, energizing the A.C. buzzer.

The functioning of the alarm circuit including the release of the A.C. buzzer is covered in a following section.

Case 2

As previously explained, the action of feeding out the last N of an end-of-message sequence results in triggering the letters transistor Q407 to ON. The registration of a LETTERS signal is thus simulated during each activate period so that the next character received will cut on a master station unless it is one of the valid group. This valid group must include the BLANK-PAUSE sequence since this is part of the "preamble" of the transmitter-start sequence. However, the nonvalid recognition circuit is arranged to recognize the BLANK signal followed without pause by a further character as a nonvalid character. Recalling that lead 9–7–ACT is relatively negative during the activate period and that the reception of a BLANK turns transistor Q508 ON, turning OFF timing transistor Q509, negative bias is applied to gate varistor CR519, FIG. 8, by lead 9–7–ACT via resistor R594 and to gate varistor CR518 by the collector of transistor Q509 via resistor R593 whereby the junction of the two varistors and gate varistor CR517 becomes relatively negative, due to the application of negative voltage from —22 volt supply by way of resistor R591, enabling gate varistor CR517. If a character is now received before transistor Q509 times out to the ON condition, transistor Q508 is turned OFF, as previously described, and the negative-going transition of the collector voltage is applied to the base of nonvalid code transistor Q506 via capacitor C528, capacitor C529, enabled gate varistor CR517, capacitor C530, and the nonvalid blank-pause lead NVBP, turning the transistor Q506 ON. Thus, a BLANK followed without pause by a further character is recognized as nonvalid and a BLANK followed by a proper pause is recognized as valid since the BLANK signal is one of the valid combinations recognized by the matrix circuit.

If a transmitter-start sequence is received during the "activate" condition, the LETTERS signal which terminates it restores the LETTERS registration by triggering transistor Q407 to ON. Since the LETTERS registration exists during the "activate" condition, a nonvalid character at the very beginning of a receiver cut-on sequence will cut-on a master station in the same manner as in Case 1.

In summary, the appearances of a nonvalid code combination during the activate condition of the control circuits cuts on the receiving printer at one or more "master" stations on the line and gives an audible and visual alarm indication that such cut-on has taken place.

*Transmitter control relay circuits*

The major functions of the transmitter control relay circuit are as follows:

(1) To keep a record of the availability of message traffic at the station.

(2) To record the precedence rating of the next message to be transmitted from the regular and from the auxiliary transmitter.

(3) In response to a transmitter start signal from the director, to start transmission of a message if one is available or to start transmission of the no-traffic "H" signal if a message is not available.

(4) To record the wait-interval condition (Q condition) of the switching center when this condition is registered by the director.

(5) To send a request for transmitter polling when traffic becomes available during a wait-interval condition.

(6) To transmit, ahead of each message, the start-of-message sequence, station identification and message serial number.

(7) To provide emergency operation features and various alarm signals such as torn tape, power failure, etc.

*Message counting*

A message is regarded as available in the auxiliary transmitter as soon as tape is present and the tape lid is closed. The end-of-message sequence is read as the tape is transmitted from the auxiliary transmitter and transmission is stopped. Aside from this count of one, no counting is provided for the auxiliary transmitter.

Messages are counted in and out of the regular transmitter by reading the end-of-message sequence LINEFEED NNNN. A message is counted in as the last N is perforated and is counted out as the last N is transmitted.

Figure 17:
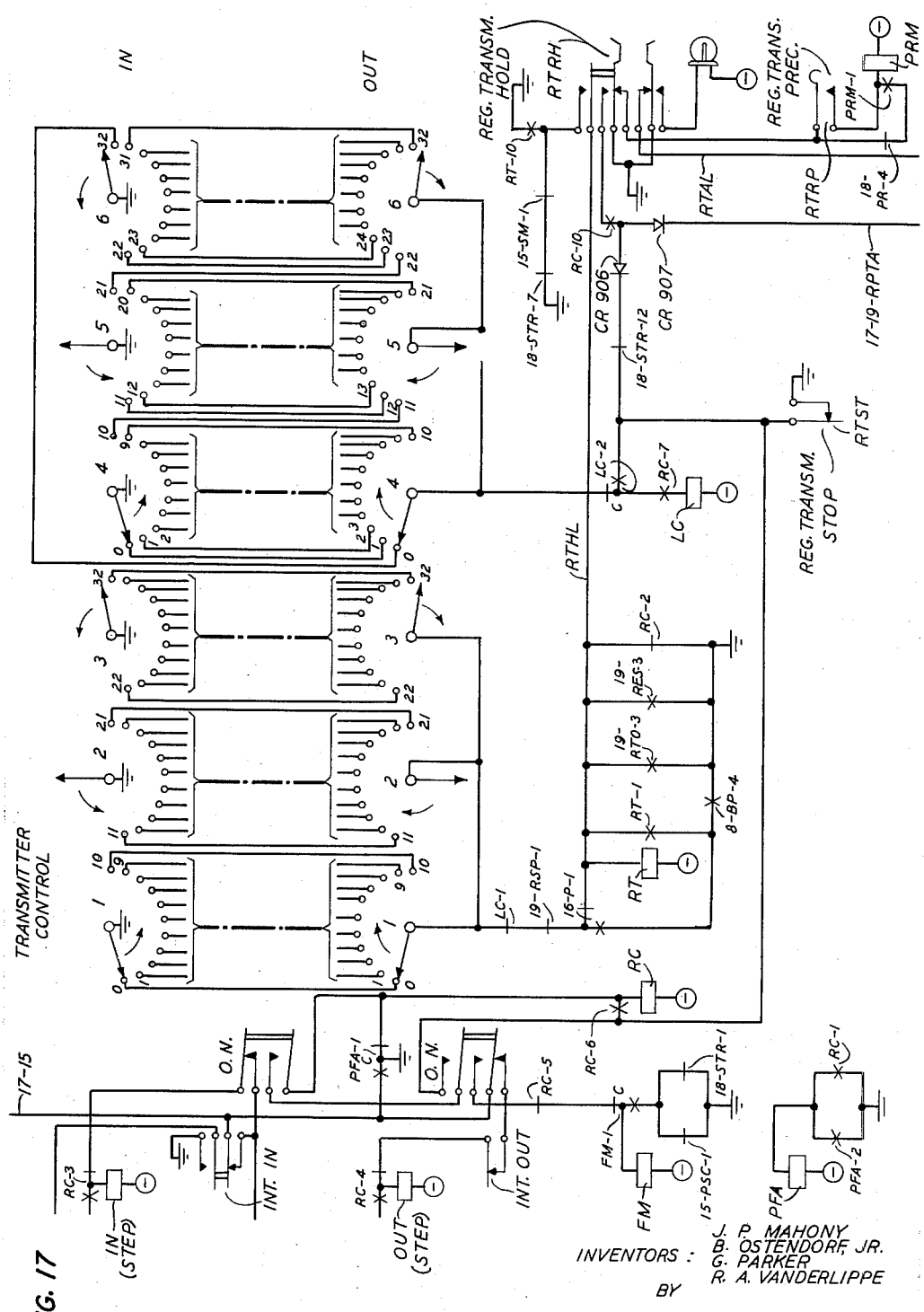

The in and out counts are registered on "step-on-release" selectors IN and OUT, FIG. 17. Each selector has six arcs accommodating thirty-three points or positions each, the six arcs being divided into two banks of three arcs each with the wipers simultaneously sweeping the arcs of each bank. Eleven positions for each arc of the In and Out selectors are shown in FIG. 17 and although the eleven positions, as shown, describe an arc of approximately 180 degrees, it is to be understood that each arc has an additional twenty-two points not shown and the eleven positions shown, in fact, describe an arc of approximately 120 degrees. Thus, it can be seen that the wipers of the selectors consecutively sweep positions 0 through 10, 11 through 21 and 22 through 32 of arcs 1, 2 and 3, respectively and that arcs 4, 5 and 6 of the selectors are similarly arranged. In addition, the In and Out selectors have normally closed interrupter contacts, INT, which operated when the selector step magnets, IN STEP and OUT STEP are energized and off-normal contacts, O.N., normally released as shown in FIG. 17, which operate when the selectors reach their home position, point 32.

In the starting condition as power is turned on, a circuit is completed from ground through break contact of continuity contacts 17–PFA–1 of the power failure relay, 17–PFA, FIG. 17, and the winding of relay 17–RC to negative battery operating relay 17–RC. The operation of relay 17–RC completes an obvious operating circuit for relay 17–PFA via contacts 17–RC–1.

Relay 17–PFA operated:

(1) Sets up an obvious locking circuit via contacts 17–PFA–2.

(2) Breaks the operating circuit for relay 17–RC via the make contact of continuity contacts 17–PFA–1, releasing relay 17–RC if there is no tape in the transmitter, as described subsequently.

Relay 17–RC released:

(1) Completes a circuit, via contacts 17–RC–2, for operating regular transmitter relay 17–RT if relay 17–RT had not been previously operated by a circuit via arc 1, 2 or 3 of the In and Out selectors.

(2) Assuming that the In and Out selectors are not on their home position 32, completes an operating circuit for the In selector step magnet from ground through the make contact of contacts 17–PFA–1, the interrupter contacts and a back contact of off-normal contacts of the In selector, the break contact of transfer contacts 17–RC–3 and the winding of the In selector step magnet to negative battery and completes an operating circuit for the Out selector step magnet from ground through the make contact of contacts 17–PFA–1, a back contact of the off-normal contacts and the interrupter contacts of the Out selector, the break contact of transfer contacts 17–RC–4 and the winding of the Out selector step magnet to negative battery.

Under control of the interrupter contacts, the In and Out selectors self-step to position 32, the home position, whereupon the off-normal contacts operate.

Off-normal contacts operated:

(1) Breaks the self-stepping paths for the In and Out step magnets.

(2) Prepares a path for operating relay 17—RC via front contacts of the In and Out off-normal contacts and the regular transmitter stop contacts RTST, FIG. 17.

(3) Completes a path for operating first-message relay 17—FM from ground to negative battery by way of the make contact of contacts 17–PFA–1, a front contact of the Out selector off-normal contacts, break contacts 17–RC–5 and the break contacts of continuity contacts 17–FM–1 whereupon relay 17—FM sets up a locking circuit via the make contact of continuity contacts 17–FM–1 and either break contacts 17–18–STR–1 or 17–15–PSC–1.

With the first character not yet punched in the tape supplied to the regular transmitter, the pivoted sensing head is against the punch block and the regular transmitter stop contacts RTST are open and relay 17—RC cannot operate. Relay 17—RC operates, however, when the first character is perforated in the tape closing contacts RTST and completing an operating path from ground to negative battery via contacts RTST, the front contacts of the In and Out selector off-normal contacts and the winding of relay 17—RC, setting up a locking path for relay 17—RC via make contacts 17–RC–6. Lost count relay 17—LC is released at this time unless the counting circuit is in a lost count condition as described in a following paragraph. The circuit is now ready to register the end-of-message sequences by stepping the selectors.

With the In and Out selectors both in home position 32, relay 17—RT is held operated by paths set up via arc 3, of the In and Out selectors, break contacts 17–LC–1, break contacts 17–19–RSP–1 and break contacts 17–16–P–1. Relay 17—RT operated is the indication that no traffic is available in the regular transmitter. This holding path for relay 17—RT will be broken when the first message is registered in the In selector. The functions of relay 17—RT will be evident from following paragraphs.

As previously described, when no tape is available in the regular transmitter, relay 17—RC is released, the counting circuit is reset to the home position 32 indicating a 0 count. It is to be noted that this condition will occur any time the regular transmitter runs out of tape as well as in the starting condition. Relay 17—FM will then operate indicating that the pivoted sensing head is against the punch block and that the next message sent from the regular transmitter will be the first of a new in-out counting series.

Whenever 32 messages have been counted in with none having been transmitted, the numerical position of the Out selector exceeds by one the numerical position of the In selector and an operating path is completed from ground via arc 4, 5 or 6 of the In and Out selectors, the break contact of continuity contacts 17–LC–2 and make contacts 17–RC–7, operating relay 17—LC, which locks via the make contact of continuity contacts 17–LC–2 and contacts RTST. With relay 17—LC operated, the operating path for relay 17—RT, via contacts 17–LC–1, is opened and the pulsing paths from the end-of-message relay counters, FIG. 16, to the In and Out step magnets are opened by break contacts 16–17–LC–3 and 16–17–LC–4, disabling all in and out counting and messages are transmitted, without counting, from the regular transmitter until no tape is available whereupon contacts RTST open releasing relays 17—LC and 17—RC and the count is reset to zero as previously described.

Figure 14:
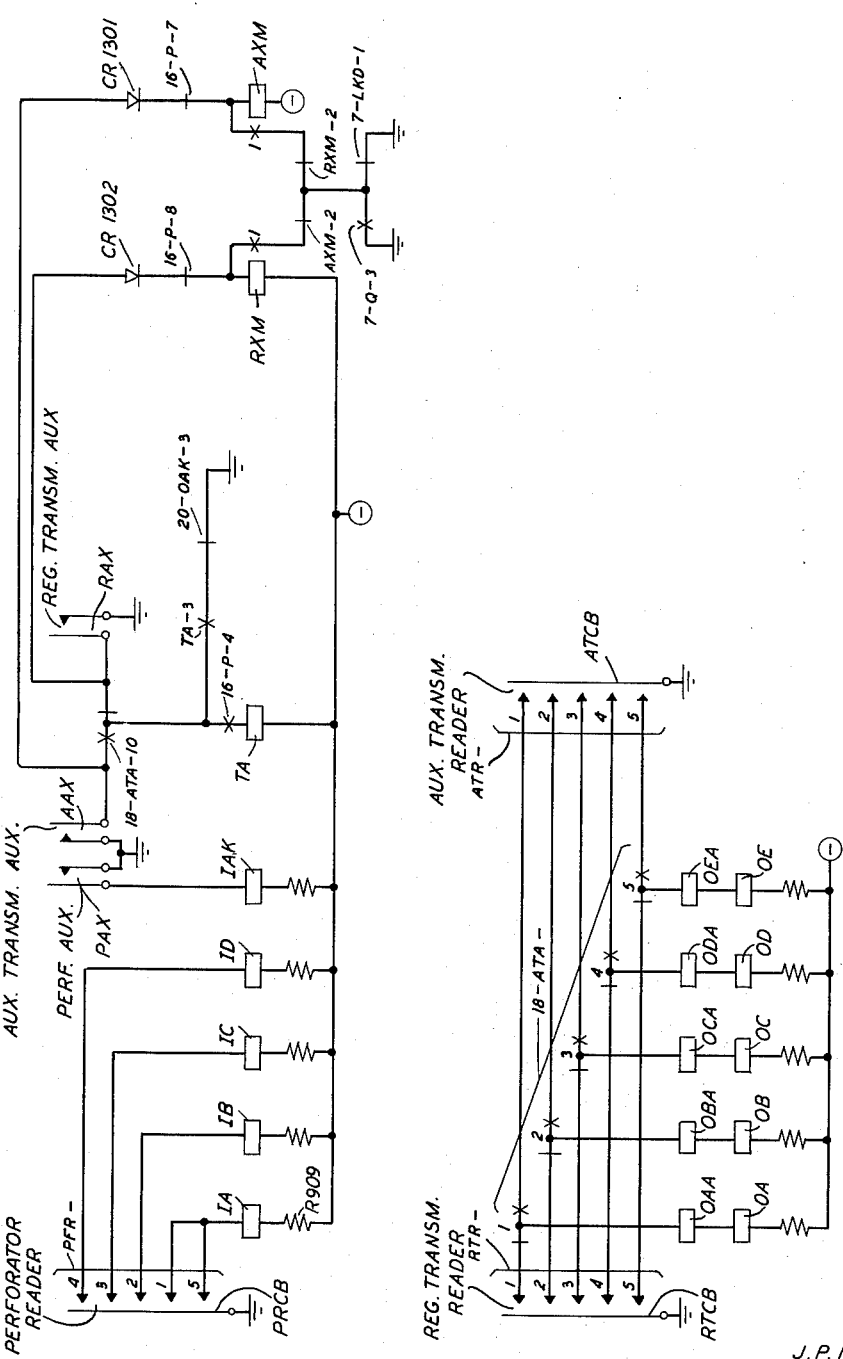

To count in messages in the regular transmitter, relays 14–IA–ID follow the operation of contacts PFR1 through PRF5 of the perforator reader, FIG. 14, which in turn are operated by the key levers of the perforator keyboard. Relay 14–IA operates if the code selection calls for either the first or fifth pulse to be marking due to the operation of contacts PFR1 or PFR5 completing a circuit from ground by way of the common bar of the common bar of the perforator reader, PRCB, contact PFR1 or PFR5, the winding of relay 14–IA and resistor R909 to negative battery; relay 14–IB, 14–IC or 14–ID operate if the code selection calls for the second, third or fourth pulses, respectively, to be marking. Since only the characters LINE-FEED and N are significant, only code selection SMSSS and SSMMS need be detected.

The perforator auxiliary contacts, PAX, close at a time when the perforator reading contacts and associated relays 14–IA–ID are fully positioned, setting up an obvious operating circuit for relay 14–IAK. Contacts PAX open immediately before the release of the perforator reading contacts.

Consider first the LINE-FEED signal; in this case relays 14–IA, 14–IC and 14–ID are released and relay 14–IB is operated. When the perforator auxiliary contacts PAX close, relay 14–IAK is operated and a path is completed from ground through the make contact of continuity contacts 16–14–IAK–1, FIG. 16, break contacts 16–14–IA–1, make contacts 16–14–IB–1, break contacts 16–14–IC–3, 16–14–IC–4, 16–14–ID–3 and 16–14–ID–4 and the winding of relay 16–ILF to negative battery operating relay 16–ILF.

Relay 14–IAK also completes a path for operation of relay 16–ICK, from ground via the make contact of continuity contacts 16–14–IAK–1, the winding of relay 16–ICK and resistors R814 and R806 to negative battery, but relay 16–ICK performs no function at this time unless relay INA, INB or INC is operated, as subsequently described.

The perforator reader contacts and the perforator auxiliary contact subsequently release, releasing relays 14–IB, 14–IAK and 16–ICK, thus opening the operating circuit for relay 16–ILF. Relay 16–ILF is maintained operated, however, by a holding circuit by way of make contacts 16–ILF–1, break contacts 16–INA–1 and the break contact of continuity contacts 16–14–IAK–1.

If the N key is next operated, contacts OFR3 and 4 of the perforator reader are operated, thus operating relays 14–IC and 14–ID. When relay 14–IAK operates, a path is closed for operation of relay 16–INA from ground, by way of the make contact of continuity contacts 16–14–IAK–1, contacts 16–14–IA–1, 16–14–IB–2, 16–14–IC–1, 16–14–IC–2, 16–14–ID–1 and 16–14–ID–2, lead IN N-PULSE, the break contact of transfer contacts 16–INC–4, the make contact of transfer contacts 16–ILF–2, break contact of continuity contacts 16–INA–2 and the winding of relay 16–INA to negative battery and relay 16–INA locks by way of a path via the make contact of continuity contacts 16–INA–2, the break contact of transfer contacts 16–INC–5, the break contact of continuity contacts 16–INB–1, break contacts 16–ICK–1, the interrupter contacts of the In selector, FIG. 17, and the make contact of continuity contacts 17–1PFA–1. Relay 16–ICK is prevented from operating at this time by the ground on lead IN N-PULSE applied to the junction of resistors R814 and R806 by way of varistor CR801.

The operation of relay 14–IAK also opens the holding circuit for relay 16–ILF via the break contact of continuity contacts 16–14–IAK–1. Relay 16–ILF is maintained operated, however, by ground on lead IN N-PULSE applied by way of varistor CR802 and contact 16–ILF–1 to the winding of relay 16–ILF.

When the perforator auxiliary contacts PAX open and relay 14–IAK releases, the ground is removed from the IN N-PULSE lead and relay 16–ILF releases, completing a path from the IN N-PULSE lead to relay 16–INB via the break contact of transfer contacts 16–INC–4, break contact of transfer contacts 16–ILF–2, make contact of transfer contacts 16–INA–3 and break contact of continuity contacts 16–INB–2.

If the N key lever is again operated, relay 16–INB is operated by the ground on lead IN N-PULSE, and locks via the make contact of continuity contacts 16–INB–2, break contact of continuity contacts 16–INC–1, contacts 16–ICK–1, the interrupter contacts of the IN selector and make contact of contacts 17–PFA–1. With relay 16–INB operated, a holding path to the IN N-PULSE lead is completed for relay 16–INA, via the make contact of continuity contacts 16–INB–1, and the holding path for relay 16–INA, via the break contact of contacts 16–INB–1, is opened. In addition, a shunt path around the break contact of contacts 16–INC–4 is completed via make contacts 16–INB–4, and a possible operating path for relay 16–INA is opened via contacts 16–INB–5. Relay 16–ICK is again prevented from operating by ground on the shunt-down path via varistor CR801.

When relay 14–IAK releases at the end of the perforator auxiliary contact PAX closure, relay 16–INA releases and prepares a path for the operation of relay 16–INC via the break contact of transfer contacts 16–INA–3, make contacts 16–INB–3 and the break contact of continuity contacts 16–INC–2 to the winding of relay 16–INC.

16–INC is operated in a similar manner by the third N character.

Relay 16–INC operated:

(1) Locks via the make contact of continuity contacts 16–INC–2, contacts 16–INC–1, the interrupter contacts of the In selector and the make contact of continuity contacts 17–PFA–1.

(2) Prepares a self-holding path from the IN N-PULSE lead via the make contact of continuity contacts 16–INC–1, varistor CR804 and the make contact of continuity contacts 16–INC–2.

(3) Transfers the locking path for relay 16–INB to the IN N-PULSE lead via the make contacts 16–INC–1.

(4) Partially prepares an energizing path for the In selector step magnet via make contacts 16–INC–3.

(5) Opens one operating path for relays 16–INA, 16–INB and 16–INC via the break contact of transfer contacts 16–INC–4 and partially closes an operating path for relay 16–INA via the make contact of contacts 16–INC–4.

(6) Opens a locking path for relay 16–INA via the break contact of transfer contacts 16–INC–5 and closes a locking path for relay 16–INA via the make contact of contacts 16–INC–5.

On the release of relay 14–IAK relay 16–INB releases, completing the path from lead IN N-PULSE to relay 16–INA via contacts 16–INB–5 and opening the shunt path, via contacts 16–INB–4, around the break contact of transfer contacts 16–INC–4. Thus the fourth N pulse will apply ground to relay 16–INA and operate the relay.

Relay 16–INA operated:

(1) Locks via the make contact of continuity contacts 16–INA–2 and the make contact of transfer contacts 16–INC–5.

(2) Completes a path, via varistor CR803 and contacts 16–INA–4, shunting the winding of relay 16–INC, making relay 16–INC slow-to-release.

(3) Completes an energizing path from ground by way of contacts 16–INC–3, 16–INA–5 and 16–17–LC–3, the make contact of transfer contacts 17–RC–3 and the winding of the In selector step magnet to negative battery since relays 17–LC and 17–RC are released and operated, respectively, as described heretofore.

With the step magnet energized, the In selector interrupter contacts operate, opening the previously described locking path for relay 16–INC and completing a supplementary path from ground to the previously described energizing circuit for the In selector step magnet via a back contact of the interrupter contacts which shunts make contacts 16–INC–3. The release of relay 14–IAK opens the previously described self-holding path for relay 16–INC and, with both the locking and self-holding paths open, relay 16–INC slowly releases, opening the locking path for relay 16–INA. The resultant release of relay 16–INA opens the energizing path for the In selector step magnet, via contacts 16–INA–5, causing the In selector to step.

It should be noted that if the end-of-message sequence is broken at any point by the appearance of any character other than N, the cycle is broken by the operation of relay 16–ICK, opening the locking circuits of relays 16–INA, 16–INB and 16–INC via contacts 16–ICK–1. If a second LINE FEED appears before the N character, the line feed relay, 16–ILF, remains operated. If, a LINE FEED appears after relay 16–INA, 16–INB or 16–INC is operated, relay 16–ICK operates to release the last relay operated and at the same time relay 16–ILF operates as previously described. Relay 16–ILF is thus reoperated and locked, but four additional N characters are required to complete the end-of-message sequence and step the IN selector.

The count-out circuit is very similar to the count-in circuit just described. The count-out circuit, however, has the additional functions of reading LETTERS characters. This function is described in a later paragraph. As described hereafter:

(1) Relays 18–AT and 18–ATA are operated when the auxiliary transmitter is in use and are released when the regular transmitter is sending.

(2) Relays 16–RX and 16–RXA are operated during the "letters discard" condition that exists after the end-of-message sequence is transmitted.

(3) Relay 18–STR is operated when the regular transmitter is in use.

With relay 18–ATA released, operating circuits for relays 14–OA through E and 14–OAA through EA are set up, via the break contact of transfer contacts 14–18–ATA–1 through 5, by the operations of the regular transmitter reading contacts RTR1–5, FIG. 14, which apply ground to the operating circuits by way of common bar RTCB. The contacts RTR1–5 are in turn positioned in accordance with each set of perforations sensed in the message tape. With relay 18–ATA operated, operating circuits for relays 14–OA to E and 14–OAA to EA are set up, via the make contact of transfer contacts 14–18–ATA–1 through 5 according to the perforations sensed by the auxiliary transmitter reading sensing pins which operate contacts ATR1–5, FIG. 14, to grounded bar ATCB. Relays 14–OA to E provide the count-out reading circuit for the characters LINE FEED and N when relays 16–RX and 16–RXA are released and a reading circuit for LETTERS when relays 16–RX and 16–RXA are operated with relay 14–OB operated by a sensed LINE FEED, relays 14–OC and 14–OD operated by a sensed N and relays 14–OA to E, inclusive, operated by a sensed LETTERS.

The count-out reading pulse is supplied from ground via the make contacts of continuity contacts 16–20–OAK–1 of relay 20–OAK. Relay 20–OAK is operated by the closure of make contacts 20–OAKA, as subsequently described, during the count-out period near the termination of the transmitter shaft revolution when the reading contacts are fully positioned and released near the start of the transmitter shaft revolution.

When relays 16–RX and 16–RXA are released and a LINE FEED is read in the message tape, ground is supplied, by the operation of relay 20–OAK, to relay 16–OLF by way of the make contact of continuity contacts of 16–20–OAK–1, break contacts 16–14–OA–1, the break contact of transfer contacts 16–RX–1, break contacts 16–14–OE–1, 16–RX–2 and make contacts 16–14–OB–2, the break contact of transfer contacts 16–RX–3, break contacts 16–14–OC–3 and 16–14–OC–4, the break contact of transfer contacts 16–RX–4, break contacts 16–14–OD–3 and 16–14–OD–4 and the break contact of transfer contacts 16–RX–5, operating relay 16–OLF. At this time a circuit is also completed from ground via the make contact of continuity contacts 16–20–OAK–1 through the winding of relay 16–OCK and resistors R813 and R812 to negative battery operating relay 16–OCK, but the relay performs no function at this time unless relay ONA, OND or ONC is operated, as subsequently decribed. The operating circuit for relay 16–OLF is broken by the release of relay 20–OAK. Relay 16–OLF is maintained operated, however, by a locking circuit by way of contacts 16–OLF–1 and 16–ONA–1 and the break contact of continuity contacts 16–20–OAK–1. Relay 16–OCK releases upon the release of relay 20–OAK.

If the next sensed character is an N, relay 14–OB releases and relays 14–OC and 14–OD operate and when relay 20–OAK operates, a path is completed from ground by way of the make contact of continuity contacts 16–20–OAK–1, contacts 16–14–OA–1, the break contact of transfer contacts 16–RX–1, contacts 16–14–OE–1, 16–RX–2 and 16–14–OB–4, the break contact of transfer contacts 16–RX–6, contacts 16–14–OC–1, 16–14–OC–2, 16–14–OD–1 and 16–4–OD–2 and the break contact of transfer contacts 16–RX–7 to the Out N-Pulse lead and thence via the make contact of transfer contacts 16–OLF–2, the break contact of continuity contacts 16–ONA–2 and the winding of relay 16–ONA to negative battery, operating relay 16–ONA. Relay 16–OCK does not operate at this time due to the application of ground from the Out N-PULSE lead to the junction of resistors R813 and R812 via varistor CR805.

Relay 16–ONA operated:

(1) Sets up a locking circuit via the make contact of continuity contacts 16–ONA–2, the break contact of continuity contact 16–ONB–1, contacts 16–OCK–1 and, in the case where the regular transmitter is in use, the break contact of transfer contacts 16–18–ATA–6 and contacts 16–18–STR–2 or, in the case where the auxiliary transmitter is in use, the make contact of transfer contacts 16–18–ATA–6.

(2) Breaks the locking circuit for relay 16–OLD via contacts 16–ONA–1. Relay 16–OLF is maintained energized, however, by ground on the Out N-PULSE lead applied to the relay by way of varistor CR806 and contacts 16–OLF–1.

The subsequent release of relay 20—OAK removes the ground on lead Out N-PULSE and relay 16—OLF releases. If the subsequent sensed character is the second N, relays 14—OC and 14—OD remain operated and the ground on lead Out N-PULSE, upon the operation of relay 20—OAK, is applied to relay 16—ONB via the break contacts of transfer contacts 16–OLF–2, the make contact of transfer contacts 16–ONA–3 and the break contact of continuity contacts 16–ONB–2, operating relay 16–ONB.

Relay 16—ONB operated:

(1) Sets up a locking circuit via the make contact of continuity contacts 16–ONB–2 and the break contact of continuity contacts 16–ONC–1.

(2) Transfers the holding circuit for relay 16–ONA, via the break contact of continuity contacts 16–ONB–1, to the Out N-PULSE lead via the make contact of continuity contacts 16–ONB–1.

The subsequent release of relay 20—OAK releases relay 16—ONA and, if the subsequent character is the third N, ground on lead Out N-PULSE is applied to relay 16—ONC by way of the break contact of transfer contacts 16–ONA–3, the make contact of transfer contacts 16–ONB–3 and the break contact of continuity contacts 16–ONC–2. The resultant operation of relay 16—ONC prepares a locking circuit via the make contact of continuity contacts 16–ONC–2 and the break contact of continuity contacts 16–OND–1 and transfers the holding circuit for relay 16—ONB to lead Out N-PULSE via the make contact of continuity contacts 16–ONC–1. The subsequent release of relay 20—OAK then releases relay 16—ONB.

If the subsequently sensed character is the fourth N, ground on lead Out N-PULSE is applied to relay 16—OND via the break contact of transfer contacts 16–ONB–3, contacts 16–ONC–3 and the break contact of continuity contacts 16–OND–2. The resultant operation of relay 16—OND prepares a locking circuit via the make contact of continuity contacts 16–OND–2 and transfers the holding circuit for relay 16—ONC to the Out N-PULSE lead via the make contact of continuity contacts 16–OND–1. The subsequent release of relay 20—OAK then releases relay 16—ONC.

In addition, assuming that the regular transmitter is in use and relay 17—LC is released and relay 17—RC is operated, as previously described, the ground on lead Out N-PULSE resulting from the sensing of the fourth N, is applied to the Out selector step magnet via contacts 16–18–AT–1 and 16–17–LC–4 and the make contact of transfer contacts 17–RC–4, energizing the Out selector step magnet. The subsequent release of relay 20—OAK, in addition to releasing relay 16—ONC, releases the Out selector step magnet stepping the Out selector.

As described in a subsequent section, relay 16—OND is subsequently released by either the release of relay 18—ATA, the release of relay 18—STR or the operation of relay 16—OCK.

If the sequence of N characters is broken by the appearance of any other character, relay 16—OCK is operated breaking the holding circuits for relays 16—ONA–D via contact 16–OCK–1 and releasing the operated relay. If the character is a LINE FEED, relay 16—OLF is reoperated, but four additional N characters are required to complete the count of the end-of-message sequence.

*Starting the regular transmitter—Non-precedence poll*

As previously explained, relay 8—BP is operated as soon as the "pause" of the transmitter start sequence has exceeded ¼ second.

Relay 8—BP operated:

(1) Prepares a possible locking path for relays 16—RX and 16—RXA via make contacts 16–8–BP–1.

(2) Opens the operating path for relay 15—RXC via contacts 15–8–BP–2.

(3) Closes a locking path for relay 16—EM via contacts 16–8–BP–3.

(4) Closes a locking path for relay 17—RT via contacts 17–RT–1 and 17–8–BP–4. This prevents the release of relay 17—RT if a message becomes available in the regular transmitter during the station polling cycle.

(5) Establishes an obvious operating path for relay 15—SM via make contacts 15–8–BP–5, operating start-of-message relay 15–SM.

Relay 15—SM operated:

(1) Opens a possible operating path for relay 17—RT via contacts 17–15–SM–1.

(2) Opens a possible operating path for relays 18—AT and 18—ATA via contacts 18–15–SM–2.

(3) Partially closes a possible holding path for relays 18—AT and 18—ATA via contatcs 18–15–SM–3.

(4) Opens a possible operating path for the auxiliary transmitter clutch magnet, FIG. 20, via contacts 20–15–SM–4.

(5) Opens a possible operating path for relay 15—HB via contacts 15–SM–5.

(6) Opens a possible operating path for relays 15—SN and 15—SNC via contacts 15–SM–6.

As the SPACE of the transmitter start pattern is received, relay 8—SP pulses as previously explained.

Relay 8—SP, while operated:

(1) Opens the locking path for relay 7—Q via contacts 7–8–SP–1.

(2) Partially closes a possible operating path for relays 19—RES, 19—AES and 19—ESB via contacts 19–8–SP–2.

(3) Opens a possible locking path for relay 15—RXC via contacts 15–8–SP–3.

(4) Opens the locking paths for relays 15—NPM and 15–PPM via contacts 15–8–SP–4.

The functions of relays 16—RX, 16—RXA, 15—RXC, 16—EM, 18—AT, 18—ATA, 15—HB, 15—SN, 15—SNC, 7—Q, 19—RES, 19—AES, 19—ESB, 15—NPM and 15—PPM will be described subsequently.

Figure 13:
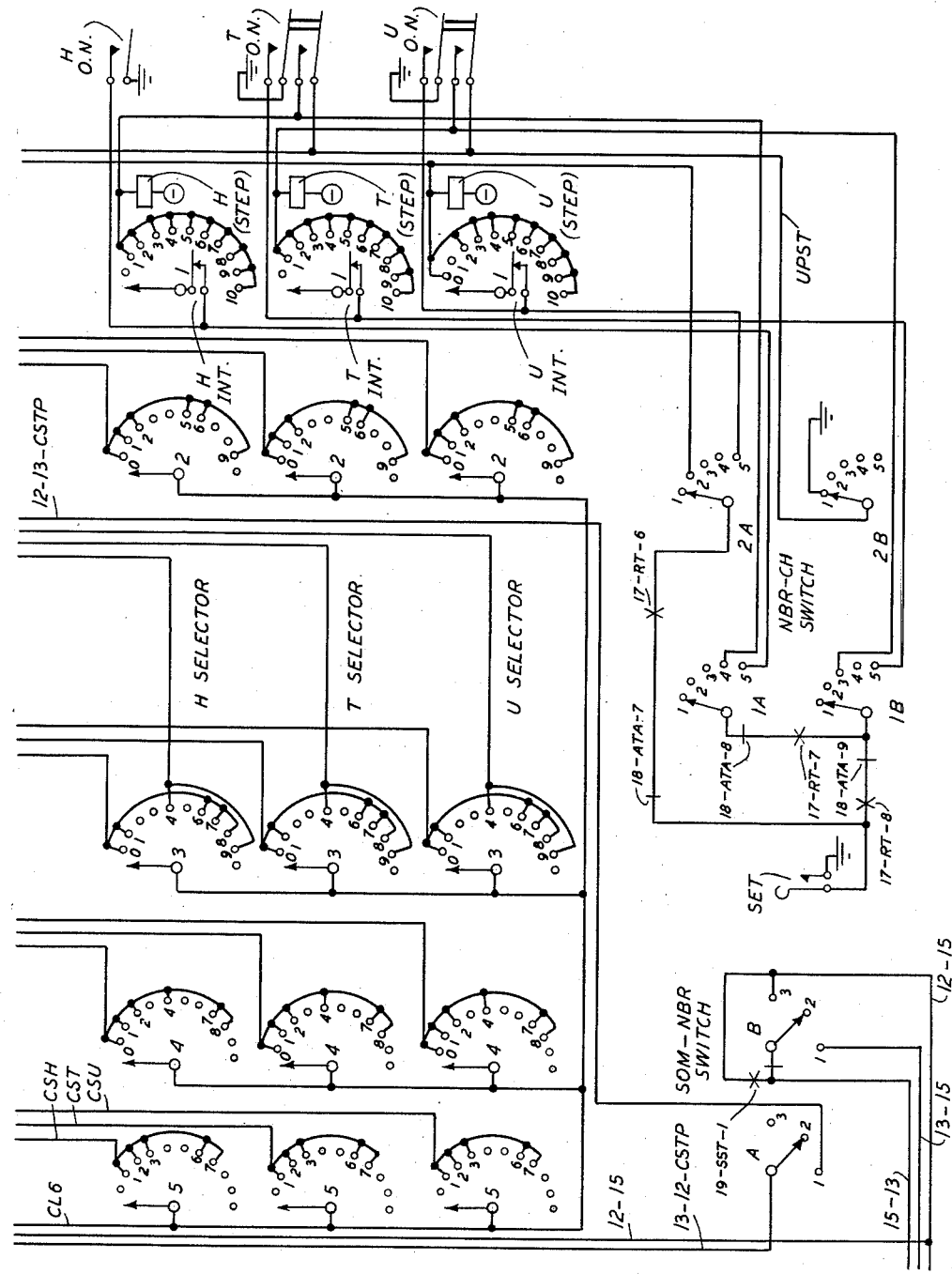

Manually-operated, two-section, start-of-message number switch, SOM—NBR, FIG. 13, provides the alternatives of automatic or manual transmission of the start-of-message sequence, which includes the message number, by operating the switch to position 1 for automatic transmission or to position 3 for manual transmission. Assuming that the switch is set for automatic transmission and that the station is being polled for nonprecedence traffic, relay 7—XR is operated for about 40 ms. as previously described.

Relay 7—XR while operated:

(1) Partially closes a possible operating path for relay 15—HB via contacts 15–7–XR–1.

(2) Completes an operating path from ground via contacts 15–7–XR–2, the break contact of continuity contacts 15–NPM–1 and the winding of relay 15—NPM to negative battery. The resultant operation of relay 15—NPM closes a locking path via the make contact of continuity contacts 15–NPM–1 and contacts 15–8–SP–4 of relay 8—SP which has already released. Relay 15—NPM functions during the "wait interval" condition of the station as described in detail in a following paragraph.

Figure 15:
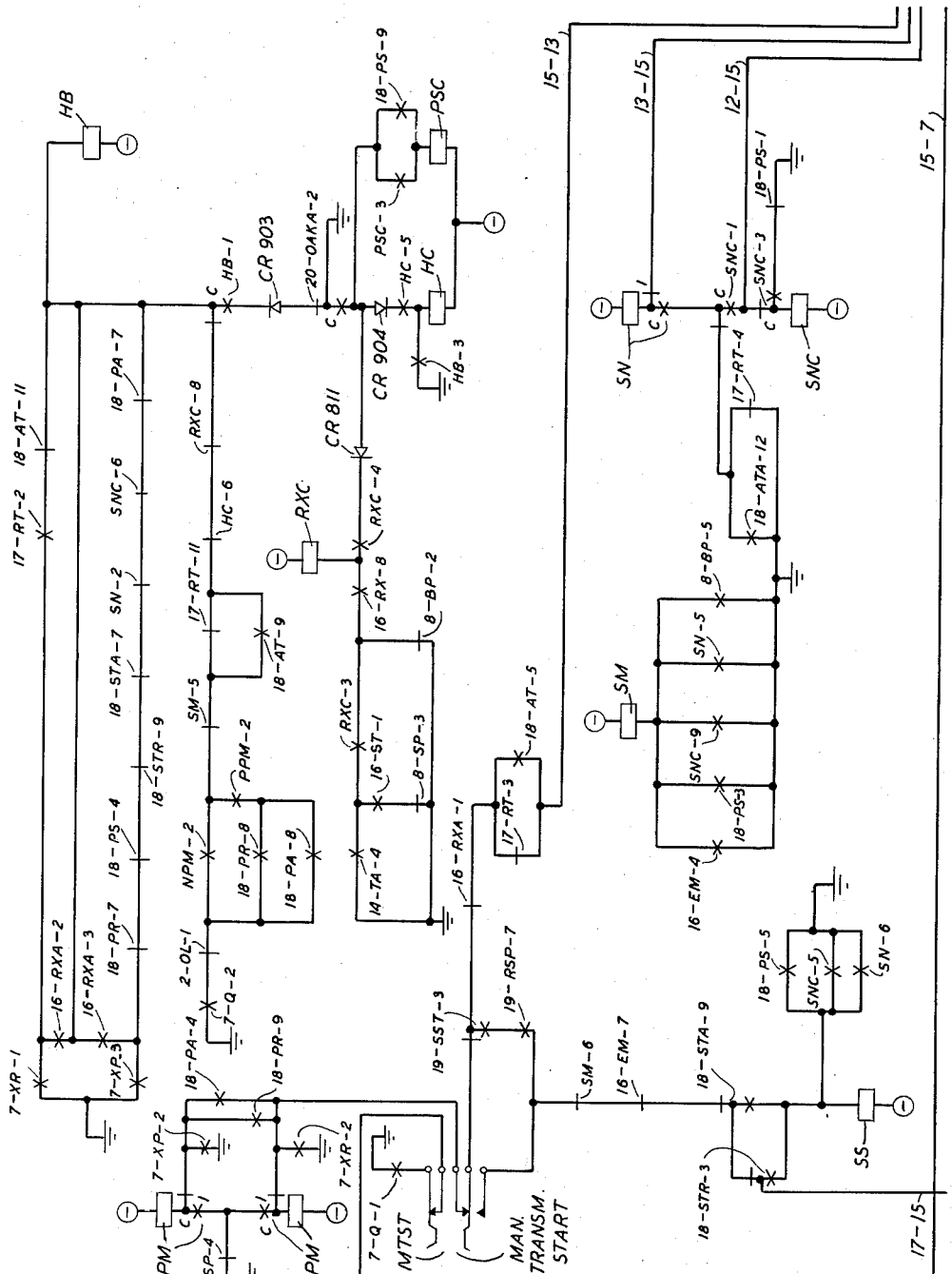
Figure 16:
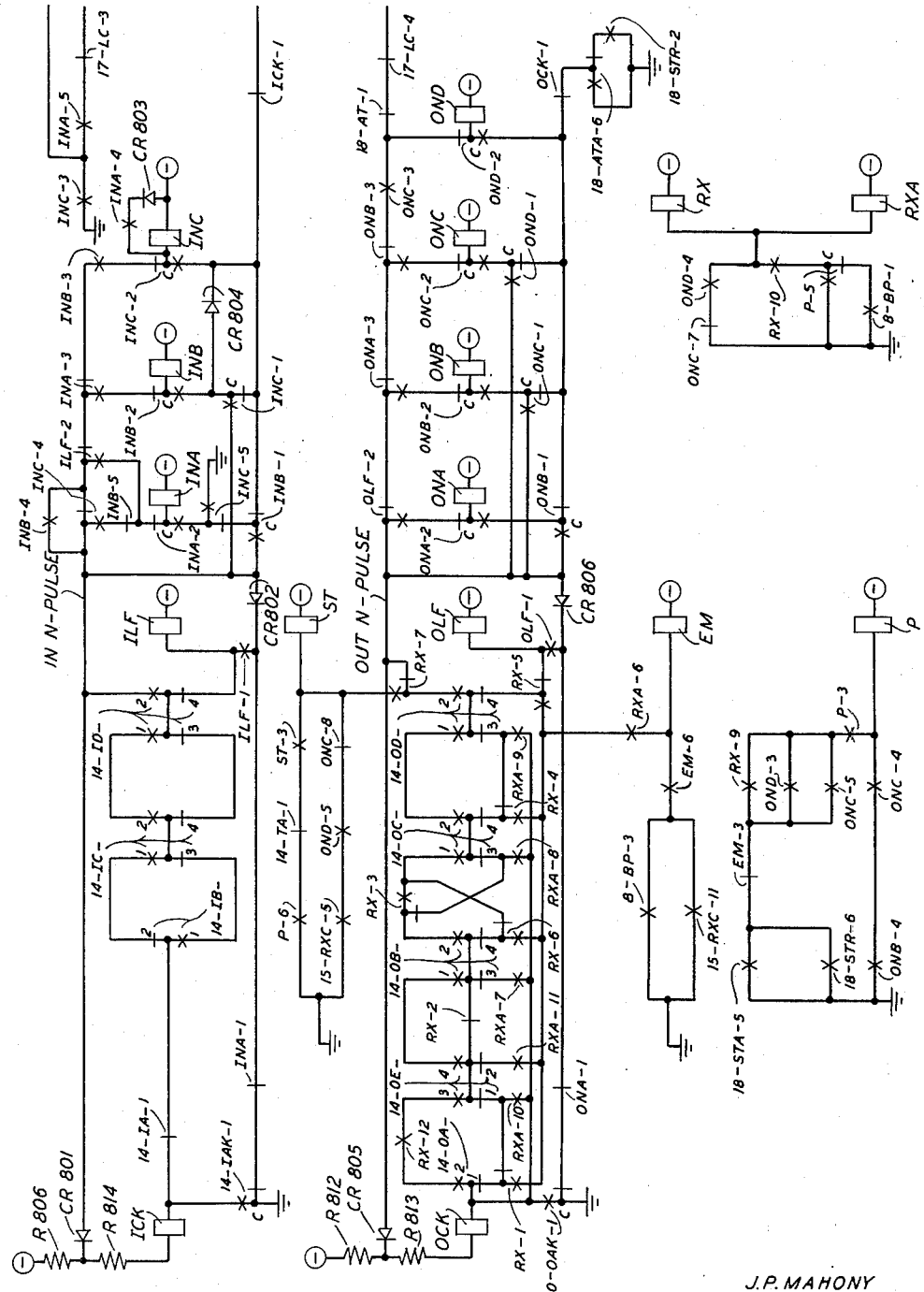

(3) Completes an operating path for sending numbers relay 15—SN, if relay 17—RT is released indicating the registration of an available message, from ground by way of contacts 15–7–XR–2, a back contact of the Manual Transmitter Start Key, MTST, FIG. 15, the break contact of transfer contacts 15–19–SST–3, break contacts 15–16–RXA–1 and 15–17–RT3, lead 15–13, the break contact of transfer contacts 13–19–SST–1, position 1, section B of switch SOM—NBR, FIG. 13, lead 13—15, the break contact of continuity contacts 15–SN–1 and the winding of relay 15—SN to negative battery.

Relay 15—SN operated:

(1) Opens a possible operating path for relay 15—HB via contacts 15–SN–2.

(2) Opens the operating path for relay 18—PS via contacts 18–15–SN–3.

(3) Partially closes a possible holding path for relays 18—AT and 18—ATA via contacts 18–15–SN–4.

(4) Closes a path to maintain relay 15—SM operated by way of make contacts 15–SN–5.

(5) Opens a possible holding path for relays 18—PR and 18—PA via the break contact of transfer contacts 18–15–SN–3.

(6) Sets of a self-locking circuit via the make contact of continuity contacts 15–SN–1, the break contact of continuity contacts 15–SNC–1 and contacts 17–15–RT–4 and breaks the operating circuit for relay 15—SN via the break contact of continuity contacts 15–SN–1.

(7) Closes an obvious operating circuit, via contacts 15–SN–6, for relay 15—SS. Relay 15—SS, operated, opens a holding circuit, via contacts 11–15–SS–1, for the monitor printer selector magnets, FIG. 11.

Figure 11:
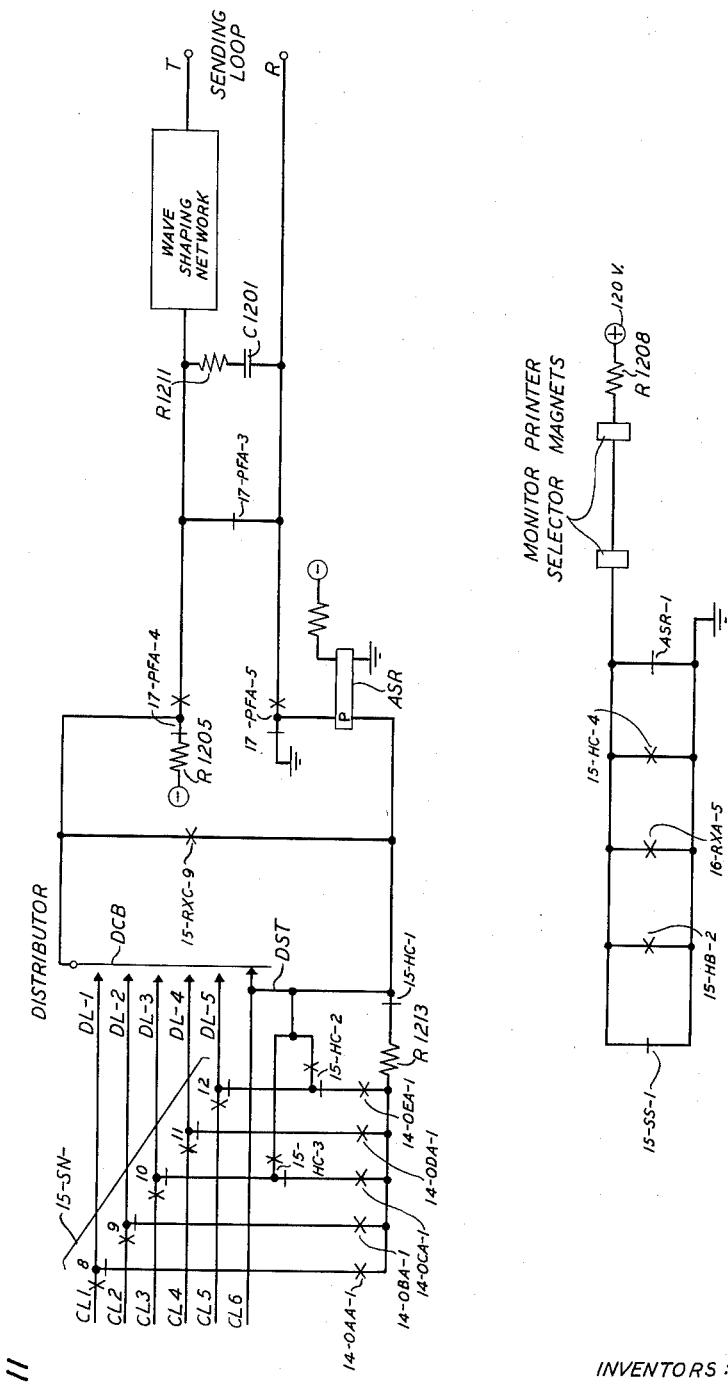
Figure 12:
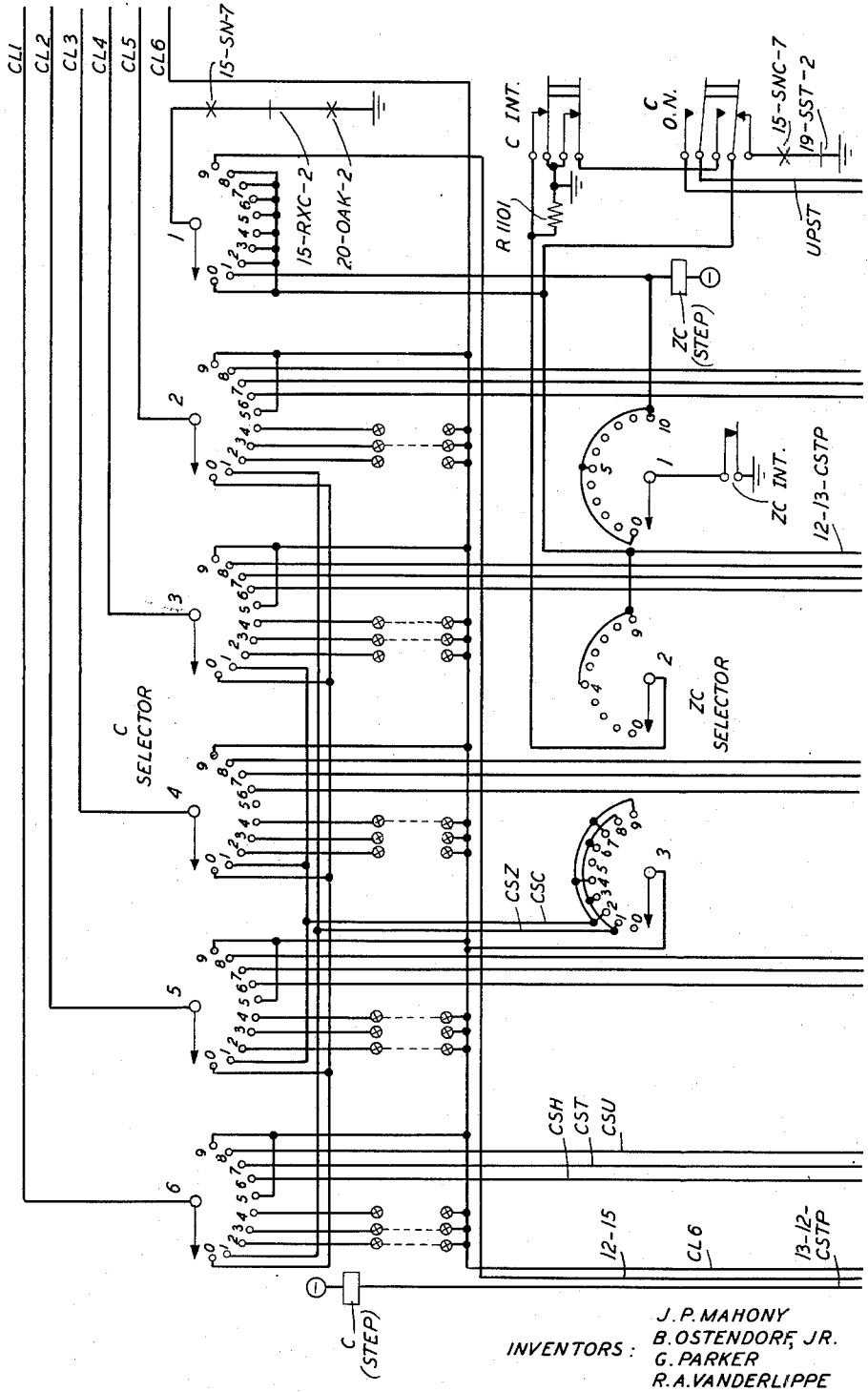

(8) Partially closes a path from ground to the wiper of arc 1 of selector C of the start-of-message-number coder shown in FIG. 12, via contacts 12–15–SN–7 and connects the distributor leads, DL1–5, FIG. 11, to the wipers of arcs 2 to 6 of selector C by way of the make contact of transfer contacts 11–15–SN–8 to 12 and coding leads CL1 through 5. The operation of the start-of-message-number-codes, including selector C, is described in a following paragraph.

(9) Opens a possible operating path for the regular transmitter clutch magnet and the auxiliary transmitter clutch magnet, FIG. 20, via the break contact of transfer contacts 20–15–SN–13 and completes a circuit from ground through the make contact of transfer contacts 20–15–SN–13, contacts 20–15–RXC–1, contacts 20–15–SNC–2, the winding of the distributor clutch magnet, FIG. 20, and resistor R1003 to negative battery.

At this time the distributor starts to rotate and send the start-of-message sequence and the message number as explained in a following paragraph.

The reception of signals other than H at the switching center causes the transmitter-start circuit to suspend polling and send a suspend polling LETTERS signal. This results in the pulsing of relay 7—LKD and the release of relay 8—BP as previously explained. Operation of relay 7—LKD opens the locking path for relays 14—AXM and 14—RXM via contacts 14–7–LKD–1 and if either of these relays is operated it will release. Relay 14—RXM will operate as the first character following the number sequence is transmitted from the closure of the regular transmitter auxiliary contacts, RAX, FIG. 14.

*Sending distributor*

Referring now to FIG. 11, the sending distributor indicated therein comprises a conventional start-stop distributor that sequentially scans or reads the conditions of five distributor contacts leads DL1–5. In the initial condition, with relay 17—PFA released, the sending loop is short-circuited by contacts 11–17–PFA–3 and the distributor output to the sending loop is open-circuited by the make contacts of transfer contacts 11–17–PFA–4 and 11–17–PFA–5. In addition, current is supplied from ground by way of the make contact of transfer contacts 11–17–PFA–5, a winding of polar relay 11—ASR, the distributor stop lead DST, the common-scanning bar or lead of the distributor DCB, the break contact of transfer contacts 11–17–PFA–4 and resistor R1205 to negative battery operating the armature of relay 11—ASR to its marking or break contact. In this condition, with the sending loop short-circuited, the loop is in the idle-marking condition. When relay 17—PFA operates, as previously described, the sending loop short-circuit is removed, the local energizing circuit for relay 11—ASR is opened, the distributor output is connected to the sending loop and line current is supplied by way of the sending loop ring connection R, the make contact of transfer contacts 11–17–PFA–5, the energizing winding of relay 11—ASR, lead DST, lead DCB, the make contact of transfer contacts 11–17–PFA–4, a conventional wave shaping network, shown in block form in FIG. 11, and the sending loop tip connection T. With a circuit thus complete between the ring and tip connections R and T of the sending loop, the distributor output maintains the idle marking condition and relay 11—ASR remains operated to the marking break contact.

On each rotation of the distributor, the distributor common-scanning bar lead DCB initially breaks its connection to contact lead DST for the period corresponding to the spacing-start element. This opens the previously described circuit between the ring and tip connections R and T of the sending loop, sending an open or space signal to line. The distributor scanning bar lead DCB then sequentially effects connections to contact leads DL1–5 which, during the transmission of the start-of-message and number sequence, are connected to lead DST by way of the make contacts of transfer contacts 11–15–SN–8 to 12, leads CL1–5, the start-of-message number coder, FIGS. 12 and 13 and lead CL6 according to the operation of the coder as described hereafter and, during the transmission of the message text, are connected to lead DST by way of contacts 11–14–OAA–1; contacts 11–14–OBA–1; the break contact of transfer contacts 11–15–HC–3 and contacts 11–14–OCA–1; contacts 11–14–ODA–1; and the break contact of transfer contacts 11–15–HC–2 and contacts 11–14–OEA–1, respectively, common lead resistor R1213 and contacts 11–15–HC–1 according to the operations of relays 14–OAA–EA as previously described. It is thus seen that a connection is effected between common bar lead DCB and lead DST, and in turn between loop connectors R and T of the sending loop when a mark signal is transmitted and the connection is broken when a space signal is transmitted. The rotation of the distributor terminates when the common bar lead DCB re-effects a direct connection to stop lead DST, transmitting over the sending loop a marking-stop signal.

It should be noted that the current through the energizing winding of relay 11—ASR is removed during a spacing signal and the relay operates to its spacing make contact due to the current through the bias winding. Relay 11—ASR thereby follows the output signals, operating its armature to the spacing make contact for space elements and to the break contact for mark elements. With relay 11—ASR operated to its break contact in the idle marking condition, an obvious energizing circuit is completed, via contacts 11–ASR–1, for the monitor printer selector magnets. With relay 11—ASR operated to its spacing contact, this energizing circuit is opened. Since break contacts of relay 15—SS and make contacts of relay 15—HB, 15—HC and 16—RXA shunt contacts 11–ASR–1, the monitor printer will print all outgoing signals when relay 15—SS is operated and relays 15—HB, 15—HC and 16—RXA are released. The operation and function of these relays will be subsequently described.

*Message numbering*

With switch SOM—NBR, FIG. 13, in the automatic position 1, the start-of-message sequence, BLANK ZCZC and the message number group, ABC FIGURES 123 LETTERS, are inserted automatically by the action of the start-of-message number coder, each successive message receiving a number increased by one from the preceding message. The coder includes five step-on-release stepping switches similar to the In and Out selectors, FIG. 17, previously described. These switches are designated selector C, FIG. 12, selector ZC, FIG. 12, selector H, selector T and selector U, FIG. 13, wherein selector C provides the coding for the characters BLANK, A, B, C, FIGURES and LETTERS, selector ZC provides the characters ZCZC, selector H provides the hundreds digit for the message number, selector T provides the tens digit and selector U provides the units digits. The coder also includes a manually-operated, four-section, five-position number change switch, NBR CH, FIG. 13, which, when operated to positions 1 through 5, provides automatic stepping of selectors H, T and U; manual upstepping of selector U; manual upstepping of selector T; manual upstepping of selector H and manual resetting of the number selectors, respectively, as described subsequently.

With the distributor clutch magnet, FIG. 20, energized upon the operation of relay 15—SN as previously described, the distributor starts a rotation. As described subsequently, selector C is initially on position zero when leads CL1 to 5 via arcs 2-6 of selector C are open-circuited with reference to coding lead CL6. Therefore, the distributor, via contacts 11-15-SN-8 to 12 of relay 15—SN operated, is coded for a BLANK character comprising five open or spacing elements.

As the distributor rotates, the distributor auxiliary contacts DAX, FIG. 20, close, completing an operating circuit for relay 20—OAKA via contacts DAX and 20-DY-1, operating relay 20—OAKA which in turn operates relay 20—OAK, as previously described. This completes a circuit from ground through contacts 12-20-OAK-2, 12-15-RXC-2 and 12-15-SN-7, the wiper in position 0 of arc 1 of selector C, lead 12-13-CSTP, position 1, section A of switch SOM—NBR, FIG. 13, lead 13-12-CSTP and the winding of the step magnet of selector C to negative battery, energizing the step magnet. Near the end of the distributor rotation contacts DAX open releasing relay 20—OAK which in turn releases the step magnet causing a step of selector C to position 1.

In position 1 of selector C, the coding leads CL1 and CL5 are routed to positions 1, 3, 6 and 8 of arc 3 of selector ZC by way of common lead CSZ; coding leads CL2, CL3 and CL4 are routed to positions 2, 4, 7 and 9 of arc 3 of selector ZC by way of common lead CSC and the wiper of arc 1 of selector C is connected to the ZC selector stepping magnet. The ZC selector rests on step one or six as will be evident from following paragraphs: hence, coding leads CL1 and CL5 are connected to lead CL6 via arcs 6 and 2 of selector C, common lead CS2 and arc 3 of selector ZC, causing a Z signal, MSSSM, to be transmitted during the second revolution of the distributor. As the distributor rotates relay 20—OAK is reoperated, setting up an energizing circuit from ground by way of contacts 12-20-OAK-2, 12-15-RXC-2 and 12-15-SN-7, the wiper and position 1 of arc 1 of selector C and the winding of the step magnet of selector ZC to negative battery, operating the step magnet, and near the end of the distributor rotation relay 20—OAK is released releasing the ZC step magnet and causing a step of selector ZC. Selector C remains on step 1.

When the selector ZC is in position 2 or 7, the distributor coding leads CL2, CL3 and CL4 are connected to lead CL6 via arcs 5, 4 and 3 of selector ZC, common lead CSC and arc 3 of selector ZC so that a C character, SMMMS, is transmitted during the third distributor rotation. During this rotation, operation and release of relay 20—OAK steps the selector ZC to position 3 or 8 in the same manner as the second distributor rotation, selector C remaining on step 1.

On the fourth distributor rotation, the character Z is again sent and selector ZC steps to position 4 or 9. At this time, the C selector stepping magnet is energized by a circuit from ground by way of a back contact of the interrupter contacts of selector C or resistor R1101, the wiper and position 4 or 9 of arc 2 of selector ZC, lead 12-13-CSTP, position 1, section A of switch SOM—NBR, lead 13-12-CSTP and the winding of the step magnet of selector C to negative battery. With the step magnet of selector C energized, the interrupter contacts are operated but resistor R1101 in the step magnet energizing path maintains reduced holding current.

On the fifth distributor rotation, the character C is transmitted and when relay 20—OAK releases, the selector ZC steps to position 5 or 10. This opens the selector C step magnet operating path via arc 2 of the selector ZC and allows the selector C to step to position 2. The step magnet of selector ZC is disconnected from the wiper of arc 1 of selector C as selector C steps from position 1 but selector ZC is self-driven to step 1 or 6 due to the circuit from ground by way of selector ZC interrupter contacts, arc 1 of selector ZC and the winding of the selector ZC step magnet to negative battery.

With the C selector on steps 2, 3 and 4, the distributor is coded in accordance with strappings of arcs 2-6 of selector C with lead CL6 to send the first, second and third characters, respectively, of the station identification. This occurs on the sixth, seventh and eighth rotations of the distributor. At station A, when the station identification constitutes the characters ABC, position 2 of arcs 6 and 5 are strapped to common lead CL6 to transmit the character A, MMSSS, during the sixth revolution, position 3 of arcs 6, 3 and 2 are strapped to the common lead to transmit the character B, MSSMM, and position 4 of arcs 5, 4 and 3 are strapped to the common lead to transmit C, SMMMS, during the eighth revolution of the distributor, selector C is stepped during each distributor revolution in the same manner as during the first revolution due to the common connection between positions 0, 2, 3 and 4 of arc 1 of selector C. Moreover, positions 5, 6, 7 and 8 of arc 1 are connected to the common connection whereby selector C will step in the same manner during the ninth through 12 revolutions of the distributor.

As relay 20—OAK releases near the end of the eighth distributor revolution, the selector C steps to position 5. At this point leads CL1, 2, 4 and 5 are connected to common lead CL6 so that in the ninth revolution, the character FIGURES, MMSMM is transmitted. Near the end of this revolution, the selector C steps to position 6.

Positions 6, 7 and 8 of arc 6 of selector C are connected, via arc leads CSH, CST and CSU, to arc 5 of the hundreds selector H, FIG. 13, the tens selector T and the units selector U, respectively, and the arc leads are connected to the position 0 through 9 of arc 5 of selectors H, T and U according to the first code element of the digits 0 through 9. With the wipers connected to common distributor coding lead CL6, positions 6, 7 and 8 of arc 6 of selector C are connected to the common distributor leads via arc 5 of selectors H, T and U in accordance with the position of the wipers of the number selectors and the pattern in which positions 0 through 9 are connected to the arc leads. In a similar manner, positions 6, 7 and 8 of arc 5 of selector C are connected to common lead CL6 via arc 4 of selectors H, T and U wherein the positions of arc 4 are strapped in accordance with the second element of the digits; positions 6, 7 and 8 of arc 4 of selector C are connected to the common distributor lead via arc 3 of selectors H, T and U; positions 6, 7 and 8 of arc 3 of selector C are connected to the common distributor lead via arc 3 of selectors H, T and U; and positions 6, 7 and 8 of arc 2 of selector C are connected to the common distributor lead via arc 2 of selectors H, T and U. The H selector is normally resting on the position corresponding to the hundreds digit of the number for the next message. With the C selector in position 6, this number is transmitted during the tenth revolution of the distributor. Near the end of this revolution the C selector steps to position 7.

With the C selector on position 7, the T selector connects to the coding leads in the same manner as the H selector so that on the eleventh rotation of the distributor the tens digit of the message number is transmitted. Near the end of this revolution the C selector steps to position 8.

With the C selector in position 8, the units digit of the message number is sent during the twelfth rotation of the distributor and the C selector steps to position 9.

With selector C in position 9, coding leads CL1–5 are connected, via arcs 2–6, to common distributor coding lead CL6 so that during the thirteenth rotation of the distributor the LETTERS character is sent. When relay 20—OAK operates during the thirteenth revolution of the distributor, an energizing circuit is set up from ground via contacts 12–20–OAK–3, 12–15–RXC–2 and 12–15–SN–7, the wiper and position 9 of arc 1 of selector C, lead 12—15, the break contact of continuity contacts 15–SNC–3 and the winding of sending numbers complete relay 15—SNC to negative battery.

Relay 15—SNC operated:

(1) Locks via the make contact of continuity contacts 15–SNC–3 and contacts 15–18–PS–1 and breaks the energizing circuit via the break contact of continuity contacts 15–SNC–3.

(2) Partially closes a path for operating relay 18—PS via the make contact of transfer contacts 18–15–SNC–4.

(3) Transfers the holding path for relay 15—SN, via the break contact of continuity contacts 15–SNC–1, to the above-described energizing circuit for relay 15—SNC, by way of the make contact of continuity contacts 15–SNC–1.

(4) Closes an additional holding circuit for relay 15—SS via contacts 15–SNC–5.

(5) Opens a possible operating circuit for relay 15—HB via contacts 15–SNC–6.

(6) Opens a possible holding circuit for relays 18—PA and 18—PR by way of the break contact of transfer contacts 18–15–SNC–4.

(7) Partially closes a possible locking circuit for relays 18—AT and 18—ATA via contacts 18–15–SNC–8.

(8) Closes an obvious holding circuit for relay 18—SM by way of contacts 15–SNC–9.

(9) Completes a circuit from ground, via contacts 12–19–SST–2, contacts 12–15–SNC–7, a back contact of the off-normal contacts of selector C, FIG. 12, lead 12–13–CSTP and then through the previously described energizing circuit for the step magnet of selector C to negative battery.

(10) Opens the energizing path for the distributor clutch magnet, FIG. 20, via contacts 20–15–SNC–2.

When relay 20—OAK releases at the end of the thirteenth revolution of the distributor, relay 15—SN releases, transferring the connection of the distributor leads DL1–5 to the coding leads CL1 through 5 via the make contact of transfer contacts 11–15–SN–8 to 12, to the contacts of relays 14OAA to 14ODA by way of the break contact of transfer contacts 11–15–SN–8 through 12, closing a path from ground via contacts 18–15–SN–3 and the make contact of transfer contacts 18–15–SNC–4 and the winding of relay 18–PS to negative battery and further opening the energizing circuit for the distributor clutch magnet, FIG. 20, via the make contact of transfer contacts 20–15–SN–13.

Relay 18—PS operated:

(1) Prepares a locking circuit via contacts 18–PS–2 and 18–15–PSC–2.

(2) Breaks the locking circuit for relay 15—SNC via contacts 15–18–PS1, releasing relay 15—SNC. Contacts 18–PS–2, in the locking circuit, are adjusted to make before contacts 15–18–PS–1 break to insure that relay 18—PS is maintained since the release of relay 15—SNC opens the operating circuit for relay 18—PS by way of the make contact of transfer contacts 15–SNC–4.

(3) Prepares a holding circuit for relay 15—SM by way of contacts 18–PS–3.

(4) Opens a possible operating circuit for relay 15—HB via contacts 15–18–PS–4.

(5) Closes a holding circuit for relay 15—SS by way of contacts 15–18–PS–5.

(6) Partially closes a possible locking circuit for relays 18—AT and 18—ATA via contacts 18–PS–6.

(7) Partially closes a possible energizing path for the distributor clutch magnet, FIG. 20, via contacts 20–18–PS–7.

(8) Transfers a possible energizing path for the auxiliary transmitter clutch magnet and the regular transmitter clutch magnet, FIG. 20, by way of the break contact of transfer contacts 20–18–PS–8 to a path via the make contact of transfer contacts 20–18–PS–8.

(9) Partially closes the operating path for relay 15—PSC via contacts 15–18–PS–9.

(10) Completes a path from ground, via make contacts 18–PS–10, the break contact of transfer contacts 18–AT–2, break contacts 18–17–RT–5, break contacts 18–19–RES–1 and the winding of the sending text regular transmitter relay 18—STR, to negative battery.

(11) Opens a locking circuit for relay 19—RSP via contacts 19–18–PS–11.

The release of relay 15—SNC opens the previously described energizing circuit for the step magnet of selector C by way of contacts 13–15–SNC–7, causing selector C to step to position 10. At position 10, the resultant operation of the off-normal contacts of selector C, FIG. 12, completes a path from ground, by way of a back contact of the interrupter contacts of selector C, a front contact of the off-normal contacts of selector C, lead 12–13–CSTP and the previously described path through the winding of the step magnet of selector C, to negative battery. Selector C is thus self-driven from position 10 to position 0 where the off-normal contacts release. In addition, with the selector C off-normal contacts operated and switch NBR—CH, FIG. 13, in normal position 1, a path is completed from ground, position 1, section 2B of switch NBR—CH, lead UPST, a front contact of the selector C off-normal contacts and the winding of the step magnet of selector U upstepping selector U one position when the release of the selector C off-normal contacts break the energizing path for the step magnet of selector U. If selector U upsets to position 10, the resultant operation of the selector U off-normal contacts, FIG. 13, completes a path from ground, via a front contact of the selector U off-normal contacts, the selector U interrupter contact, the wiper and arc of arc 1 of selector U and the winding of the step magnet of selector U, to negative battery and completes a path from ground via position 1, section 2B of switch NBR—CH, lead UPST, a front contact of the selector U off-normal contacts and the winding of the selector T step magnet, to negative battery, thus self-driving selector U to position 0 and upstepping selector T one position. Similarly, if selector T upsteps to position 10, the resultant operation of the selector T off-normal contacts self-drives selector T to position 0 and upsteps selector H one position and if selector H upsteps to position 10, the resultant operation of the selector H off-normal contacts self-drives selector H to position 0. If no message is ready for transmission, as indicated by relay 18—ATA released and relay 17—RT operated, selector U may be manually upstepped by setting switch NBR—CH to position 2 and manually operating key SET, closing a path from ground by way of key SET, contacts 13–18–ATA–7 and 13–17–RT–6, position 2, section 2A of switch NBR—CH and the winding of the selector U step magnet to negative battery, or selector T may be manually upstepped by setting switch NBR—CH to position 3 and manually operating key SET, closing a path from ground by way of key SET, contacts 13–17–RT–8 and 13–18–ATA–9, position 3, section 1B of switch NBR—CH and the winding of selector T step magnet to negative battery, or selector H may be manually upstepped by setting switch NBR—CH to position 4 and manually operating key SET, closing a path from ground by way of key SET, contacts 13–17–RT–7 and 13–18–ATA–8, position 4, section 1A of switch NBR—CH and the winding of selector H step magnet to negative battery, thus upstepping selector U, T or H upon the release of key SET. In addition, with relay 18—ATA released and relay 17—RT operated, the number selectors may be manually reset to 001 by setting switch NBR—CH to position 5 and operating key SET, closing three previously described paths from ground to sections 1A, 1B and 2A of switch NBR—CH and thence via position 5 of sections 1A, 1B and 2A and the interrupter contacts, the wipers of arc 1 and the step magnets of selectors H, T and U to negative battery thus, since all positions of arc 1 of selectors H, T and U, with the exception of positions 0, 0 and 1, respectively, are connected to the respective step magnets, the number selectors will be self-driven to position 001.

When automatic insertion of numbers is not required, the switch SOM—NBR switch is placed in manual position 3. Under this condition the previously described operating circuit for relay 15—SN via position 1, section B of switch SOM—NBR is transferred via position 3, section B of switch SOM—NBR lead 12—15 and the break contact of continuity contacts 15–SNC–3 to relay 15—SNC, thereby operating relay 15—SNC instead of relay 15—SN.

The operation of relay 15—SNC produces the same subsequent action as for the case in which number generation is automatic.

*Start of message transmission—Not first message*

The operation of relay 18—PS near the end of the number generation sequence operates relay 18—STR.

Relay 18—STR operated:

(1) Opens a possible alternate operating path for relay 15—SN or relay 15—SNC via the break contact of transfer contacts 15–18–STR–3 and prepares a holding circuit for relay 15—SS from ground via the make contact of continuity contacts 17–PFA–1 of relay 17—PFA operated, lead 17—15, the make contact of transfer contacts 15–18–STR–3 and the winding of relay 15—SS to negative battery.

(2) Partially closes an operating circuit for relay 19—RTO via contacts 19–18–STR–4. The functions of relay 19—RTO will be described hereafter in conjunction with the alarm conditions of the station.

(3) Partially closes the energizing circuit for the regular transmitter clutch magnet, FIG. 20, by way of contacts 20–18–STR–5.

(4) Partially closes a possible locking circuit for relay 16—P by way of contacts 16–18–STR–6.

(5) Opens a possible operating circuit for relay 17—RT via contacts 17–18–STR–7.

(6) Opens a possible operating circuit for relay 18—AT by way of contacts 18–STR–8.

(7) Partially closes a previously described holding circuit for the counting relays 16—ONA to D via contacts 16–18–STR–2.

(8) Opens a previously described locking path for the first message relay 17—FM via contacts 17–18–STR–1.

(9) Opens a possible operating path for relay 15—HB via contacts 15–18–STR–9.

(10) Partially closes an operating path for relays 19—RES and 19—ESB by way of contacts 19–18–STR–10.

(11) Partially closes the regular energizing path for the distributor clutch magnet and relay 20—DY via contacts 20–18–STR–11.

(12) Opens a possible locking circuit for relays 17—RC and 17—LC via contacts 17–18–STR–12.

(13) Prepares a self-locking path from ground via contacts 18–16–EM–1, 18–19–RTO–1 and 18–STR–13, the break contact of transfer contacts 18–AT–2, contacts 18–17–RT–5 and 18–19–RES–1 and the winding of relay 18–STR to negative battery.

(14) Completes a preliminary path for energizing the distributor clutch magnet, since relay 17—FM is released where the message is not the first of an in-out counting series from ground by way of contacts 20–18–STR–14, 20–17–FM–2 and 20–18–PS–7, the winding of the distributor clutch magnet and resistor R—1003 to negative battery.

If the message to be transmitted is not the first message of a new in-out counting series, the first character is over the sensing pins for reasons described hereafter and would be lost if the regular transmitter clutch magnet were energized without a preliminary revolution of the distributor. For this reason, the distributor clutch magnet is energized for the transmission of one character if relay 17—FM is not operated. With relays 18—PS and 18—STR operated and relay 17—FM released, the distributor clutch magnet is energized and the distributor rotates to send the character last read by the transmitter sensing pins.

As the distributor rotates, relay 20—OAKA is operated by the contacts DAX and, in turn, completes an operating circuit from ground by way of the make contact of continuity contacts 15–20–OAKA–2, contacts 15–18–PS–9 and the winding of relay 15—PSC to negative battery.

Relay 15—PSC operated:

(1) Opens a previously described locking circuit for relay 17—FM via contacts 17–15–PSC–1.

(2) locks via the make contact of continuity contacts 15–20–OAKA–2 and contacts 15–PSC–3.

(3) Opens the locking circuit for relay 18—PS via contacts 18–15–PSC–2, releasing relay 18—PS.

(4) Opens a locking circuit for relay 18—AFM via contacts 18–15–PSC–4.

(5) Opens a possible energizing circuit for the regular transmitter clutch magnet and the auxiliary transmitter clutch magnet via contacts 20–15–PSC–5.

The resultant release of relay 15—PS releases relay 18—SM and opens the preliminary path to the distributor clutch magnet and, near the end of the distributor revolution, the release of relay 20—OAKA opens the locking path for relay 15—PSC, releasing relay 15—PSC. With relay 17—RC and 18—STR operated, this completes an energizing path from ground via the break contacts of transfer contacts 20–15–SN–13, break contacts 20–16–P–2, break contacts 20–16–EM–2, the break contact of transfer contacts 20–15–PS–8, break contacts 20–15–PSC–5, the break contact of transfer contacts 20–18–AT–3, contacts 20–18–STR–5, contacts 20–17–RC–8, the winding of the regular transmitter clutch magnet and resistor R1002 to negative battery, starting transmission of the message.

With the regular transmitter clutch magnet energized, the shaft of the regular transmitter rotates and the regular transmitter distributor clutch contacts RTDC, FIG. 20, close and open during each revolution closing and opening the regular energizing circuit for the distributor clutch magnet and relay 20—DY from ground via contacts 20–18–STR–11, the winding of relay 20—DY, contacts RTDC, the winding of the distributor clutch magnet and resistor R1003 to negative battery causing a revolution of the distributor with each closure of contacts RTDC. The subsequent opening of contacts RTDC, releasing relay 20—DY and the closure of the distributor auxiliary contacts DAX permit the momentary operation of relays 20—OAKA and 20—OAK during each revolution of the distributor. Since relays 20—OAKA and 20—OAK cannot operate until relay 20—DY releases, and relay 20—DY cannot release until the regular transmitter distributor clutch contacts RTDC open, the operation of relay 20—OAK is thus timed to occur after the operations of the regular transmitter reading contacts, RTR1–5, FIG. 14, for the purpose of reading the end-of-message sequence, as previously described. Transmission of the message continues in this manner until the end-of-message sequence is read.

*Start of message transmission—First message*

If the message awaiting transmission is the first one of a new in-out count series, relay 17—FM is operated as previously explained. With relays 18—PS and 17—FM operated, the operation of relay 18—STR prepares an energizing path from ground via the break contact of transfer contacts 20–15–SN–13, break contacts 20–16–P–2 and 20–16–EM–2, the make contact of transfer contacts 20–15–PS–8, the break contact of transfer contacts 20–18–AT–4, make contacts 20–17–FM–3, the break contact of transfer contacts 20–18–AT–3, make contacts 20–18–STR–5 and 20–17–RC–8, the winding of the regular transmitter clutch magnet and resistor R1002 to negative battery and transmission of the message begins without a preliminary revolution of the distributor. The operation of relay 15—PSC releases relay 18—PS, as previously described, and with relay 18—STR operated, the locking path of relay 17—FM is opened releasing relay 17—FM, marking the following message as "not first message." From this point the action is the same as that described in the immediately preceding paragraphs.

END-OF-MESSAGE AND LETTERS DISCARD

As the third N of the end-of-message sequence is read, with relay 16—ONB operated, as previously described, relay 16—ONC operates. This prepares for registering the fourth N and also completes a path from ground by way of make contacts 16–ONB–4 and 16–ONC–4 and the winding of relay 16—P to negative battery.

Relay 16—P operated:

(1) Opens the regular transmitter clutch magnet path via contacts 20–16–P–2, but the transmitter clutch is released late enough in the cycle to allow the fourth N to be read and transmitted.

(2) Opens a possible operating path for relay 17—RT via the break contact of transfer contacts 17–16–P–1 preventing the operation of relay 17—RT and the resultant release of relay 18—STR during the following "letters discard" interval and partially closes a locking path for relay 17—RT via the make contact of transfer contacts 17–16–P–1.

(3) Closes a self-locking path by way of contacts 16–P–3, 16–ONC–5, 16–EM–3 and 16–18–STR–6.

(4) Partially completes the operating path for relay 14—TA by way of contacts 14–16–P–4.

(5) Transfers the locking circuit for relays 16—RX and 16—RXA, by way of the break contact of continuity contacts 16–P–5 to a circuit by way of the make contact of contacts 16–P–5.

(6) Partially closes a locking circuit for relay 16—ST by way of contacts 16–P–6.

(7) Opens the operating path for relay 14—AXM via contacts 14–16–P–7 and opens the operating path for relay 14—RXM via contacts 14–16–P–8.

If the next character read is not the fourth N, relay 16—OCK operates and relay 16—ONC releases, as previously described, opening the locking circuit for relay 16—P via contacts 16–ONC–5. The resultant release of relay 16—P closes the regular transmitter clutch magnet path via contacts 20–16–P–2, reenergizing the regular transmitter clutch magnet and permitting normal message transmission until a complete end-of-message sequence is read.

As the fourth N is read and transmitted, relay 16—OND is operated, supplementing the locking circuit for relay 16—P by way of contacts 16–OND–3. If no further perforated characters are in the tape, the regular transmitter stop contacts RTST, FIG. 17, are opened at this time, releasing relay 17—RC and, with relay 16—ONC operated, a supplementary holding path for relay 18—STR, shunting contacts 18–17–RT–5, is set up via contacts 18–17–RC–9 and 18–16–ONC–6. As previously described, the release of relay 17—RC also steps the In and Out selectors to their home position, operates relay 17—RT and further opens the regular transmitter clutch magnet path via contacts 20–17–RC–8. When relay 16—ONC releases, relay 18—STR releases opening the holding circuits for relays 16—OND and 16—P by way of contacts 16–18–STR–2 and 16–18–STR–6, respectively, releasing relays 16—OND and 16—P. The release of relay 18—STR also opens the holding circuit for relay 15—SS via the make contact of transfer contacts 15–18–STR–3 and opens a possible energizing path for the distributor clutch magnet via contacts 20–18–STR–11.

If, however, further perforated characters are in the tape following the fourth N, relay 16—OND operates and at the end of the distributor revolution relay 16—ONC is released, stepping the Out selector. With relays 16—OND operated and 16—ONC released, a path from ground via contacts 16–ONC–7 and 16–OND–4 and the parallel windings of relays 16—RX and 16—RXA to negative battery is completed.

Relays 16—RX and 16—RXA operated:

(1) Complete an operating path from ground by way of contacts 15–8–BP–2 and 15–16–RX–8 and the winding of relay 15—RXC to negative battery.

(2) Supplement the holding circuit for relay 16—P via contacts 16–RX–9.

(3) Close a self-locking circuit via contacts 16–RX–10 and the make contact of continuity contacts 16–P–5.

(4) Open a possible operating path for relays 19—TOB and 19—ATO by way of contacts 19–16–RX–11.

(5) Partially close possible operating paths for relay 15—HB via contacts 15–16–RXA–2 and 15–16–RXA–3.

(6) Open a possible operating path for relays 19—RES, 19—ESB and 19—AES by way of contacts 19–16–RXA–4.

(7) Completes a holding path for the monitor printer selector magnet, FIG. 11, by way of contacts 11–16–RXA–5.

(8) Convert reading relays 14—OA to 14—OE to a LETTERS reader whereby, when a LETTERS character is sensed and relays 14—OA to 14—OE are operated, a "letters" path is completed from the make contact of continuity contacts 16–20–OAK–1 to relay 16—ST via make contacts 16–14–OA–2, 16–RX–12, 16–14–OE–3, 16–14–OE–4, 16–14–OB–1 and 16–14–OB–2, and the make contact of transfer contacts 16–RX–7.

When a character other than LETTERS is sensed and one or more of relays 14—OA to 14—OE are released, a "not letters" path is completed from the make contact of continuity contacts 16–20–OAK–1 to relay 16—EM via break contacts 16–14–OA–1, the make contact of transfer contacts 16–RX–1 and make contacts 16–RXA–6; or via make contacts 16–RXA–7, break contacts 16–14–OB–3, break contacts 16–14–OB–4, the make contacts of transfer contacts 16–RX–6 and make contacts 16–RXA–6; or via make contacts 16–RXA–8, break contacts 16–14–OC–3, break contacts 16–14–OC–4, the make contact of transfer contacts 16–RX–4 and make contacts 16–RXA–6; or via make contacts 16–RXA–9, break contacts 16–14–OD–3, break contacts 16–14–OD–4, the make contact of transfer contacts 16–RX–5 and make contacts 16–RXA–6; or via make contacts 16–RXA–10, break contacts 16–14–OE–1, break contacts 16–14–OE–2, make contacts 16–RXA–11 and make contacts 16–RXA–6.

Relay 15—RXC operated:

(1) Opens a previously described energizing path for the distributor clutch magnet by way of contacts 20–15–RXC–1 and a preliminary energizing path via contacts 20–15–RXC–7.

(2) Opens a previously described energizing path for the selector C step magnet, FIG. 12, via contacts 12–15–RXC–2.

(3) Partially closes self-locking paths via contacts 15–RXC–3 and contacts 15–RXC–4.

(4) With relay 16—OMD still operated and relay 16—ONC released, closes an operating path from ground by way of make contacts 16–15–RXC–5, make contacts 16–OND–5, break contacts 16–ONC–8, and the winding of relay 16–ST to negative battery, operating relay 16—ST.

(5) Partly closes an operating path for the regular transmitter clutch magnet and the auxiliary transmitter clutch magnet, FIG. 20, by way of contacts 20–15–RXC–6.

(6) Opens a possible operating path for relay 15—HB via contacts 15–RXC–8.

(7) Short-circuits the sending distributor common bar DCB and stop lead DST, FIG. 11, via contacts 11–15–RXC–9 to prevent sending to the line.

(8) Opens a possible locking path for relay 18—STA via contacts 18–15–RXC–10.

(9) Prepares a locking path for relay 16—EM by way of contacts 16–15–RXC–11.

Relay 16—ST operated:

(1) Completes a locking path for relay 15—RXC via break contacts 15–8–SP–3, make contacts 15–16–ST–1, make contacts 15–RXC–3 and make contacts 15–16–RX–8.

(2) With relays 17—RC, 18—STR and 15—RXC operated, as previously described, completes an energizing path for the regular transmitter clutch magnet from ground by way of break contacts 20–OAK–3, break contacts 20–14–TA–2, break contacts 20–15–SM–4, make contacts 20–15–RXC–6, make contacts 20–16–ST–2, the break contact of transfer contacts 20–18–AT–3, make contacts 20–18–STR–5, make contacts 20–17–RC–8, the winding of the regular transmitter clutch magnet and resistor R1002 to negative battery.

(3) Locks via contacts 16–P–6, 16–14–TA–1 and 16–ST–3.

With the regular transmitter clutch magnet energized, the transmitter shaft rotates causing a momentary closure of the regular transmitter auxiliary contacts RAX, FIG. 14, completing a path from ground by way of contacts RAX, the break contact of transfer contacts 14–18–ATA–10, make contacts 14–16–P–4 and the winding of relay 14–TA to negative battery.

Relay 14—TA operated:

(1) Locks via contacts 14–TA–3 and 14–20–OAKA–3 of relay 20—OAKA released.

(2) Supplements the locking path for relay 15—RXC via contacts 15–14–TA–4.

(3) Opens the regular transmitter clutch magnet circuit via contacts 20–14–TA–2 causing it to release in time to stop the transmitter after a single revolution.

(4) Opens the locking path for relay 16—ST, via contacts 16–14–TA–1. Relay 16—ST remains operated, however, while relay 16—OND is operated.

As the regular transmitter shaft rotates, closing the regular distributor clutch contacts RTDC, FIG. 20, the distributor clutch magnet is energized, causing the distributor to rotate. As contacts RTDC open, relay 20—DY is released; and as the distributor rotates, the distributor auxiliary contacts DAX close. Contacts DAX closed operated relay 20—OAKA, which in turn operates relay 20—OAK. Operation of relay 20—OAKA releases relay 14—TA and operation of relay 20—OAK operates relay 16—OCK, as previously described, which in turn releases relay 16—OND opening a holding circuit for relay 16—ST.

The teletypewriter character sensed by reading contacts RTR1 to 5 operate relays 14—OA to 14—OE in accordance with the character presented. If this character is LETTERS, relays 14—OA to 14—OE are operated and ground from relay 20—OAK maintains relay 16—ST operated and locked via contacts 16–P–6 and 16–14–TA–1. With relay 16—ST operated and relay 14—TA released, the regular transmitter clutch magnet circuit is closed upon the release of relay 20—OAK starting another revolution of the transmitter.

This action continues with relay 14—TA operated by the successive closures of contacts RAX, releasing relay 16—ST and relay 16—ST operated by the successive sensing of LETTERS characters until a character other than LETTERS is registered by relays 14—OA to 14—OE. When this occurs, one of these relays provides ground for operating relay 16—EM.

Relay 16—EM operated:

(1) Opens the holding path for relay 18—STR via contacts 18–16–EM–1, releasing relay 18—STR.

(2) Opens an energizing path for the auxiliary and regular transmitter clutch magnets, FIG. 20, via contacts 20–16–EM–2. The other energizing path, via contacts 20–15–SM–4, is opened by relay 15—SM operated.

(3) Opens the holding path for relay 16—P by way of contacts 16–EM–3, releasing relay 16—P.

(4) Completes an obvious path for energizing relay 15—SM via contacts 15–16–EM–4.

(5) Opens a possible operating path for relays 19—TOB and 19—ATO by way of contacts 19–16–EM–5.

(6) Locks via contacts 16–EM–6 and 16–15–RXC–11.

(7) Opens a possible operating path for relays 15—SN and 15—SNC via contacts 15–16–EM–7.

(8) Opens a possible operating path for relays 18—AT and 18—ATA via contacts 18–16–EM–8.

Assuming that relay 8—BP has not operated due to a new polling cycle, the release of relay 16—P releases relays 16—RX and 16—RXA. On the subsequent release of relay 20—OAKA, relay 15—RXC is then released in turn releasing relay 16—EM which releases relay 15—SM. The circuit is now restored to the initial condition prior to the transmission of the message.

If no characters other than LETTERS follow the end-of-message sequence and no other message is awaiting transmission or is in the process of being perforated, the letters-discard process is terminated by the release of relay 17—RC. This occurs as the transmitter sensing head reaches the perforator punch block opening contacts RTST, FIG. 17.

Release of relay 17—RC results in resetting the IN and OUT selectors to 0 count and in the operation of relay 17—FM, as previously described, to indicate that the next message transmitted will be the first in a new in-out counting series.

Relay 17—RT, which could not operate previously due to relay 16—P operated, is operated immediately by the release of relay 17—RC and is held operated via arcs 3 of the In and Out selectors, contacts 17–LC–1 and 17–19–RSP–1, the make contact of transfer contacts 17–16–P–1 and contacts 17–RT–1.

Relay 17—RT, in operating, releases relay 18—STR which releases relay 16—P. Release of relay 16—P is followed by release of relays 16—RX, 16—RXA and, upon the release of relay 20—OAK near the termination of the distributor revolution, the release of relay 15—RXC. Relay 17—RT is maintained operated, on the release of relay 16—P, via the break contact of transfer contacts 17–16–P–1, contacts 17–19–RSP–1 and 17–LC–1 and arcs 3 of the In and Out selectors. The circuit is thus restored to the no-traffic-available condition.

*Sending from the auxiliary transmitter*

One or more messages on detached pieces of tape are ordinarily sent from the auxiliary transmitter. Such messages are usually prepared on perforators other than that of the machine which is associated with the regular transmitter on a continuous-tape basis.

The format of the messages may be the same as messages from the regular transmission with the exception that it is necessary that LETTERS characters be perforated after the last N of the last message on the tape so that the end-of-message sequence may pass completely through the auxiliary transmitter.

To send from the auxiliary transmitter, the operator inserts the tape in the auxiliary transmitter by opening the tape lid, placing the tape so that the first character to be sent is just ahead of the sensing pins and then closing the tape lid. These actions open and reclose the auxiliary transmitter lid contacts, ATRL, FIG. 18, and close the auxiliary transmitter tape out contacts, ATTO, FIG.

18, opening and closing an obvious operating circuit for relay 18—LR and closing an obvious operating circuit for relay 18—EAT. Relay 18—LR, during the period it is released, completes a path from ground via break contacts 18-LR-1, the break contact of continuity contacts 18-AFM-1 and the winding of the auxiliary transmitter first message relay 18—AFM to negative battery.

Relay 18—AFM operated:

(1) Locks via the make contact of continuity contacts 18-AFM-1 and either break contacts 18-15-PSC-4 or break contacts 18-STA-1.

(2) Opens a preliminary energizing path for the distributor clutch magnet via contacts 20-18-AFM-2.

(3) Partially closes an energizing path for the auxiliary transmitter clutch magnet, FIG. 20, via contacts 20-18-AFM-3.

Assuming that the regular transmitter is not transmitting a message, no precedence message is awaiting transmission in the regular transmitter, whereby relay 18—PR is released, as subsequently described, and the station is not being polled, the operation of relays 18—LR and 18—EAT complete an operating path from ground via a back contact of the auxiliary transmitter hold key, ATRH, FIG. 18, lead ATHL, break contacts 18-19-RSP-2, 18-STR-8, 18-15-SM-2, 18-PR-1, 18-19-ATO-1 and 18-19-AES-1, make contacts 18-LR-2 and 18-EAT-1, and then via break contacts 18-16-EM-8 or lead ATLA, a back contact of key ATRH, lead ATLB and break contacts 18-PR-2 and then via the parallel windings of the auxiliary transmitter relays 18—AT and 18—ATA to negative battery.

Relay 18—AT operated:

(1) Opens an operating path to the OUT selector step magnet via contacts 16-18-AT-1 so that the transmission of message traffic from the auxiliary transmitter will not disturb the in-out count of the regular transmitter.

(2) Partially closes a path to operate relay 15—SN or 15—SNC via contacts 15-18-AT-5.

(3) Partially closes a path via the make contact of transfer contacts 18-AT-2 to operate relay 18—STA and opens the operating path for relay 18—STR via the break contact of contacts 18-AT-2.

(4) Supplements the locking path for relay 18—PR, if it is operated, via contacts 18-A2-6.

(5) Provides a self-locking path, through make contacts 18-AT-7 and break contacts 18-PR-3, shunting contacts 18-STR-8, 18-15-SM-2 and 18-PR-1 in the operating path for relays 18—AT and 18—ATA.

(6) Partially closes the operate path to relay 18—PA via contacts 18-AT-8.

(7) Partially closes a path to operate relay 15—HB via contacts 15-18-AT-9.

(8) Partially closes a path to the auxiliary transmitter clutch magnet via the make contact of transfer contacts 20-18-AT-3 and opens the energizing path for the regular transmitter clutch magnet via the break contact of contacts 20-18-AT-3.

(9) Opens the operating path for relay 19—RSP via contacts 19-18-AT-10.

(10) Opens a possible operating path for relay 15—HB via contacts 15-18-AT-11.

(11) Transfers a possible operating path for the regular and the auxiliary transmitter clutch magnets via the break contact of transfer contacts 20-18-AT-4 to a path via the make contact of contacts 20-18-AT-4.

(12) Prepares a locking path for relays 18—AT and 18—ATA via contacts 18-AT-12, and contacts 18-15-SNC-8, 18-15-SN-4 or 18-PS-6, shunting contacts 18-19-ATO-1, 18-19-AES-1, 18-LR-2, and 18-EAT-1 when relay 15—SN, relay 15—SNC or relay 18—PS is operated during the transmission of the start-of-message and number characters permitting the transmission of the complete start-of-message number sequence if the lid of the auxiliary transmitter should be raised or tape out contacts ATTO open.

Relay 18—ATA operated:

(1) Transfers the output reader relays 14—OA to 14—OE and 14—OAA to 14—OEA from the regular transmitter reading contacts via the break contact of transfer contacts 14-18-ATA-1 through 5 to the auxiliary transmitter reading contacts via the make contact of contacts 14-18-ATA-1 through 5.

(2) Provides a holding path for relay 18—STA via contacts 18-ATA-11.

(3) Opens the reset circuit for the H, T and U selectors, FIG. 13, via contacts 13-18-ATA-7 through 9.

(4) Transfers the operating path of relay 14—TA from the regular transmitter auxiliary contacts RAX, FIG. 14, via the break contact of transfer contacts 14-18-ATA-10 to the auxiliary transmitter auxiliary contacts AAX, via the make contact of contacts 14-18-ATA-10.

(5) Opens the locking path for relays 16—ONA to 16—OND via the break contact of transfer contacts 16-18-ATA-6 and prepares a locking path for relays 16—ONA to 16—OND via the make contact of contacts 16-18-ATA-6.

(6) Prepares a locking circuit for relay 15—SN via contacts 15-18-ATA-12.

(7) Opens a possible operating path for relays 19—TOB and 19—ATO via contacts 19-18-ATA-13.

(8) Opens a possible locking path for relay 19—ASP via contacts 19-18-ATA-14.

If the operator inserts the tape in the auxiliary transmitter during the polling cycle, relays 18—AT and 18—ATA cannot operate since the operating path is open at contacts 18-15-SM-2 of relay 15—SM operated. In this case, a no-traffic-available indication is given as explained in a following paragraph.

Assuming that relays 18—AT and 18—ATA are operated, the station is in the traffic-available condition, ready to transmit from the auxiliary transmitter the next time a polling for traffic occurs even though traffic may be waiting in the regular transmitter.

As previously described, the initiation of the polling cycle operates relay 8—BP causing relay 15—SM to operate. Relay 15—SM operated opens the previously described operating path for relays 18—AT and 18—ATA and completes a path from ground by way of contacts 18-15-SM-3 and contacts 18-AT-7 shunting contacts 18-PR-3 and 18-19-RSP-2, lead ATHL and the back contact of key ATRH in the previously described locking path for relays 18—AT and 18—ATA. The reception of a non-precedence transmitter-start code by the station director causes relay 7—XR to operate. Relay 7—XR in operating causes relay 15—SN to operate, operating relay 15—SS and, assuming that automatic number insertion is provided, the station sends a message number as previously described followed by the operation of relay 15—SNC which releases relay 15—SN, as previously described. Relay 15—SNC operated and relay 15—SN released, causes relay 18—PS to operate.

As previously described, the operation of relay 18—PS releases relay 15—SNC, partially closes the preliminary energizing path for the distributor clutch magnet, FIG. 20, which is inoperative at this time due to the previous operation of relay 18—AFM opening the path at contact 20-18-AFM-2, transfers a possible energizing path for the auxiliary transmitter clutch magnet, FIG. 20, from a path via the break contacts of transfer contacts 20-18-PS-8 to a path via the make contact of contacts 20-18-PS-8 and completes an operating path from ground by way of contacts 18-PS-10, the break contact of transfer contacts 18-AT-2, contacts 18-19-AES-2 and the winding of the sending text auxiliary transmitter relay 18-STA to negative battery.

Relay 18—STA operated:

(1) Removes one holding path from relay 18—AFM via contacts 18-STA-1.

(2) Provides a shunting path via contacts 18-STA-2 around contacts 18–15–SM–3 in the locking path for relays 18—AT and 18—ATA.

(3) Partially closes an operate path for relays 19—ATO and 19—TOB via contacts 19–18–STA–3.

(4) Partially closes an operate path for relay 19—ATO via the make contact of transfer contacts 19–18–STA–4 and opens an operate path for relay 19—ATO via the break contact of contacts 19–18–STA–4.

(5) Partially closes a locking path for relay 16—P via contact 6–8–STA–5.

(6). Provides a locking path from ground via contacts 18–16–EM–1 and 18–STA–6, contacts 18–ATA–11 or contacts 18–15–RXC–10 and 18–19–ATO–2 and then via contacts 18–19–AES–2 and the winding of relay 18—STA to negative battery.

(7) Opens an operating path for relay 15—HP via contacts 15–18–STA–7.

(8) Partially closes the preliminary energizing path to the distributor clutch magnet via contacts 20–18–STA–8. Relay 18—AFM, operated, prevents this path from being effective, however, maintaining the path open at contacts 20–18–AFM–2.

(9) Opens a possible operating path for relay 15—SN or 15—SNC via the break contact of transfer contacts 15–18–STA–9 and closes a holding path for relay 15—SS via the make contact of contacts 15–18–STA–9.

(10) Partially closes an energizing path for the distributor clutch magnet and relay 20—DY via contacts 20–18–STA–10.

(11) Partially closes an operating path for relays 19—ESB and 19—AES via contacts 19–18–STA–11.

(12) Completes an energizing path for the auxiliary transmitter clutch magnet, FIG. 20, without a preliminary revolution of the distributor, from ground by way of the break contact of transfer contacts 20–15–SN–13, contacts 20–16–P–2 and 20–16–EM–2, the make contact of transfer contacts 20–18–PS–8, the make contact of transfer contacts 20–18–AT–4, make contacts 20–18–AFM–3, the make contact of transfer contacts 20–18–AT–3, contacts 20–19–SST–4 or 20–19–ASP–1, make contacts 20–18–STA–12, the auxiliary transmitter tight tape lever contacts ATTT, the winding of the auxiliary transmitter clutch magnet and resistor R1001 to negative battery.

Operation of the auxiliary transmitter clutch magnet causes the auxiliary transmitter shaft to rotate, closing the auxiliary transmitter clutch contacts ATDC, FIG. 20, operating the distributor clutch magnet and relay 20—DY. The distributor rotates, sending the first character to the line and, during the revolution, closing the distributor auxiliary contacts DAX. Also, the auxiliary distributor clutch contacts ATDC open, releasing relay 20—DY. Relay 20—DY released and contacts DAX closed operate relay 20—OAKA, which in turn operates relay 20—OAK and relay 15—PSC, as previously described. The operation of relay 15—PSC releases relay 18—PS, sets up a locking path via contacts 15–PSC–3 and the make contact of continuity contacts 15–20–OAKA–2 so that it will release at the end of the distributor auxiliary pulse and removes the second locking path for relay 18—AFM via contacts 18–15–PSC–4 releasing relay 18—AFM. The release of relay 18—PS opens the auxiliary transmitter clutch magnet energizing path. At the end of the distributor auxiliary pulse relay 20—OAKA releases thus releasing relay 15—PSC which, with relay 18—PS released, completes a path via the break contact of transfer contacts 20–18–PS–8 and break contacts 20–15–PSC–5 shunting the make contact of transfer contacts 20–18–PS–8, the make contact of transfer contacts 20–18–AT–4 and contacts 20–18–AFM–3, thereby restoring the energizing path for the auxiliary transmitter clutch magnet.

The transmitter is now free to run and sends the message to the line until the end-of-message sequence is read.

When the end-of-message sequence is read, the output reader is transferred to the letters discard condition and relay 16—P, 16—RX, 16—RXA and 15—RXC are operated as previously described, with the exception that relay 16—P locks via contacts 16–18–STA–5 instead of contacts 16–18–STR–6. At this time, the circuit discards LETTERS one at a time successively operating and releasing relays 16—ST and 14—TA until the end of the tape is reached. This action is the same as that previously described for transmission from the regular transmitter except that relay 14—TA is operated by the auxiliary transmitter auxiliary contacts AAX, FIG. 14, and the Out selector is not stepped since the input lead is open at contacts 16–18–AT–1.

Figure 18:
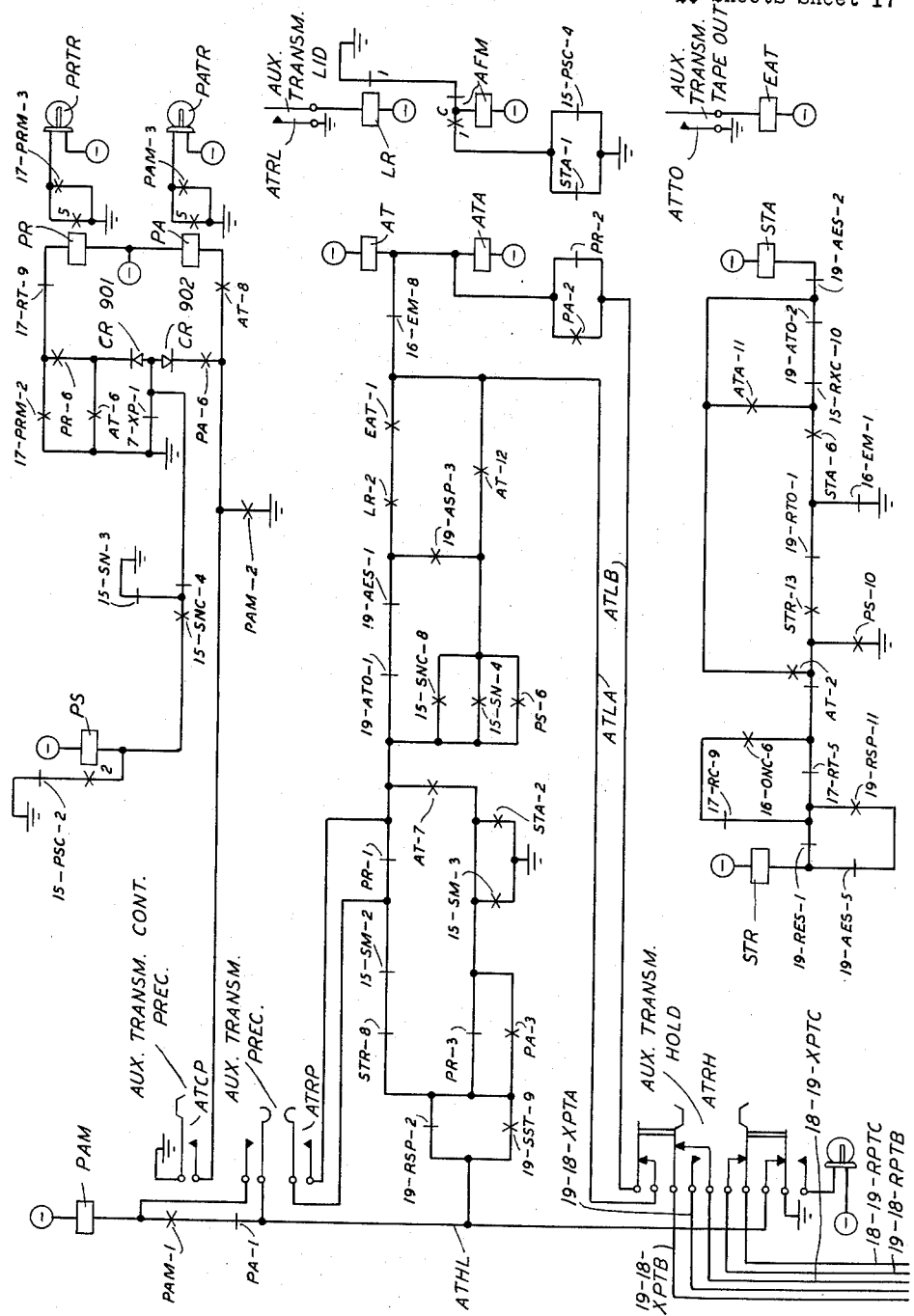

If the tape contains only one message, the end-of-tape condition is indicated by the opening of the auxiliary transmitter tape-out contacts ATTO, FIG. 18. The opening of these contacts releases relay 18—EAT which in turn opens the holding path for relays 18—AT and 18—ATA via contacts 18–EAT–1 causing them to release. Relays 15—RXC, operated, and 18—ATA released, release relay 18—STA which is followed by the release of relays 15—SS, 16—P, 14—TA, 16—RX, 16—RXA and 16—ST. When the distributor nears the end of its revolution, relays 20—OAKA, 20—OAK and 15—RXC release.

Thus the end-of-tape condition in the auxiliary transmitter restores the station circuits to the no-traffic available condition for the auxiliary transmitter.

When more than one message is in the tape which is placed in the auxiliary transmitter, transmission of the first message is terminated by sensing the first character of the second message. Since this is a character other than LETTERS, relay 16—EM is operated, as previously described.

The operation of relay 16—EM releases relays 16—P and 18—STA and opens a locking path via contacts 18–16–EM–8 for relays 18—AT and 18—ATA. Relays 18—AT and 18—ATA are maintained operated, however, by the previously described path via lead ATAL, back contacts of key ATRH, lead ATLB and contacts 18–PR–2 shunting contacts 18–16–EM–8.

The release of relays 16—P and 18—STA is followed by the release of relays 15—SS, 14—TA, 16—ST, 16—RX and 16—RXA. Relay 15—RXC then releases at the end of the distributor pulse releasing relay 16—EM.

Thus, with relays 18—AT and 18—ATA maintained operated, the relay circuits are released to a condition which indicates that traffic is waiting in the auxiliary transmitter. When the next non-precedence poll is received, transmission of this second message in the auxiliary transmitter is started.

It should be noted that in the process of transmitting the first message, relay 18—AFM is released. When a second message is in the tape which has been placed in the auxiliary transmitter, relay 18—AFM remains released to indicate that the following message is not the first on the tape in the auxiliary transmitter. As previously explained in connection with the regular transmitter, this feature provides a preliminary revolution of the distributor to transmit the character which terminated the previous transmission.

The preliminary revolution of the distributor takes place at the time relays 18—PS and 18—STA are operated. At this time, the preliminary energizing path for the distributor clutch magnet is completed from ground via contacts 20–18–STA–8, 20–18–AFM–2 and 20–18–PS–7, the winding of the distributor clutch magnet and resistor R1003 to negative battery and the previously described energizing path for the auxiliary transmitter clutch magnet via the make contact of transfer contacts 20–18–PS–8, the make contact of transfer contacts 20–18–AT–4 and make contact 20–18–AFM–3 is not completed since relay 18—AFM is released. The subsequent release of relay 18—PS opens the preliminary energizing path for the distributor clutch magnet and transmission of the message takes place as previously described.

TRANSMISSION OF PRECEDENCE TRAFFIC

Several methods relating to the handling of precedence traffic are available for the transmission of precedence messages from the regular or auxiliary transmitter. Accordingly, there are provided a non-locking regular transmitter precedence key RTRP, FIG. 17, for sending a precedence message from the regular transmitter, a non-locking auxiliary transmitter precedence key ATRP, FIG. 18, for sending a precedence message from the auxiliary transmitter and a locking auxiliary transmitter continuous precedence key ATCP, FIG. 18, for automatically designating all messages in the auxiliary transmitter for precedence handling.

The momentary operation of key RTRP completes an operating path from ground by way of back contacts of the regular transmitter hold key RTRH, FIG. 17, the contacts of key RTRP and the winding of the precedence regular transmitter memory relay 17—PRM to negative battery operating relay 17—PRM to negative battery operating relay 17—PRM and thus marking the next message to be transmitted from the regular transmitter for precedence pick-up.

Relay 17—PRM operated:
(1) Prepares a locking path via the back contacts of key RTRH, break contact 17–18–PR–4 and make contact 17-PRM–1.
(2) Prepares an operating path for the precedence regular transmitter relay 18—PR via contacts 18–17–PRM–2.
(3) Completes an obvious circuit for energizing the priority regular transmitter lamp PRTR, FIG. 18, by way of contacts 18–17–PRM–3.

If at this time relay 17—RT is released, an operating path is completed from ground via contacts 18–17–PRM–2 and 18–17–RT–9 and the winding of relay 18—PR to negative battery. If relay 17—RT is operated, it will release, as previously described, when the end-of-message sequence of the precedence message is perforated, completing the operating path for relay 18—PR.

Relay 18-PR operated:
(1) Opens the previously described operating path for relays 18—AT and 18—ATA via contacts 18–PR–1.
(2) Opens the previously described holding path for relays 18—AT and 18—ATA via contacts 18–PR–2.
(3) Opens the previously described locking path for relays 18—AT and 18—ATA via contacts 18–PR–3.
(4) Opens the locking path for relay 17—PRM, via contacts 17–18–PR–4, releasing relay 17—PRM.
(5) Maintains the energizing circuit for lamp PRTR via contacts 18–PR–5.
(6) Prepares a locking circuit from ground by way of either break contacts 18–7–XP–1 or break contacts 18–15–SN–3 and the break contact of transfer contacts 18–15–SNC–4 and then via varistor CR901, contacts 18–PR–6 and contacts 18–17–RT–9.
(7) Opens a possible operating path for relay 15—HB via contacts 15–18–PR–7.
(8) Partially closes a possible operating path for relay 15-HB via contacts 15–18–PR–8.
(9) Partially closes an operating path for relay 15-SN or relay 15-SNC via contacts 15–18–PR–9.

On the next poll for precedence traffic, relay 7–XP operates as previously described and completes an operating path for relay 15—SN or relay 15—SNC from ground by way of contacts 15–7–XP–2 and 15–18–PR–9 and the previously described operating path for relay 15—SN or relay 15—SNC via the contacts of relays 19—SST, 16—RXA and 17—RT, lead 15—13, switch SOM—NBR and lead 13—15 or 12—15.

Assuming that relay 18—AT is not, at this time, operated for reasons described in a following paragraph, the operation of relay 7—XP and relay 15—SN or 15—SNC opens the locking path of relay 18—PR releasing the relay and thus removing the indication that precedence traffic is waiting in the regular transmitter. With relay 15—SN or 15—SNC operated, the precedence message is transmitted from the regular transmitter in the same manner as previously described for non-precedence messages.

To send a precedence message from the auxiliary transmitter, tape is placed in the transmitter and key ATRP is momentarily operated completing an operating path for the precedence auxiliary transmitter memory relay 18—PAM from ground via back contacts of the auxiliary transmitter hold key ATRH, FIG. 18, lead ATHL, front contacts of key ATRP and the winding of relay 18—PAM, thus marking the next message to be transmitted from the auxiliary transmitter for precedence pick-up. With tape in the auxiliary transmitter, relays 18—AT and 18—ATA are operated unless the stations are being polled or the regular transmitter is sending a message, in which case they operate when these conditions are removed.

Relay 18—PAM operated:
(1) Prepares a locking path via the contacts of key ATRH, lead ATHL and contacts 18-PA–1 and 18-PAM–1.
(2) Completes an operating path for the precedence auxiliary transmitter relay 18—PA, when relay 18—AT operates, from ground via contacts 18-PAM–2 and 18–AT–8 and the winding of relay 18—PA to negative battery.
(3) Completes an obvious circuit for energizing the priority auxiliary transmitter lamp PATR, FIG. 18, by way of contacts 18-PAM–3.

Relay 18—PA operated:
(1) Opens the locking path for relay 18—PAM via contacts 18–PA–1, releasing relay 18—PAM.
(2) Closes a shunt path, via contacts 18–PA–2, around contacts 18–PR–2 in the previously described holding path for relays 18—AT and 18—ATA.
(3) Closes a shunt path, via contacts 18–PA–3, around contacts 18–PR–3 in the previously described locking path for relays 18—AT and 18—ATA.
(4) Partially closes an operating path for relay 15—SN or 15—SNC via contacts 15–18–PA–4.
(5) Maintains the energizing circuit for lamp PATR via contacts 18–PA–5.
(6) Prepares a locking circuit from ground by way of either break contacts 18–7–XP–1 or break contacts 18–15–SN–3 and the break contact of transfer contacts 18–15–SNC–4 and then via varistor CR902, contacts 18–PA–6 and contacts 18–AT–8.
(7) Opens a possible operating path for relay 15—HB via contacts 15–18–PA–7.
(8) Partially closes an operating path for relay 15—HB via contacts 15–18–PA–8.

On the next poll for precedence traffic, relay 7—XP operates as previously described and completes an operating path for relay 15—SN or 15—SNC from ground by way of contacts 15–7–XP–2 and 15–18–PA–4 and the previously described operating path for relay 15—SN or 15—SNC via the contacts of relays 19—SST, 16—RXA and 17—RT, lead 15—13, switch SOM—NBR and lead 13—15 or 12—15. The operation of relay 7—XP and relay 15—SN or 15—SNC opens the locking path of relay 18—PA removing the indication that precedence traffic is waiting in the auxiliary transmitter and with relays 18—AT and 18—ATA and relay 15—SN or 15—SNC operated, the precedence message is transmitted from the auxiliary transmitter in the same manner as previously described for non-precedence messages.

If relay 18—PR has previously been operated, indicating that a precedence message is awaiting transmission from the regular transmitter, when tape is placed in the auxiliary transmitter and key ATRP is momentarily operated, relays 18—PAM, 18—AT, 18—ATA and 18—PA operate as previously described with the exception that the operating path for relay 18—AT and 18—ATA, via contacts 18-PR-1, is completed by way of a path via make contacts of key ATRP, which shunts contacts 18-PR-1. Since relay 18—AT is operated, opening the operating path for relay 18—STR by way of the break contact of transfer contacts 18-AT-2 and partially closing the operating path for relay 18—STA via the make contact of contacts 18-AT-2, the auxiliary transmitter is started on the next priority poll of the station and relay 18—PA is released, as previously described. Relay 18—PR remains locked, however, due to a supplementary holding path via contacts 18-AT-6 of relay 18—AT operated so that on the next priority poll of the station, the regular transmitter is started.

To provide the automatic transmission of precedence messages from the auxiliary transmitter, locking key ATCP is operated partially closing an operating and holding path for relay 18—PA from ground via the contacts of key ATCP, contacts 18-AT-8 and the winding of relay 18—PA to negative battery, operating and maintaining relay 18—PA operated whenever relay 18—AT is operated. If the tape placed in the auxiliary transmitter contains more than one message, the operation of relay 18—AT completes a self-locking path from ground via back contacts of key ATRH, lead ATHL, contacts 18-19-RSP-1, 18—PA-3, 18—AT-7, 18-19-ATO-1, 18-19-AES-1, 18-LR-2, 18-EAT-1, lead ATLA, back contacts of key ATRH, lead ATLB and contacts 18-PA-2. Thus relays 18—AT and 18—ATA and in turn relay 18—PA are not released by the end-of-message sequence which operates relay 16—EM and all messages on the tape in the auxiliary transmitter are transmitted before the regular transmitter can send a message.

NO TRAFFIC AVAILABLE

If no traffic is available at a station, the teletypewriter character H is sent when the station is polled for traffic. This may occur on a precedence poll or on both precedence and regular polls depending on the traffic condition at the station.

As previously described, if precedence traffic is available relay 18—PR or 18—PA is operated. When the station is polled for precedence traffic, relay 7—XP is operated followed by the release of operated relay 18—PR or 18—PA and the operation of relays 15—SN or 15—SNC, 18—PS and 18—STR or 18—STA. The operation of relay 7—XP also partially closes an operating path for H back relay 15—HB back relay 15—HB from ground via make contact 15-7-XP-3, break contacts 15-18-PR-7, 15-18-PS-4, 15-18-STR-9, 15-18-STA-7, 15-SN-2, 15-SNC-6 and 15-18-PA-7 and the winding of relay 15—HB to negative battery. Relay 15—HB cannot operate, however, due to the overlapping operation of relays 18—PR, 18—PA, 15—SN, 15—SNC, 18—PS, 18—STR and 18—STA when the station is preparing to send a message.

If no precedence traffic is available, relays 18—PR and 18—PA are released and relays 15—SN or 15—SNC cannot operate in response to the precedence call letter which operates 7—XP. However, since the relays which prevent the operation of relay 15—HB are all released at this time, relay 15—HB is now operated.

Relay 15—HB operated:
(1) Locks via the make contact of continuity contacts 15-HB-1, varistor CR—903 and the break contact of continuity contacts 15-20-OAKA-2 and opens a possible operating path via the break contact of contacts 15-HB-1.
(2) Completes an obvious energizing path for monitor printer selector magnets, FIG. 11, via contacts 11-15-HB-2, maintaining the monitor printer in an idle marking condition.
(3) Completes an obvious operating circuit for H coder relay 15—HC by way of contacts 15-HB-3.
(4) Completes an energizing circuit for the distributor clutch magnet, FIG. 20, from ground via contacts 20-15-RXC-7 and 20-15-HB-4, the winding of the distributor clutch magnet and resistor R—1003 to negative battery, starting a rotation of the distributor.

Relay 15—HC operated:
(1) Opens the common connection between contacts 11-14-OAA-1 through 11-14-OEA-1 to the distributor stop lead DST, FIG. 11, via contacts 11-15-HC-1.
(2) Connects the distributor contact lead DL—5 to lead DST via the break contact of transfer contacts 11-15-SN-12 and the make contact of transfer contacts 11-15-HC-2 and connects the distributor contact lead DL—3 to lead DST via the break contact of transfer contacts 11-15-SN-10 and the make contact of transfer contacts 11-15-HC-3, thus coding the distributor for the character H, SSMSM.
(3) Supplements the energizing circuit for the monitor printer selector magnets, FIG. 11, via contacts 11-15-HC-4.
(4) Partially closes a self-locking path via contacts 15-HC-5, varistor CR—904 and the make contacts of continuity contacts 15-20-OAKA-2.
(5) Opens a possible operating path for relay 15—HB via contacts 15-HC-6.

During the distributor rotation which is started by the operation of relay 15—HB, relay 20—OAKA is operated from the distributor auxiliary contacts DAX, as previously described, locking relay 15—HC and releasing relay 15—HB. Near the end of the distributor revolution, contacts DAX open, releasing relay 20—OAKA which, in turn, releases relay 15—HC. With relays 15—HB and 15—HC released, the circuit is restored to normal, one H character having been transmitted.

The indication that no non-precedence traffic is available is relay 18—AT released together with relay 17—RT operated. Under this condition, the operation of relay 7—XR, in response to the non-precedence transmitter start character, does not operate relay 15—SN. Relay 15—HB does, however, operate due to the path completed from ground via contacts 15-7-XR-1, 15-17-RT-2 and 15-18-AT-11 and the winding of relay 15—HB to ground. Following the operation of relay 15—HB, the H character is sent in an identical manner to that described in the preceding paragraph.

Since the traffic condition of a station is indeterminate during the "letters-discard" interval, a no-traffic response is sent if the station is polled at this time.

During the "letters-discard" interval, relay 18—STR or 18—STA and relays 16—P, 16—RX, 16—RXA, and 15—RXC are operated and relays 16—ST and 14—TA are alternately operated and released to periodically complete a previously described energizing circuit for the auxiliary or regular transmitter clutch magnet via contacts 20-14-TA-2, 20-15-SM-4 and 20-16-ST-2, permitting the transmitter shaft to rotate. The rotation of the transmitter, causing the tape to step through the transmitter, character by character, results in the closure of distributor clutch contacts RTDC or ATDC, FIG. 20, which, in turn, releases the distributor for single rotations, operating relays 20—OAKA and 20—OAK to permit the reader to sense the character in the tape.

During the preliminary portion of the transmitter-start pattern, relay 8—BP is operated, as previously described, closing a holding path for relay 16—EM, closing a possible holding path for relays 16—RX and 16—RXA, opening an operating path for relay 15—RXC and completing an operating path for relay 15—SM. Operation of relay 15—SM opens the regular and auxiliary transmitter magnet paths, via contacts 20-15-SM-4, stopping the transmitter shaft on the completion of its rotation. On the final distributor rotation, relay 20—OAKA is operated, releasing relay 14—TA. The release of relay 14—TA opens one locking path for relay 15—RXC. Near the end of the distributor revolution, relay 20—

OAKA releases, opening a second locking path for relay 15—RXC.

If the character sensed by the transmitter is LETTERS, relay 16—ST is operated and locked via the contacts of relays 14—TA and 16—P. In this case, relay 15—RXC is released when relay 8—SP operates in response to the SPACE character of the transmitter start pattern.

If the character sensed by the transmitter is not LETTERS, relay 16—EM is operated from the "not-letters" output of the reader and, with relay 16—ST released, relay 15—RXC is released by the release of relay 20—OAKA. Relay 16—EM operated locks via the contacts of relay 8—BP and releases relay 18—STR or 18—STA and 16—P. The release of relay 16—P transfers the holding path for relays 16—RX and 16—RXA, but relays 16—RX and 16—RXA are maintained operated via the contacts of relay 8—BP.

If the character sensed is the last character in the tape, relays 17—RC or 18—EAT release. The release of relay 17—RC operates relay 17—RT which in turn locks via the contacts of relay 8—BP and releases relay 18—STR. The release of relay 18—STR releases relay 16—P, transferring the holding path for relays 16—RX, and 16—RXA, but relays 16—RX and 16—RXA are maintained operated by relay 8—BP. Since relay 16—ST has not operated, relay 15—RXC is released by the release of relay 20—OAKA. If relay 18—EAT releases, relays 18—AT and 18—ATA release in turn releasing relay 18—STA. The release of relay 18—STA releases relay 16—P, transferring the holding path for relays 16—RX and 16—RXA, but maintaining the relays operated via the contacts of relay 8—BP. With relay 16—ST released, relay 15—RXC is released by the release of relay 20—OAKA.

The release of relay 15—RXC removes a short circuit on the distributor, via contacts 11-15-RXC-9, so that a no-traffic response can be transmitted. When relay 7—XP or relay 7—XR operates in response to the specific transmitter-start character, relay 15—SN or 15—SNC cannot operate since the operating path is opened at contacts 15-16-RXA-1 of relay 16—RXA operated. Relay 15—HB is operated, however, by a path completed from ground via contacts 15-7-XR-1 and 15-16-RXA-2 or 15-7-XP-3 and 15-16-RXA-3 and then via the winding of relay 15—HB to negative battery. This results in the transmission of an H response signal as previously explained.

At the end of the transmitter start sequence, relay 8—BP is released. If "letters-discard" was interrupted before relay 16—EM was operated, relay 15—RXC is reoperated via the contacts of relay 16—RX. Relay 15—SM is also released by the release of relay 8—BP. This closes the regular or auxiliary transmitter magnet path, via contacts 20-15-SM-4, so that "letters-discard" action is resumed.

If relay 16—EM is operated by the last character sensed in the tape, the release of relay 8—BP at the end of the transmitter-start sequence allows relays 16—EM, 16—RX and 16—RXA as well as relay 15—SM to release. This restores the circuit to a condition in which transmission may be started by the next transmitter-start polling.

If relay 17—RC or 18—EAT were released, the release of relay 8—BP opens the locking path of relay 17—RC as well as releasing relays 16—RX, 16—RXA and 15—SM. This restores the circuit to a no-traffic-available condition for the applicable transmitter.

WAIT-INTERVAL CONDITION

The circuits of the switching center are so arranged that when a complete poll of all stations for precedence and regular traffic has been made and no traffic has been found the stations are placed in a "wait interval" condition and transmitter-start polling is suspended. The "wait interval" is terminated by transmission of a polling request signal from an outlying station, whereupon the central station starts a new polling cycle. The request signal is sent automatically whenever precedence traffic becomes available at any station previously polled for precedence traffic in the last complete poll or whenever non-precedence traffic becomes available at any station previously polled for non-precedence traffic in the last complete poll providing that the station is not in the "letters discard" condition as indicated by relay 15—RXC operated, the central station has not started a new polling cycle, as indicated by relay 15—SM operated and the receiving line is not opened, as indicated by relay 2—OL released.

The function of remembering whether a station was previously polled for precedence and non-precedence traffic is performed by precedence poll memory relay 15—PPM and non-precedence poll memory relay 15—NPM. As previously described, when a station is polled for precedence traffic, relay 7—XP operates. This completes an obvious operating path for relay 15—PPM via contacts 15-7-XP-2 and the break contact of continuity contacts 15-PPM-1. The operation of relay 15—PPM completes a locking path via the make contacts of continuity contacts 15-PPM-1 and contacts 15-8-SP-4, opens the operating path via the break contact of continuity contacts 15-PPM-1 and partially closes an operating path for relay 15—HB via contacts 15-PPM-2. When a station is polled for non-precedence traffic, relay 7—XR operates completing an obvious operating path for relay 15—NPM via contacts 15-7-XR-2 and the break contact of continuity contacts 15-NPM-1. The operation of relay 15—NPM completes a locking path via the make contact of continuity contacts 15-NPM-1 and contacts 15-8-SP-4, opens the operating path via the break contact of continuity contacts 15-NPM-1 and partially closes an operating path for relay 15—HB via contacts 15-NPM-2. Relays 15—PPM and 15—NPM are released at the beginning of the next transmitter-start sequence by the pulsing of relay 8—SP, in response to the SPACE signal, opening the locking paths of relays 15—PPM and 15—NPM via contacts 15-8-SP-4.

Stations are placed in the "wait interval" condition by the addition of the action code character "Q" to the transmitter-start pattern just before the LETTERS signal which ends the sequence. Reception of the Q character by the station director results in operation of relay 7—Q as previously described.

Relay 7—Q operated:

(1) Completes a locking path via resistor R712, FIG. 7, contacts 7-8-SP-1, lead 15—7, back contacts of key MTST, FIG. 15, and contacts 15-7-Q-1.

(2) Partially closes an operating path for relay 15—HB via contacts 15-7-Q-2.

(3) Supplements the previously described locking path for the regular transmitter memory relay 14—RXM and the auxiliary transmitter memory relay 14—AXM, via contacts 14-7-Q-3, so that if either is operated it will not release when the LETTERS character, terminating the transmitter start sequence, is received.

The availability of traffic at the station is indicated by the release of relay 17—RT or the operation of relay 18—AT and, when precedence traffic is available, the operation of relay 18—PR or 18—PA.

Therefore, assuming the station is in condition to send a request signal, as described above, if precedence traffic becomes available an operating path is completed from ground by way of make contacts 15-7-Q-2, make contacts 15-2-OL-1, break contacts 15-18-PR-8 or 15-18-PA-8, make contacts 15-PPM-2, break contacts 15-SM-5, break contacts 15-17-RT-11 or make contacts 15-18-AT-9, break contacts 15-HC-6 and 15-RXC-8, the break contact of continuity contacts 15-HB-1 and the winding of relay 15—HB to negative battery and if non-precedence traffic becomes available the above-described operating path for relay 15—HB is completed with the exception that the path is completed via make contacts 15-NPM-2 which shunt contacts 15-18-PR-8 or 15-18-PA-8 and 15-PPM-2.

The operation of relay 15—HB, as previously described, opens the above-described operating path, operates relay 15—HC and starts a rotation of the distributor. The operation of relay 15—HC further opens the operating path for relay 15—HB and codes the distributor with an H character. During the distributor rotation relay 15—HB releases followed by the release of relay 15—HC near the end of the rotation. This recompletes the operating path for relay 15—HB. Relays 15—HB and 15—HC continue to alternately operate and release, resulting in the transmission of a series of H characters, until a new polling cycle is started.

Reception of the H signal at the switching center, when it is in the "wait interval" condition, causes the transmission of a transmitter-start sequence and the resultant operation of relay 8—BP at all stations. Relay 8—BP operated, operates relay 15—SM which opens the operating path of relay 15—HB, releasing relay 15—HB and stopping the generation of H characters. Later in the transmitter-start sequence relay 8—SP is operated, releasing relays 7—Q, 15—PPM and 15—NPM. When the polling sequence reaches the specific character for a station which has traffic, transmission of this traffic is started and the transmitter-start poll is terminated at this point by the transmission of a LETTERS character. Reception of the LETTERS character releases relay 8—BP and the circuit is restored to the normal condition.

EMERGENCY STOP

If for any reason it is desired to stop transmission from a station, the emergency stop pattern, which includes the action code character X, is sent from the switching center. This releases the transmitter which is sending at the time and leaves an alarm indication that transmission from this particular transmitter was interrupted. If the emergency stop sequence is received when no transmitter is connected to the sending line, the alarm indication appears at the last station to transmit.

When transmission is started from the regular transmitter, an operating path for regular transmitter memory relay 14—RXM is completed from ground by way of the regular transmitter auxiliary contacts RAX, FIG. 14, varistor CR—1302, break contacts 14-16-P-8 and the winding of relay 14—RXM to negative battery.

Relay 14—RXM operated:
(1) Prepares a locking path via contacts 14-RXM-1, 14-AXM-2 and 14-7-LKD-1.
(2) Opens the locking path of relay 14—AXM via contacts 14-RXM-2.
(3) Partially closes an operating path for relays 19—RES and 19—ESB and a possible operating path for relay 19—AES via contacts 19-14-RXM-3.
(4) Opens an operating path for relay 19—ESB via contacts 19-14-RXM-4.

If, during transmission of the message from the regular transmitter, the emergency stop sequence is received by the direction circuit, relay 7—XES is operated, as previously described, completing operating paths from ground via make contacts 19-7-XES-1 and 19-14-RXM-3 and then by way of a first path via the break contact of continuity contacts 19-RES-2 and the winding of the regular transmitter emergency stop relay 19—RES to negative battery and by way of a second path via break contacts 19-14-AXM-4, the break contact of continuity contacts 19-ESB-1 and the winding of the emergency stop buzzer relay 19—ESB to negative battery.

Relay 19—RES operated:
(1) Locks via the make contact of continuity contacts 19-RES-2 and a first path by way of make contacts 19-ESB-2, a second path by way of break contacts 19-AR-2 and a third path by way of lead RTAL and back contacts of the regular transmitter hold key RTRH, FIG. 17.

(2) Completes an obvious operating path, via contacts 17-19-RES-3, for relay 17—RT to remove the traffic-available indication from the regular transmitter.
(3) Completes an obvious circuit, via contacts 19-RES-4, to energize the regular transmitter emergency stop lamp RTES, FIG. 19.
(4) Opens the previously described operating and locking path for relay 18—STR via contacts 18-19-RES-1, stopping the regular transmitter.

Relay 19—ESB operated:
(1) Locks via the make contact of continuity contacts 19-ESB-1 and back contacts of key BUZZER, FIG. 19.
(2) Prepares the previously described first locking path for relay 19—RES via contacts 19-ESB-2.
(3) Prepares a first locking path for relay 19—AES via contacts 19-ESB-3.
(4) Closes the energizing circuit, via contacts 19-ESB-4 and the contacts of key BUZZER, for the audible alarm buzzer ALRM, FIG. 19.

Relay 14—RXM is subsequently released by operation of relay 7—LKD when the "suspend polling" LETTERS character of the polling or emergency stop sequence is received opening break contacts 14-7-LKD-1 in the locking path for relay 14-RXM. If at this time the regular transmitter is in a "letters discard" condition with relay 16—P operated as previously described, relay 14—RXM cannot operate when the transmitter resumes discarding LETTERS at the end of the polling cycle since the operating path is opened at contacts 14-16-P-8.

Thus, transmission from the regular transmitter is stopped and audible and visual alarms are given and a no-traffic-available condition is established for the regular transmitter. The station remains in this condition until the alarm indication is released.

The emergency stop alarm condition is removed by the following sequence of actions:
(1) Operation of the locking key BUZZER to release relay 19—ESB and open the energizing circuit for buzzer ALRM. Key BUZZER may then be released.
(2) Operation of the locking key RTRH to open one locking path for relay 19—RES, to provide a holding path for relays 17—RC and 17—LC in the event that the regular transmitter stop contacts RTST, FIG. 19, are opened while clearing the alarm condition, via contacts 17-18-STR-12, varistor CR906, contacts 17-RC-10 and front contacts of key RTRH and to provide a locking path for relay 17—RT from ground by way of contacts 17-RT-10, front contacts of key RTRH, and lead RTHL, continuing the no-traffic-available indication.
(3) Momentary operation of the non-locking alarm release key ALRS, FIG. 19, to complete an obvious operating circuit for alarm release relay 19—AR.

With relay 19—AR operated, relay 19—ESB released, and the key RTRH operated, relay 19—RES releases, extinguishing lamp RTES and opening the operating path, via contacts 17-19-RES-3, for relay 17—RT.

With the alarm condition cleared, the tape is repositioned to resend the interrupted message and key RTRH is released restoring the traffic-available condition for the regular transmitter by opening the previously described locking circuit for relay 17—RT via the contacts of key RTRH.

When transmission is started in the auxiliary transmitter, an operating path for auxiliary transmitter memory relay 14—AXM is completed from ground by way of the regular transmitter auxilary contacts AAX, FIG. 14, varistor CR1301, contacts 14-16-P-7, and the winding of relay 14—AXM to negative battery.

Relay 14—AXM operated:
(1) Opens the locking path of relay 14—RXM via contacts 14-AXM-2.
(2) Locks via contacts 14-AXM-1, 14-RXM-2 and 14-7-LKD-1.
(3) Partially closes an operating path for relays 19—AES and 19—ESB via the make contact of continuity contacts 19–14–AXM–3 and opens a possible operating path for relay 19—AES via the break contact of contacts 19–14–AXM–3.

(4) Opens an operating path for relay 19—ESB via contacts 19–14–AXM–4.

If during transmission from the auxiliary transmitter, the emergency stop sequence is received by the director circuit, relay 7—XES is operated, as previously described, completing operating paths from ground via make contacts 19–7–XES–1 and make contact of continuity contacts 19–14–AXM–3 and then by way of a first path via the break contact of continuity contacts 19–AES–3 and the winding of the auxiliary transmitter emergency stop relay 19—AES to negative battery and by way of a second path via break contacts 19–14–RXM–4, the break contact of continuity contacts 19–ESB–1 and the winding of relay 19–ESB to negative battery. As previously described, the operation of relay 19—ESB prepares a self-locking path and a first locking path for relay 19—AES and energizes buzzer ALRM.

Relay 19—AES operated:

(1) Opens the operating and locking path for relays 18—AT and 18—ATA, via contacts 18–19–AES–1, removing the traffic-available indication for the auxiliary transmitter.

(2) Locks via the make contact of continuity contacts 19–AES–3 and a first path by way of contacts 19–ESB–3, a second path by way of break contacts 19–AR–3 and a third path by way of make contacts 19–18–LR–3 of relay 18—LR which is normally operated during transmission from the auxiliary transmitter.

(3) Completes an obvious circuit, via contacts 19–AES–4, for energizing the auxiliary transmitter emergency stop lamp ATES, FIG. 19.

(4) Opens the previously described operating and locking path for relay 18—STA, via contacts 18–19–AES–2, stopping the auxiliary transmitter.

(5) Partially closes a possible holding path for relay 18—STR via contacts 18–19–AES–5.

Relay 14—AXM is released by the operation of relay 7—LKD at the end of the polling or emergency stop sequence.

Thus, transmission from the auxiliary transmitter is stopped, visual and audible alarms are given and a no-traffic-available condition is established for the auxiliary transmitter. The station remains in this condition until operator action is taken to release the alarms and reset the tape in the auxiliary transmitter.

The emergency stop alarm condition is removed by the following actions:

(1) Operation and release of key BUZZER to release relay 19—ESB and suppress buzzer ALRM.

(2) Opening the tape lid to release relay 18—LR which in turn opens one locking path for relay 19—AES and opens the operating path for relays 18—AT and 18—ATA.

(3) Momentary operation of key ALRS to complete the operating circuit for relay 19—AR.

With relay 19—AR operated and relays 19—ESB and 18—LR released, relay 19—AES releases, extinguishing lamp ATES and partially reclosing the operating paths of relays 18—AT, 18—ATA and 18—STA. The alarm condition cleared, the tape is repositioned to resend the interrupted message and the tape lid is closed restoring the traffic-available condition for the auxiliary transmitter.

ALARM INDICATIONS

A torn or discontinuous tape in the regular transmitter allows the regular transmitter tape-out contacts RTTO, FIG. 19, to open, releasing normally operated tape-out relay 19—TO. The actuating tape-out pin for contacts RTTO is presented at the same time as the regular transmitter sensing pins and, if the tape is discontinuous over or near the tape-out pin, contacts RTTO open.

Since releasing of relay 19—TO can occur only while the regular transmitter is in use, relay 18—STR is operated and hence relay 19—TO, in releasing, completes an operating path from ground via break contacts 19–TO–1, make contacts 19–18–STR–4, break contacts of continuity contacts 19–RTO–2 and the winding of relay 19—RTO to negative battery as well as completing an operating path from ground via contacts 19–TO–1, the break contact of continuity contacts 19–TOB–1 and the winding of tape-out buzzer relay 19—TOB to negative battery.

Relay 19—TOB operated:

(1) Locks via the make contact of continuity contacts 19–TOB–1 and back contacts of key BUZZER, FIG. 19.

(2) Completes the energizing path for the audible alarm buzzer ALRM, FIG. 19, via contacts 19–TOB–2, back contacts of key BUZZER and 55 volt A.C. supply.

(3) Prepares a locking path for relay 19—RTO via contacts 19–TOB–3.

(4) Prepares a locking path for relay 19—ATO via contacts 19–TOB–4.

Relay 19—RTO operated:

(1) Prepares locking paths, via the make contact of continuity contacts 19–RTO–2, by way of contacts 19–TOB–3 or contacts 19–AR–2 or lead RTAL and back contacts of key RTRH, FIG. 17.

(2) Opens the locking path for relay 18—STR, via contacts 18–19–RTO–1, releasing relay 18—STR thus stopping the regular transmitter.

(3) Completes an obvious operating path for relay 17—RT via contacts 17–19–RTO–3.

(4) Completes the energizing circuit for the regular transmitter tape alarm lamp RTTA, FIG. 19, via contacts 19–RTO–4.

(5) Opens the operating path for relay 19–RSP via contacts 19–RTO–5.

Since the operation of relay 19—RTO opens the locking path of relay 18—STR via contacts 19–18–RTO–1 and the resultant release of relay 18—STR opens the operating path of relay 19—RTO via contacts 19–18–STR–4, the make contact of continuity contacts 19–RTO–2, in the locking path for relay 19-RTO, is adjusted to make before contacts 18–19–RTO–1 break. Relay 19–TO reoperates when the tape-out actuating pin is withdrawn near the end of the transmitter revolution.

The operation of relay 17—RT and the release of relay 18—STR causes the station to revert to the no-traffic-available condition for the regular transmitter. This condition is maintained until operator action is taken to clear the alarm condition as follows:

(1) Operation and release of key BUZZER to release relay 19—TOB and thus open a first holding path for relay 19—RTO and to silence audible alarm ALRM.

(2) Operation of the regular transmitter hold key RTRH to hold relays 17—RC and 17—RT operated as previously described and thus maintain the no-traffic-available condition and to open a second holding path for relay 19—RTO.

(3) Operation of key ALRS, FIG. 19, to complete an obvious operating path for relay 19—AR and thus remove the last holding path for relay 19—RTO which releases.

These actions release the alarm condition but withhold further transmission from the regular transmitter. The operator must now prepare a new tape containing the interrupted message and release key RTRH thus releasing relay 17—RT and restoring the regular transmitter to the traffic-available condition.

A torn or discontinuous tape in the auxiliary transmitter allows the auxiliary transmitter tape-out contacts ATTO, FIG. 18, to close, releasing relay 18—EAT. As previously described, relays 18—LR, 18—ATA and 18—STA are operated when the auxiliary transmitter is in use. The release of relay 18—EAT opens the operating and locking path, via contacts 18—EAT, for relays 18—AT and 18—ATA which in turn opens a first holding path for relay 18—STA via contacts 18-ATA-11 and stops the auxiliary transmitter.

Since tape-out normally occurs at the end of the message tape in the auxiliary transmitter, it is necessary that the alarm is not raised when the circuit is in the "letters discard" condition as indicated by relay 16—RX operated. Furthermore since the operation of relay 16—EM at the end of a message in the tape may result in the release of relay 16—RX before the release of relay 18—STA, the alarm is not raised when relay 16—EM is operated. Accordingly, when relays 16—EM and 16—RX are released, the release of relay 18—ATA when relay 18—STA is operated completes an operating path from ground via contacts 19–18–ATA–13, 19–18–STA–3, 19–16–EM–5 and 19–16–RX–11, the break contact of continuity contacts 19–TOB–1 and the winding of relay 19—TOB to negative battery and completes an operating path from ground via contacts 19–18–ATA–13, 19–18–STA–3, 19–16–EM–5 and 19–16–RX–11, the make contact of transfer contacts 19–18–STA–4, the break contact of continuity contacts 19–ATO–3 and the winding of relay 19—ATO to negative battery.

Relay 19—TOB operated, locks via key BUZZER, energizes buzzer ALRM and prepares a locking path for relay 19—ATO, as previously described.

Relay 19—ATO operated:

(1) Prepares locking paths via the make contact of continuity contacts 19–ATO–3 and contacts 19–TOB–4 or contacts 19–AR–4 or contacts 19–18–LR–4.

(2) Further opens the operating and locking path of relays 18—AT and 18—ATA via contacts 18–19–ATO–1.

(3) Opens the second holding path for relay 18—STA, via contacts 18–19–ATO–2, releasing relay 18—STA.

(4) Completes the energizing circuit for the auxiliary transmitter tape alarm lamp ATTA, FIG. 19, via contacts 19–ATO–4.

(5) Opens operating paths for relays 19—RSP and 19—ASP via contacts 19–ATO–5 and 19–ATO–6, respectively.

Since the operation of relay 19—ATO releases relay 18—STA and the resultant release of relay 18—STA opens the operating path of relay 19—ATO, the make contact of continuity contacts 19–ATO–2, in the locking path for relay 19—ATO, is adjusted to make before contacts 18–19–ATO–2, in the holding path for relay 18—STA, break.

With the relays 18—AT, 18—ATA and 18—STA released, the station is in the no-traffic available condition for the auxiliary transmitter. The alarms and the no-traffic available condition of the auxiliary transmitter continue until operator action is taken to clear the alarm condition as follows:

(1) Operate and release key BUZZER to release relay 19—TOB and thus open a first holding path for relay 19—ATO and to silence audible alarm ALRM.

(2) Open the lid of the auxiliary transmitter to release relay 18—LR, as previously described, and thus open the second holding path for relay 19—ATO.

(3) Operate keys ALRS to complete an obvious operating path for relay 19—AR and thus remove the last holding path for relay 19—RTO which releases.

These actions remove the alarm condition and prepare the circuit for indicating that tape is available when a new tape is inserted in the auxilary transmitter.

When tape becomes tangled so that it cannot pass through the gate of the auxiliary transmitter the tight tape lever is operated opening the auxiliary transmitter tight tape contacts ATTT, FIG. 20. This opens the energizing path of the auxiliary transmitter clutch magnet, stopping transmission. If this occurs during the transmission of the second N of the end-of-message sequence, relay 16—P may be operated and locked up preventing resumption of transmission. However, since several characters in the tape can be transmitted after the tight tape lever operates but before the tape becomes fully taut, the auxiliary transmitter is permitted to send the complete end-of-message sequence if the tight tape lever operates when the following one or two characters in the tape complete the end-of-message sequence. Therefore, make contacts 20–16–ONB–5 of relay 16—ONB, which operates when the second N of the end-of-message sequence is read by the out reader, and make contacts 20–16–ONC–9 of relay 16–ONC, which operates when the third N of the end-of-message sequence is read by the out reader, shunt contacts ATTT to maintain the auxiliary transmitter clutch magnet energized despite the operation of the tight tape lever and thus transmit the complete end-of-message sequence.

When transmission from any station stops for 20 seconds without an end-of-message sequence having been transmitted, the action of the switching center is to register an interrupted transmission alarm and to initiate another transmitter-start polling sequence.

Previous to the time the message text transmission from the auxiliary transmitter is interrupted by, for example, tangled tape, relays 14—AXM and 18—STA are operated and relay 16—RXA is released. This prepares a path for the operation of relay 19—AES, when the SPACE character of the transmitter-start sequence operates relay 8—SP, from ground via contacts 19–18–STA–11, 19–16–RXA–4, 19–8–SP–2, the make contact of continuity contacts 19–14–AXM–3, the break contacts of continuity contacts 19–AES–3 and the winding of relay 19—AES to negative battery. This establishes the auxiliary transmitter emergency-stop condition previously described and the operator action to clear the condition must be taken before further transmission can take place from the auxiliary transmitter. Since the operation of relay 19—AES releases relay 18—STA by opening the holding path of relay 18—STA via contacts 18–19–AES–2 and the resultant release of relay 18—STA opens the operating path of relay 19—AES via contacts 19–18–STA–11, the make contact of continuity contacts 19–AES–3, in the locking path for relay 19—AES, is adjusted to make before contacts 18–19–AES–2 break.

During the time the message text is being transmitted from the regular transmitter, relays 14—RXM and 18—STR are operated and relay 16—RXA is released. If at this time a BLANK-PAUSE, SPACE is received, the operation of relay 8—SP then completes a path from ground via contacts 19–18–STR–10, 19–16–RXA–4, 19–8–SP–2, 19–14–RXM–3, the break contact of continuity contacts 19–RES–2 and the winding of relay 19—RES to negative battery. This establishes the regular transmitter emergency stop condition previously described. Since the operation of relay 19—RES opens the holding path of relay 18—STR via contacts 18–19–RES–1 and the resultant release of relay 18—STR opens the operating path of relay 19—RES via contacts 19–18–STR–10, the make contact of continuity contacts 19–RES–2, in the locking path for relay 19—RES, is adjusted to make before contacts 18–19–RES–1 break.

An open loop alarm is provided to notify the station operator of an open or prolonged spacing condition of the line. This alarm function is performed by PNP transistor Q701, FIG. 2, and associated open loop relay 2—OL.

With the receiving loop in the closed or marking condition, relay 2—REC is released and a potential of approximately —15 volts is applied to the negative side of varistor CR701 by way of —15 volt supply, resistor R720 and contacts 2–REC–1, holding the base potential of PNP transistor Q701, FIG. 2, to approximately this voltage with respect to ground and charging capacitor C705 to approximately 7 volts with respect to the —22 volt supply for the collector of transistor Q701.

The emitter of transistor Q701 is connected to +22 volt supply via resistor R725 and sufficient emitter current flows to bring the emitter voltage to approximately −15 volts, the base potential, with respect to ground. At this time varistor CR702, connected to the emitter of transistor Q701, is back-biased approximately 5 volts by the −10 volt supply applied by way of relay 2—OL, blocking the flow of current and maintaining relay 2—OL released.

When a spacing signal is received, relay 2—REC is energized and a ground potential is applied to the negative side of varistor CR701, via resistor R721 and contacts 2-REC-2, leaving the varistor back-biased. Under this condition, capacitor C705 is slowly charged in a positive direction by +22 volt supply by way of resistor R724, moving the base of transistor Q701, and thus the emitter of transistor Q701, in a positive direction. After about 200 milliseconds the emitter potential reaches −10 volts, varistor CR702 is forward biased and the resultant current flow by way of varistor CR702 and relay 2—OL operates open line relay 2—OL.

Relay 2—OL operated:
(1) Opens the previously described operating path for relay 15—HB via contacts 15-2-OL-1.
(2) Prepares a locking path for relay 19—OLS via contacts 19-2-OL-2.
(3) Completes an energizing path for buzzer ALRM by way of make contacts 19-2-OL-3 and break contacts 19-OLS-2.
(4) Completes an energizing path for the receiving line trouble lamp RTBL, FIG. 19, via contacts 19-2-OL-4.

Operation and release of the key BUZZER completes an obvious operating path for relay 19—OLS which locks via contacts 19-OLS-1 and contacts 19-2-OL-2 and opens the energizing path for buzzer ALRM via contacts 19-OLS-2. The receiving line trouble alarm lamp RTBL remains lighted until the receiving line closes, operating the armature of relay 2—REC to its marking contact and, in turn, applying a negative potential to varistor CR701, moving the potential of the base and emitter of transistor Q701 in a negative direction, back-biasing varistor CR702, releasing relays 2—OL and 19—OLS.

Relay 2—PFP is operated from positive 22-volt supply and relay 2—PFN is operated from negative 22-volt supply. As previously described, the release of relay 2—PFP or 2—PFN completes energizing paths for buzzer ALRM and lamp DC—PWR, FIG. 19. The buzzer ALRM may be silenced by operating key BUZZER. Lamp DC—PWR remains lighted until 22-volt supply is restored whereupon key BUZZER may be released since relay 2—PFN or 2—PFP operates, opening the energizing path for buzzer ALRM.

When a non-valid receiver cut-on code is received at the master station, relay 7—NVC is pulsed, operating relays 19—NVA and 19—NVB, as previously described. Relay 19—NVB locks via contacts of key BUZZER, supplements a holding path for relay 19—NVA and completes a previously described energizing path for buzzer ALRM via contacts of key BUZZER. Relay 19—NVA operated locks via two holding paths by way of contacts 19-AR-1 of relay 19—AR released and contacts 19-NVB-2 of relay 19—NVB operated and completes an energizing path for misdirect lamp MSDR. To remove the alarm indications, key BUZZER is operated and released, opening the locking relay 19—NVB which, upon releasing, opens the energizing path for buzzer ALRM and opens one holding path for relay 19—NVA. Key ALRS is then momentarily operated, operating relay 19—AR, as previously described, which in turn opens the other holding path for relay 19—NVA, releasing relay 19—NVA and extinguishing lamp MSDR.

SPECIAL OPERATING CONDITIONS

Under certain conditions it may be necessary or desirable to allow one station on a multistation line to transmit whenever one or more complete messages are available; that is, without waiting for a transmitter start poll. In effect this changes the multistation line to a single station line. Under this condition there must be no transmitter start polling from the switching center. The continuous transmission condition is established by operating the locking manual transmitter-start key MTST, FIG. 15, at one and only one station on the line.

Key MTST operated:
(1) Opens the previously described locking path for relay 7—Q via back contacts of key MTST so that the station is not in a "wait condition" if the condition had previously existed.
(2) Opens the previously described operating path for relay 15—SN or 15—SNC via back contacts of key MTST and closes an operating path for relay 15—SN or 15—SNC from ground via the make contact of continuity contacts 17-PFA-1, lead 17—15, the break contact of transfer contacts 15-18-STR-3, the break contact of transfer contacts 15-18-STA-9, break contacts 15-16-EM-7 and 15-SM-6, front contacts of key MTST, break contact of transfer contacts 15-19-SST-3, break contacts 15-16-RXA-1, contacts 15-17-RT-3 of relay 17—RT released or contacts 15-18-AT-5 of relay 18—AT operated, lead 15—13, switch SOM—NBR, FIG. 13, and thence via the previously described operating path for relay 15—SN or 15—SNC by way of lead 13—15 or lead 12—15.

Under the continuous transmission condition, operation of the transmitter control portion of the circuit is the same as that previously described except that when traffic is available, as indicated by the operation of relay 18—AT or release of relay 17—RT, relay 15—SN or 15—SNC is operated whenever relays 15—SM, 16—EM, 16—RXA, 18—STA and 18—STR are released. Since one or more of these relays are operated during message transmission and all the relays are released at the end of each message, relay 15—SN or 15—SNC operates at the completion of each message, with relay 18—AT operated or relay 17—RT released, and transmission continues until all message traffic has been completed.

As previously described, it is contemplated that the auxiliary transmitter should have preference with messages waiting in both transmitters. Recalling that the release of relay 15—SM completes the operating path for relays 18—AT and 18—ATA as well as relay 15—SN or 15—SNC and that the operation of relay 15—SN or 15—SNC reoperates relay 15—SM, opening the operating path for relays 18—AT and 18—ATA via contacts 18-15-SM-2, contacts 15-SM-6, in the operating path for relay 15—SN or 15—SNC, are adjusted to break before and reclose after contacts 18-15-SM-2 allowing sufficient additional time for relay 18—AT and 18—ATA to operate.

When it is desirable to prevent sending a new message from the regular transmitter, the regular transmitter hold locking key RTRH, FIG. 17, is operated, partially closing a possible operating path for relay 17—RT from ground by way of contacts 17-18-STR-7 and 17-15-SM—1, front contacts of key RTRH, lead RTHL and the winding of relay 17—RT to ground, preparing a locking path for relay 17—RT by way of contacts 17-RT-10 which shunt contacts 17-18-STR-7 and 17-15-SM-1 and partially closing a locking path for relays 17—RC and 17—LC, via contacts 17-18-STR-12, varistor CR906, contacts 17-RC-10 and front contacts of key RTRH, shunting the regular transmitter stop contacts RTST. If key RTRH is operated when a message is waiting in the regular transmitter and relay 17—RT is released and relay 17—RC is operated, relay 17—RT will operate and lock via the contacts of key RTRH if the regular transmitter is not in use and a polling cycle is not in progress, as indicated by relays 15—SM and 18—STR released, setting up a no-traffic-available condition for the regular transmitter, as previously described, and relay 17—RC and relay 17—LC, if operated, will be maintained operated via the contacts of key RTRH if the regular transmitter is not in use or at the end of the message transmission if the regular transmitter is sending. When key RTRH is then released, the regular transmitter traffic available condition is restored by the release of relay 17—RT.

When it is desirable to prevent sending a new message from the auxiliary transmitter, the auxiliary transmitter hold locking key ATRH, FIG. 18, is operated, opening the previously described operating and holding paths for relays 18—AT and 18—ATA via back contacts of key ATRH. If the auxiliary transmitter is in use, relays 18—AT and 18—ATA will not release at this time due to the previously described locking path by way of contacts 18—AT-7 and either contacts 18-15-SM-3 or 18-STA-2 but will release at the end of the message transmission. The release of key ATRH will restore the circuit to the previous non-holding condition.

Transmision of pilot traffic

In some cases it may be desirable to send the message on two separate tapes. The first one, called the pilot tape, contains the routing line and may contain part of the message text. The second one, called the trailer tape, contains the remainder of the message text and the end-of-message sequence.

The pilot tape may be typed on the perforator keyboard for transmission from the regular transmitter or it may be perforated in a separate tape for transmission from the auxiliary transmitter. The trailer tape is always transmitted from the auxiliary transmitter.

To send the pilot tape from the regular transmitter to be followed by a trailer tape in the auxiliary transmitter, the station operator first types the pilot message on the perforator keyboard. This may be done even though one or more complete messages are awaiting transmission in the regular transmitter. No further messages may be typed after the pilot message until the pilot transmission has been completed. In addition, the auxiliary transmitter may not contain a message tape and any tape trouble condition in the regular transmitter or the auxiliary transmitter must be clear as indicated by relays 19—RTO and 19—ATO released.

When the perforated pilot tape is made available for transmission, relay 17—RC is operated as previously described. The station operator then operates locking key RTRH, FIG. 17, and relay 17—RT operates, as previously described, if the regular transmitter is not sending at this time. Nonlocking pilot tape key PTTP, FIG. 19, is momentarily operated at this time completing an operating path from ground by way of front contacts of key RTRH, make contacts 17-RC-10, varistor CR—907, lead 17-19-RPTA, break contacts 19-18-AT-10, front contacts of key PTTP, lead 19-18-RPTB, back contacts of key ATRH, FIG. 18, lead 18-19-RPTC, break contacts 19-AR-5, break contacts 19-ATO-5, break contacts 19-RTO-5, and the winding of the regular send pilot relay 19—RSP to negative battery.

Relay 19—RSP operated:

(1) Opens the previously described operating path for relay 17—RT by way of contact 17-19-RSP-1.

(2) Opens the previously described operating path for relays 18—AT and 18—ATA via contacts 18-19-RSP-2.

(3) Partially completes a locking path by way of contacts 19-RSP-3.

(4) Completes a path shunting the front contacts of key PTTP in the operating path of relay 19—RSP by way of make contacts 19-RSP-4 and break contacts 19-18-PS-11 or the break contact of continuity contacts 19-SST-8.

(5) Completes a path by way of contacts 19-RSP-5 shunting contacts 19-RTO-5 in the previously described operating path for relay 19—RSP.

(6) Completes an obvious energizing path for the regular transmitter pilot tape lamp RTPT, FIG. 19, via contacts 19-RSP-6.

(7) Partially completes a possible operating path for relay 15—SNC by way of contacts 15-19-RSP-7.

(8) Partially completes a possible operating path for relays 19—AES by way of contacts 19-RSP-8.

(9) Partially completes a possible operating path for relay 19—ATO by way of contacts 19-RSP-9.

(10) Opens an operating path for relay 19—SST by way of the break contact of transfer contacts 19-RSP-10 and partially closes an operating path for relay 19—SST by way of the make contact of contacts 19-RSP-10.

(11) Partially completes a possible holding path for relay 18—STR by way of contacts 18-19-RSP-11.

The trailer tape is now inserted into the auxiliary transmitter and relays 18—EAT and 18—LR are operated as previously described. This completes the locking path for relay 19—RSP from ground by way of contacts 19-18-LR-5, 19-18-EAT-2 and 19-RSP-3, and the contacts of relays 18—AT, 18—PS or 19—SST, 19—RSP, 19—AR, 19—ATO and 19—RTO in the previously described operating path for relay 19—RSP. The station operator now releases key RTRH and relay 17—RT releases, if it had been previously operated, indicating that traffic is available in the regular transmitter. The tape messages in the regular transmitter will now be transmitted as previously described, with relay 15—SN or 15—SNC operating followed by the operation of relays 18—PS and 18—STR. If a precedence request was made for a message in the regular transmitter, it will be picked up on the precedence poll of the station, otherwise it will be picked up on the regular poll. The transmitter can also be manually started in the same manner as previously described and switch SOM—NBR, FIG. 13, may be operated to the automatic or manual position. If the end-of-message sequence is read by the reading contacts of the regular transmitter, then the message just transmitted is recognized as one of the messages that may precede the pilot message and, with relay 17—RT maintained released, one complete message for each poll of the station will be transmitted from the regular transmitter until finally the pilot tape is reached and, since relay 17—RT is maintained released, the pilot tape message is transmitted in the usual manner.

As the tape feeds just prior to the last character of the pilot tape over the sensing pins of the regular transmitter contacts RTST, FIG. 17, open and as previously described relay 17—RC releases stopping the regular transmitter and operating relay 17—RT which in turn releases relay 18—STR. Near the end of the rotation of the distributor relay 20—OAKA releases completing an operating path from ground via break contacts 19-17-RC-11, break contacts 19-20-OAK-4, the make contact of transfer contacts 19-RSP-10 and the winding of relay 19—SST to negative battery.

Relay 19—SST operated:

(1) Opens the previously described operating path for relays 15—SN and 15—SNC by way of the break contact of transfer contacts 13-19-SST-1 and partially completes a possible operating path for relay 15—SNC by way of the make contact of contacts 13-19-SST-1.

(2) Opens the previously described energizing path for the C selector step magnet, FIG. 12, by way of contacts 12-19-SST-2.

(3) Opens the previously described operating path for relay 15—SN or 15—SNC via the break contact of transfer contacts 15-19-SST-3 and partially completes a possible operating path for relay 15—SNC by way of the make contact of transfer contacts 15-19-SST-3.

(4) Opens an energizing path for the auxiliary transmitter clutch magnet, FIG. 20, via contacts 20-19-SST-4.

(5) Opens a possible operating path for relay 19—SST by way of the break contact of continuity contacts 19—SST-5 and partially completes a locking path by way of the make contact of contacts 19-SST-5.

(6) Opens a holding path for relay 19—ASP by way of the break contact of continuity contacts 19-SST-6 and partially completes a holding path for relay 19—ASP via the make contact of contacts 19-SST-6.

(7) Prepares a locking path from ground via make contact 19-SST-7 and the make contact of transfer contacts 19-RSP-10.

(8) Opens one of the previously described holding paths for relay 19—RSP by way of the break contact of continuity contacts 19-SST-8 and prepares a path via the make contact of continuity contacts 19-SST-8 shunting contacts 19-18-AT-10 in the previously described operating and locking path for relay 19—RSP.

(9) Prepares a path via contacts 18-19-SST-9 shunting contacts 18-19-RSP-2 in the previously described operating path for relays 18—AT and 18—ATA, and with relay 18—STR now released relays 18—AT and 18—ATA operate.

The operation of relay 18—AT completes an operating path from ground via make contact of continuity contacts 17-PFA-1, lead 17—15, the break contact of transfer contacts 15-18-STR-3, the break contact of transfer contacts 15-18-STA-9, break contacts 15-16-EM-7, break contacts 15-SM-6, make contacts 15-19-RSP-7, the make contact of transfer contacts 15-19-SST-3, break contacts 15-16-RXA-1, make contacts 15-18-AT-5, lead 15—13, the make contact of transfer contacts 13-19-SST-1, lead 12—15, the break contact of continuity contacts 15-SNC-3 and the winding of relay 15—SNC to negative battery. As previously described, relay 15—SNC operated operates relay 18—PS which in turn opens the operating and holding path of relay 19—RSP, via contacts 19-18-PS-11, releasing relay 19—RSP and operates relay 18—STA causing the tape in the auxiliary transmitter to be transmitted as previously described. The release of relay 19—RSP opens the holding path of relay 19—SST via the make contact of transfer contacts 19-RSP-10 releasing relay 19—SST.

The transfer from the regular to the auxiliary transmitter takes place just prior to transmission of the last character in the pilot tape and this character is not sent to the line. For this reason an extra character, for instance LETTERS, should be perforated in the pilot tape.

To cancel a requested pilot transmission, key ALRS, FIG. 19, should be momentarily operated. As previously described, this operates relay 19—AR which opens the operating and holding path for relay 19—RSP via contacts 19-AR-5 thus releasing relay 19—RSP and restoring the circuits to normal operation.

If an emergency stop is registered by the station while the pilot tape is being transmitted from the regular transmitter, then relays 19—RES and 19—ESB operate as previously described. In addition, the operating path is completed for relay 19—AES from ground by way of the contacts of relays 18—STR, 16—RXA, 18—SP and 14—RXM in the previously described operating path for relay 19—RES and then via make contact 19-RSP-8, break contact of continuity contacts 19-14-AXM-3, the break contacts of continuity contacts 19-AES-3 and the winding of relay 19—AES to negative battery. Relay 19—AES is thus operated preventing the auxiliary transmitter from starting up until the emergency stop condition is cleared as previously described. As previously described, the operation of relay 19—RES opens a holding path for relay 18—STR by way of contacts 18-19-RES-1. Relay 18—STR, however, is maintained operated due to the path shunting contacts 18-19-RES-1 by way of break contacts 18-19-AES-5 and make contacts 18-19-RSP-11 insuring that both relays 19—RES and 19—AES operate before relay 18—STR releases since the release of relay 18—STR opens the common operating path of relays 19—RES and 19—AES by way of contacts 19-18-STR-10. In the course of clearing the emergency stop condition, relay 19—AR has to be operated automatically cancelling the pilot transmission request as previously described.

If a regular transmitter tape-out trouble is registered while the pilot tape is being transmitted from the regular transmitter, the relays 19—RTO and 19—TOB operate as previously described. In addition, an operating path is completed from ground via contacts 19-TO-1, 19-RSP-9, the break contact of transfer contacts 19-18-STA-4, the break contact of continuity contacts 19-ATO-3 and the winding of relay 19—ATO to regular battery operating relay 19—ATO and thus preventing the auxiliary transmitter from starting up until the tape-out condition is cleared as previously described. The operation of relay 19—RTO opens the previously described operating path for relay 19—RSP via contact 19-RTO-5. Relay 19—RSP is maintained operated, however, by way of contacts 19-RSP-5, which shunt contacts 19-RTO-5, until relay 19—ATO operates opening the operating and locking circuit of relay 19—RSP via contacts 19-ATO-5. This insures that relay 19—ATO operates before relay 19—RSP releases and opens the previously described operating circuit for relay 19—ATO via contacts 19-RSP-9.

To send a pilot tape from the auxiliary transmitter the station operator first operates the auxiliary transmitter hold key ATRH, FIG. 18, and inserts the pilot tape into the auxiliary transmitter causing the operation of relays 18—LR and 18—EAT as previously described. At this time the auxiliary transmitter should not contain any other message and no tape trouble condition should exist for the auxiliary transmitter as indicated by relay 19—ATO released. The station operator then momentarily operates pilot tape key PTTP, FIG. 19, completing an operating path from ground via the make contact of transfer contacts 19-18-EAT-3, the make contact of transfer contacts 19-18-LR-6, front contacts of key PTTP, lead 19-18-XPTA, the front contact of the make-before-break contacts of key ATRH, lead 18-19-XPTC, break contact 19-AR-6, break contact 19-ATO-6 and the winding of auxiliary send pilot relay 19—ASP to negative battery.

Relay 19—ASP operated:

(1) Opens an energizing circuit for the auxiliary transmitter clutch magnet, FIG. 20, by way of contacts 20-19-ASP-1.

(2) Prepares a locking path via contacts 19-ASP-2 which shunt the contacts of key PTTP in the previously described operating path of relay 19—ASP.

(3) Partially closes a holding path for relays 18—AT and 18—ATA via contacts 18-19-ASP-3.

(4) Partially closes a holding path for relay 19—ASP by way of contacts 19-ASP-4.

(5) Partially closes an operating and locking path for relay 19—SST via contacts 19-ASP-5.

(6) Completes an obvious energizing path for the auxiliary transmitter pilot tape lamp ATPT, FIG. 19, via contacts 19-ASP-6.

Key ATRH is now released completing the previously described operating path for relays 18—AT and 18—ATA, preparing the holding path for relay 19—ASP from ground via break contacts 19-16-ONC-10 or 19-16-OND-6 or contacts 19-18-ATA-14 of relay 18—ATA released and then by way of the break contact of continuity contacts 19-SST-6, make contacts 19-ASP-4, lead 19-18-XPTB, the break contact of the make-before-break contacts of key ATRH, lead 18-19-XPTC, contacts 19-AR-6 and 19-ATO-6 and the winding of relay 19—ASP to negative battery and opening the previously described operating and locking path for relay 19—ASP by way of the front contact of make-before-break contacts of key ATRH. With relays 18—AT and 18—ATA operated the pilot tape message will be transmitted as a first message on the next precedence poll if a precedence request was made for the auxiliary transmitter or on the next regular poll or under manual control of the auxiliary transmitter with relay 15—SN or 15—SNC operating followed by the operation of relays 18—PS and 18—STA, as previously described.

If an end-of-message sequence is read in the pilot tape, relays 16—ONC and 16—OND will operate as previously described. In that case with relays 18—ATA, 16—ONC and 16—OND operated relay 19—ASP loses its holding path and releases restoring the circuits to normal. Thus the erroneous insertion of a complete message tape results in the cancellation of the pilot transmission request.

Assuming that the pilot tape is properly prepared, it will feed through the auxiliary transmitter until the pilot tape runs out releasing relay 18—EAT or the tape lid is raised releasing relay 18—LR, completing an operating path from ground via the break contact of transfer contacts 19-18-EAT-3 or the make contact of transfer contacts 19-18-EAT-3 and the break contact of transfer contacts 19-18-LR-6 and then by way of the break contact of continuity contacts 19-SST-5, make contact 19-ASP-5, the break contact of transfer contacts 19-RSP-10 and the winding of relay 19—SST to negative battery.

The operation of relay 19—SST completes a self-locking path via the make contact of continuity contacts 19-SST-5, opens the previously described operating path for relay 19—SST by way of the break contact of contacts 19-SST-5, completes a holding path for relay 19—ASP from ground via the break contact of transfer contacts 19-18-EAT-3 or the make contact of contacts 19-18-EAT-3 and the break contact of transfer contacts 19-18-LR-6 and then via the make contact of continuity contacts 19-SST-6 and the previously described holding path for relay 19—ASP via contacts 19-ASP-4 and opens the previously described holding path for relay 19—ASP by way of the break contact of continuity contacts 19-SST-6. Relays 18—AT and 18—ATA do not release at this time since the contacts of relays 18—LR and 18—EAT are shunted by a path via contacts 18-AT-12 and 18-19-ASP-3 thus maintaining relay 18—STA operated.

With both relay 19—ASP and 19—SST operated the energizing path for the auxiliary transmitter clutch magnet via contacts 20-19-ASP-1 or 20-19-SST-4 is opened stopping the auxiliary transmitter.

The pilot tape is now removed from the auxiliary transmitter and the trailer tape is inserted. The time elapsed between the stopping of the pilot transmission and the insertion of the trailer tape should not exceed 20 seconds as a new polling cycle might be started by the central station causing an emergency stop condition in the auxiliary transmitter.

With the insertion of the trailer tape in the auxiliary transmitter, relays 18—EAT and 18—LR operate opening the holding path of relay 19—ASP. Relay 19—ASP releases reclosing the energizing path for the auxiliary transmitter clutch magnet by way of contacts 20-19-ASP-1 and opening the locking path of relay 19—SST by way of contacts 19-ASP-5. The trailer tape is now transmitted in the usual manner and with relays 19—ASP and 19—SST released the circuits are restored to normal operation.

To cancel requested pilot transmission from the auxiliary transmitter key ALRS, FIG. 19, should be momentarily operated operating relay 19—AR which in turn releases relay 19—ASP restoring the circuits to normal operation.

An emergency stop condition occurring during the pilot transmission from the auxiliary transmitter stops the auxiliary transmitter and gives the appropriate alarm conditions in the same manner as previously described. In the course of clearing the alarm, relay 19—AR will be operated automatically cancelling the pilot transmission request.

It is understood that the detailed description of a specific embodiment of the invention is by way of illustration only and it is not intended that the invention should be considered as limited to such specific embodiment but capable of modification without departing from the spirit of the invention and within the scope of the appended claims.

What is claimed is:

1. A telegraph station on a two-way multistation line including a telegraph receiver, a code generator for transmitting supervisory code signals to said line, a tape transmitter for transmitting telegraph messages to said line, a perforator for supplying perforated tape messages to said transmitter, a multistage shift register for storing code signals received from said line, a receiver control circuit for applying said stored code signals to said receiver in response to the storage of a predetermined code signal by said shift register, a normally disabled transmitter start circuit for starting said transmitter, a normally disabled generator start circuit for starting said code generator, a transmitter control circuit for disabling said receiver control circuit and momentarily selecting said transmitter start circuit in response to the storage of a predetermined sequence of code signals by said shift register, a pulse circuit for selecting said generator start circuit in response to the storage of a subsequent code signal by said shift register, a perforator message mounting circuit for counting the messages supplied by said perforator to said transmitter, a transmitter message counting circuit for counting the messages transmitted by said transmitter and a comparison circuit jointly responsive to said perforator message counting circuit and said transmiter message counting circuit for enabling said transmitter start circuit and said generator start circuit.

2. A telegraph station on a two-way multistation line including a code generator for transmitting supervisory code signals to said line, a tape transmitter for transmitting telegraph messages to said line, a perforator for preparing and supplying perforator tape messages terminated by end-of-message characters to said transmitter, a storage circuit for storing code signals received from said line, a perforator message counting circuit responsive to the perforation of end-of-message characters by said perforator for registering the count of messages supplied by said tape perforator to said transmitter, a transmitter message counting circuit responsive to the transmission of end-of-message characters by said transmitter for registering the count of messages transmitted by said transmitter, a comparison circuit for comparing the registered count of said perforator message counting circuit and the registered count of said transmitter message counting circuit, a transmitter start circuit jointly responsive to the storage of a code signal by said storage circuit and said comparison circuit for starting said transmitter and a generator start circuit jointly responsive to the subsequent storage of a second code signal by said storage circuit and said comparison circuit for starting said code generator.

3. In a telegraph system, a telegraph station, a two-way telegraph channel extending from said station, a tape transmitter for transmitting telegraph code messages to said channel, a perforator for supplying perforated tape messages to said transmitter, a perforator stepping switch, means responsive to the perforation of a tape message by said perforator for advancing said perforator stepping switch, a transmitter stepping switch, means responsive to the transmission of a message by said transmitter for advancing said transmitter stepping switch, a first comparison circuit jointly responsive to said perforator stepping switch and said transmitter stepping switch for conditioning said transmitter, a transmitter circuit for selectively starting said conditioned transmitter in response to the reception of a code signal from said channel, and a second comparison circuit jointly responsive to said perforator stepping switch and said transmitter stepping switch for disabling said perforator stepping switch advancing means in said transmitter stepping switch advancing means.

4. In a telegraph system, a telegraph station, a two-way telegraph channel extending from said station, a tape transmitter for transmitting telegraph code messages to said channel, a perforator for supplying perforated tape messages to said transmitter, a perforator stepping switch, means responsive to the perforation of a tape message by said perforator for advancing said perforator stepping switch, a transmitter stepping switch, means responsive to the transmission of messages by said transmitter for advancing said transmitter stepping switch, a first comparison circuit jointly responsive to said perforator stepping switch and said transmitter stepping switch for disabling said transmitter and a second comparison circuit jointly responsive to said perforator stepping switch and said transmitter stepping switch for disabling said first comparison.

5. In a telegraph system, a two-way telegraph channel, a message storage transmitter for transmitting signals to said channel, a tape transmitter for transmitting signals to said channel, a code generator for transmitting signals to said channel, a first selective means jointly responsive to a signal received from said channel and the presence of a stored message in said message transmitter for starting said message transmitter, a normally disabled selective means responsive to said received signal for starting said tape transmitter, a tape sensing circuit responsive to the presence of tape in said tape transmitter for disabling said first selective means and enabling said normally disabled selective means and a third selective means jointly responsive to a second signal received from said channel and the presence of a stored message in said message transmitter for starting said code generator.

6. In a telegraph system, a two-way telegraph channel, a message storage transmitter for transmitting signals to said channel, a tape transmitter for transmitting signals to said channel, a code generator for transmitting signals to said channel, a first selective means jointly responsive to a signal received from said channel and the presence of a stored message in said message transmitter for starting said message transmitter, a normally disabled selective means responsive to said received signal for starting said tape transmitter, a tape sensing circuit responsive to the presence of tape in said tape transmitter for disabling said first selective means and enabling said normally disabled selective means and a third selective means jointly responsive to a second signal received from said channel and the presence of tape in said tape transmitter for starting said code generator.

7. In a telegraph system, a two-way telegraph channel, a message storage transmitter for transmitting signals to said channel, a tape transmitter for transmitting signals to said channel, a first selective means jointly responsive to a signal received from said channel and the presence of a stored message in said message transmitter for starting said message transmitter, a normally disabled selective means responsive to said received signal for starting said tape transmitter and a tape sensing circuit responsive to the insertion of tape in said tape transmitter for disabling said first selective means and enabling said normally disabled selective means.

8. In a telegraph system, a two-way telegraph channel, a message storage transmitter for transmitting signals to said channel, a tape transmitter for transmitting signals to said channel, a normally disabled message transmitter start circuit for starting said message transmitter, a normally disabled tape transmitter start circuit for starting said tape transmitter, a first selective means jointly responsive to a signal received from said channel and the presence of a stored message in said message transmitter for enabling said message transmitter start circuit, a normally disabled selective means responsive to said received signal for enabling said tape transmitter start circuit, a tape sensing circuit responsive to the presence of tape in said tape transmitter for disabling said first selective means and enabling said normally disabled selective means, a normally disabled pilot circuit jointly responsive to the depletion of said stored messages in said message transmitter and the presence of tape in said tape transmitter for enabling said tape transmitter start circuit and a manually operable means for disabling said tape sensing circuit and enabling said pilot circuit.

9. In a telegraph system, a message two-way telegraph channel, a storage transmitter for transmitting code signals to said channel, a tape transmitter for transmitting code signals to said channel, a first selective means jointly responsive to a signal received from said channel and the presence of a stored message in said storage transmitter for starting said storage transmitter, a normally disabled selective means responsive to said received signal for starting said tape transmitter, a tape sensing circuit responsive to the presence of tape in said tape transmitter for disabling said first selective means and enabling said normally disabled selective means, a normally disabled pilot circuit jointly responsive to the depletion of the stored message in said storage transmitter and the presence of tape in said tape transmitter for starting said tape transmitter and a manually operable means for disabling said tape sensing circuit and enabling said pilot circuit.

10. A telegraph system comprising a plurality of stations, a telegraph channel extending to all of said stations, a code generator at each of said stations for applying supervisory code signals to said channel, a tape transmitter at each of said stations for transmitting message code signals to said channel, a tape perforator for preparing and supplying perforated messages to said transmitter, a storage circuit at each of said stations for storing code signals received from said channel, a perforator message counting circuit for counting the messages perforated by said perforator, a transmitter counting circuit for counting the messages transmitted by said transmitter, a normally disabled generator start circuit for starting said code generator, a first transmitter circuit for selecting said generator start circuit in response to the storage by said storage circuit of a first code signal individual to said station, a second transmitter circuit for preparing said selected generator start circuit in response to the subsequent storage by said storage circuit of a second code signal common to all stations and a comparison circuit jointly responsive to said perforator message counting circuit and said transmitter message counting circuit for enabling said prepared generator start circuit.

11. A telegraph station on a two-way multistation line including a code generator for transmitting supervisory code signals to said line, a tape transmitter for transmitting telegraph messages to said line, a perforator for supplying perforated tape messages to said transmitter, a storage circuit for storing code signals received from said line, a perforator message counting circuit for counting messages supplied by said perforator to said transmitter, a transmitter message counting circuit for counting messages transmitted by said transmitter, a comparison circuit for comparing the message counts of said perforator message counting circuit and said transmitter message counting circuit, a transmitter control circuit for establishing a condition in response to the storage of a code hignal by said storage circuit, a memory circuit for storing a condition in response to the subsequent storage of a code signal by said storage circuit, a transmitter start circuit jointly responsive to said comparison circuit and said condition established by said transmitter control circuit for starting said transmitter and a generator start circuit jointly responsive to said comparison circuit, said condition established by said transmitter control circuit and said condition stored by said memory circuit for starting said code generator.

12. A telegraph system comprising a plurality of stations, a telegraph channel extending to all of said stations, a message storage transmitter at each of said stations, a code generator at each of said stations, a start circuit at each of said stations jointly responsive to the presence of a stored message in said transmitter and the reception of a signal individual to said station for starting said transmitter, a normally disabled control circuit at each of said stations for starting said code generator in response to the presence of a stored message in said transmitter and means responsive to the reception of said individual signal and the subsequent reception of a predetermined signal for enabling said control circuit.

13. A telegraph system comprising a plurality of stations, a telegraph channel extending to all of said stations, a tape transmitter at each of said stations, a code generator at each of said stations, a start circuit at each of said stations jointly responsive to the insertion of tape in said transmitter and to the reception of a code signal individual to said station for starting said transmitter, a normally disabled control circuit at each of said stations for starting said code generator in response to the insertion of tape in said transmitter, a pulse circuit responsive to the reception of said code signal for selecting said control circuit and selective means at all of said stations responsive to the reception of a common code signal for enabling said selected control circuits.

14. A telegraph system comprising a plurality of stations, a telegraph channel extending to all of said stations, a message storage transmitter at each of said stations, a code generator at each of said stations, a transmitter start circuit at each of said stations jointly responsive to the presence of a stored message in said transmitter and the reception of a code signal individual to said station for starting said transmitter, a normally disabled generator start circuit jointly responsive to the presence of a stored message in said transmitter and the reception of said code signal individual to said station for starting said code generator and selective means responsive to the subsequent reception of a predetermined code signal for enabling said generator start circuit.

15. In a telegraph system, a telegraph station, a telegraph channel extending to said station, a telegraph recorder at said station, a multistage shift register at said station, an input circuit for storing permutation code signal elements received over said channel in the first of said shift register stages, a character timing circuit responsive to the reception of said code signal elements for shifting said stored code elements to each subsequent one of said shift register stages, an output circuit for reading said stored code signal elements in a final one of said shift register stages and a translating circuit selectively responsive to the storage of predetermined code signal elements in said shift register stages for supplying said code signal elements read by said output circuit to said telegraph recorder.

16. In a telegraph system, a telegraph station, a telegraph channel extending to said station, a telegraph receiver at said station, a storage circuit at said station for storing successive code signals received from said channel, an output circuit for applying code signals to said receiver, a gate circuit for blocking the application of said stored code signals by said output circuit to said receiver, a translating circuit selectively responsive to the storage of a first code signal in said storage circuit for disabling said gate circuit and means responsive to the reception of each of said successive code signals from said channel for shifting the next prior one of said code signals from said storage circuit to said output circuit.

17. In a telegraph system, a telegraph station, a telegraph channel extending to said station, a telegraph receiver at said station, a plurality of storage circuits in tandem at said station, an input circuit for storing code signals received over said channel in the first one of said storage circuits, means responsive to said received code signals for successively shifting said stored code signals to each subsequent one of said storage circuits, an output circuit for reading code signals stored in a final one of said storage circuits, a translating circuit selectively responsive to predetermined code signals stored in a plurality of said storage circuits and a gate circuit responsive to said translating circuit for supplying code signals read by said output circuit to said receiver.

18. In a telegraph system, a telegraph station, a telegraph channel extending to said station, a telegraph receiver at said station, a storage circuit at said station for storing successive code signals received from said channel, an output circuit, a translating circuit responsive to the storage of a first code signal in said storage circuit for extending said output circuit to said receiver and means responsive to the reception of each of said successive code signals for shifting the next prior one of said code signals from said storage circuit to said output circuit.

19. In a telegraph system, a telegraph station, a source of start-stop permutation code signals, a telegraph channel extending from said source to said station, a telegraph receiver at said station, a plurality of tandem storage means at said station, an input circuit for sequentially storing in the first one of said storage means each of said elements received over said channel, a pulse generator responsive to the reception of each of said start elements for generating a code pulse and a plurality of element pulses, means responsive to the generation of said element pulses by said pulse generator for successively shifting said stored elements to each subsequent one of said storage means, a translating circuit responsive to the generation of said code pulse by said pulse generator for simultaneously reading said stored elements in a plurality of said storage means and an output circuit responsive to said translating circuit for applying said stored elements in one of said subsequent storage means to said receiver.

20. In a telegraph system, a telegraph station, a telegraph channel extending to said station, a telegraph recorder at said station, a storage circuit responsive to the reception of successive code signals from said channel for storing said code signals, a selective output circuit responsive to the storage of a predetermined code signal in said storage circuit for supplying code signals to said recorder and means responsive to the reception of the code signal subsequent to said predetermined code signal for shifting said stored predetermined code signal to said output circuit.

21. In a telegraph system, a plurality of telegraph stations, a telegraph channel extending to each of said stations, a telegraph receiver at each of said stations, a storage circuit at each of said stations responsive to the reception of successive code signals from said channel for storing said code signals, an output circuit selectively responsive to the storage in said storage circuit of a code signal individual to said station for supplying code signals to said receiver, means responsive to the reception of the code signal subsequent to said individual code signal for shifting said stored individual code signal to said output circuit and selective means at all of said stations responsive to the storage of a common code signal in said storage circuit for disabling said output circuits.

22. In a telegraph system, a plurality of telegraph stations, a telegraph channel extending to each of said stations, a telegraph receiver at each of said stations, a multistage shift register at each of said stations, an input circuit for storing code signals received over said channel in the first one of said shift register stages, a character timing circuit responsive to the reception of said code signals for shifting said stored code signals to each subsequent one of said shift register stages, an output circuit for reading said stored code signals in a subsequent one of said shift register stages, a translating circuit responsive to the storage of a code signal individual to said station in said shift register stages for supplying said code signals read by said output circuit to said telegraph receiver and a selective circuit at each of said stations responsive to the storage of a code signal common to all of said stations in said shift register stages for disabling said translating circuit.

23. In a telegraph system, a telegraph station, a telegraph channel extending to said station, a telegraph receiver at said station, a storage circuit responsive to the reception of each code signal from said channel for storing said code signal, an output circuit for supplying code signals to said receiver, means responsive to the reception of the code signal subsequent to said stored code signal for applying said stored code signal to said output circuit, a first selective means responsive to the storage of a first code signal in said storage circuit for disabling said output circuit and a second selective means jointly responsive to the storage of a second code signal in said storage circuit and said first selective means for disabling said first selective means and deleting the storage of said second stored code signal.

24. In a telegraph system, a plurality of telegraph stations, a telegraph channel extending to each of said stations, a telegraph receiver at each of said stations, a multistage shift register at each of said stations, an input circuit for storing code signals received over said channel in the first one of said shift register stages, a character timing circuit responsive to the reception of said code signals for shifting said stored code signals to each subsequent one of said shift register stages, an output circuit for reading said stored code signals in a subsequent one of said shift register stages, a translating circuit responsive to the storage of a code signal individual to said station in said shift register stages for supplying said code signals read by said output circuit to said telegraph receiver, a first selective means at each of said stations responsive to the storage in said shift register stages of a first code signal common to all of said stations for disabling said translating circuit and a second selective means jointly responsive to the storage in said shift register stages of a second code signal common to all of said stations and said first selective means for disabling said first selective means and deleting the storage of said second code signal.

25. A telegraph station comprising a telegraph recorder, a storage circuit for storing code signals received by said station, an output circuit for supplying code signals stored in said storage circuit to said recorder, a first timing circuit selectively responsive to the storage of a first code signal in said storage circuit, a second timing circuit responsive to said first timing circuit for temporarily disabling said output circuit, a selective circuit jointly responsive to the storage of a second code signal in said storage circuit and said second timing circuit for maintaining disabled said output circuit and means responsive to the reception by said station of a code signal subsequent to said first code signal for disabling said first timing circuit.

26. A telegraph station comprising a telegraph recorder, a storage circuit for storing code signals received by said station, an output circuit for supplying code signals to said recorder, a first timing circuit selectively operated in response to the storage of a first code signal in said storage circuit after a predetermined delay thereof, a second timing circuit responsive to the operation of said first timing circuit for temporarily disabling said output circuit, a selective circuit jointly responsive to the storage of a second code signal in said storage circuit and said second timing circuit for maintaining disabled said output circuit and means responsive to the reception by said station of a code signal subsequent to said first code signal for disabling said first timing circuit and supplying said stored first code signal to said output circuit.

27. In a telegraph system, a telegraph station, a telegraph channel extending to said station, a telegraph recorder at said station, a multistage shift register at said station, an input circuit for storing code signals received from said channel in the first one of said shift register stages, a pulse generator responsive to the reception of said code signals for shifting said stored code signals to each subsequent one of said shift register stages, an output circuit for reading said stored code signals in a subsequent one of said shift register stages, a translating circuit selectively responsive to the storage of an individual code signal in said shift register stages for supplying said code signals read by said output circuit to said telegraph recorder, a first timing circuit selectively responsive to the storage of a first predetermined code signal in said shift register stages, a second timing circuit responsive to said first timing circuit for temporarily disabling said translating circuit and a selective circuit jointly responsive to the storage of a second predetermined code signal in said shift register stages and said second timing circuit for maintaining disabled said translating circuit.

28. A telegraph station comprising a telegraph recorder, a storage circuit for storing code signals received by said station, an output circuit for supplying code signals to said recorder, a first timing circuit selectively responsive to the storage of a first code signal in said storage circuit, a second timing circuit responsive to said first timing circuit for temporarily disabling said output circuit, a selective circuit jointly responsive to the storage of a second code signal in said storage circuit and said second timing circuit for maintaining disabled said output circuit, a pulse generator responsive to the reception by said station of each code signal subsequent to each of said stored code signals for supplying each of said stored code signals to said output circuit and means jointly responsive to the storage of a third code signal in said storage circuit and said selective circuit for disabling said selective circuit and deleting the storage of said third code signal.

29. In a telegraph system, a teelgraph channel, a telegraph storage transmitter transmissively associated with said channel, a code generator transmissively associated with said channel, first selective means jointly responsive to the reception of a first code signal from said channel and the presence of a storage supply in said transmitter, for starting said transmitter, second selective means jointly responsive to said reception of said first code signal and the absence of a storage supply in said transmitter for starting said code generator, and third selective means jointly responsive to the reception of a second code signal from said channel and the presence of a storage supply in said transmitter for starting said code generator.

30. In a telegraph system, a telegraph channel, a telegraph receiver, a storage circuit for storing successive code signals received from said channel, a translating circuit selectively responsive to predetermined code signals stored in said storage circuit for extending the output of said storage circuit to said telegraph receiver and means responsive to the reception of each of said successive code signals from said channel for shifting a prior one of said code signals from said storage circuit to said telegraph receiver.

31. In a telegraph system, a telegraph station, a telegraph channel extending to said station, a telegraph receiver at said station, a shift register circuit at said station for successively storing code characters received from said channel, and means selectively responsive to the storage of a predetermined code character in said shift register for extending the output of said shift register to said receiver.

32. In a telegraph system, a telegraph station, a telegraph channel extending to said station, a telegraph receiver at said station, a shift register circuit at said station, a gate circuit for applying code characters to said receiver, means for successively storing code characters received from said channel in said shift register, means responsive to the reception of each of said code characters for shifting the prior character stored in said shift register to said gate circuit, and means selectively responsive to the storage of a predetermined code character in said shift register for disabling said gate circuit.

References Cited in the file of this patent

UNITED STATES PATENTS

| | | |
|---|---|---|
| 2,614,169 | Cohen | Oct. 14, 1952 |
| 2,649,502 | Odell | Aug. 18, 1953 |
| 2,667,533 | Zenner | Jan. 26, 1954 |
| 2,766,318 | Bacon | Oct. 9, 1956 |
| 2,805,283 | Stiles | Sept. 3, 1957 |
| 2,862,047 | Doerrfeld | Nov. 25, 1958 |